(12) United States Patent
Graves

(10) Patent No.: US 10,167,216 B2
(45) Date of Patent: Jan. 1, 2019

(54) HIGH EFFICIENCY WASTEWATER TREATMENT SYSTEM

(75) Inventor: Gregory D. Graves, Milan, OH (US)

(73) Assignee: Gregory D. Graves, Milan, OH (US)

( * ) Notice: Subject to any disclaimer, the term of this patent is extended or adjusted under 35 U.S.C. 154(b) by 1726 days.

(21) Appl. No.: 13/617,314

(22) Filed: Sep. 14, 2012

(65) Prior Publication Data

US 2014/0076800 A1    Mar. 20, 2014

(51) Int. Cl.
| | |
|---|---|
| C02F 9/14 | (2006.01) |
| C02F 9/00 | (2006.01) |
| C02F 1/28 | (2006.01) |
| C02F 1/32 | (2006.01) |
| C02F 1/44 | (2006.01) |
| C02F 1/52 | (2006.01) |
| C02F 1/76 | (2006.01) |
| C02F 3/06 | (2006.01) |
| C02F 3/30 | (2006.01) |
| C02F 101/20 | (2006.01) |

(52) U.S. Cl.
CPC ............... *C02F 9/00* (2013.01); *C02F 1/283* (2013.01); *C02F 1/32* (2013.01); *C02F 1/444* (2013.01); *C02F 1/52* (2013.01); *C02F 1/76* (2013.01); *C02F 3/06* (2013.01); *C02F 3/308* (2013.01); *C02F 2101/20* (2013.01); *C02F 2209/40* (2013.01); *C02F 2303/185* (2013.01); *Y02W 10/15* (2015.05)

(58) Field of Classification Search
None
See application file for complete search history.

(56) References Cited

U.S. PATENT DOCUMENTS

| | | | | |
|---|---|---|---|---|
| 3,957,632 | A | * | 5/1976 | Knopp ............... C02F 1/283 210/616 |
| 4,122,013 | A | | 10/1978 | Greenleaf, Jr. et al. |
| 4,608,157 | A | * | 8/1986 | Graves ............... C02F 3/1242 210/104 |

(Continued)

FOREIGN PATENT DOCUMENTS

| | | |
|---|---|---|
| CA | 2617162 A1 | 7/2007 |
| CA | 2572353 A1 | 4/2008 |

(Continued)

OTHER PUBLICATIONS

Office Action dated Dec. 11, 2017 for related Canadian Patent Application No. 2,961,073.

(Continued)

*Primary Examiner* — Michael J Felton
*Assistant Examiner* — Katherine A Will
(74) *Attorney, Agent, or Firm* — Miles & Stockbridge P.C.; David R. Schaffer

(57) ABSTRACT

A High Efficiency Treatment System (system) wastewater treatment system including a tank with a multi-chamber tank system that is designed to remove pollutants from domestic wastewater. Embodiments of the system consist of a pretreatment chamber, which is in fluid communication with an anoxic chamber, which is in fluid communication with an aeration chamber, which is in fluid communication with a clarification chamber, and which is in fluid communication with a polishing chamber. The system can be applied to remove suspended solids, BOD, ammonia, nitrate and TKN from wastewater.

136 Claims, 55 Drawing Sheets

(56) References Cited

U.S. PATENT DOCUMENTS

| | | |
|---|---|---|
| 5,413,706 A | 5/1995 | Graves |
| 5,514,278 A | 5/1996 | Khudenko |
| 5,582,733 A | 12/1996 | Desbos et al. |
| 5,605,629 A | 2/1997 | Rogalla |
| 5,616,241 A | 4/1997 | Khudenko |
| 6,015,496 A | 1/2000 | Khudenko |
| 6,139,744 A | 10/2000 | Spears et al. |
| 6,163,932 A | 12/2000 | Rosen |
| 6,555,002 B2 | 4/2003 | Garcia et al. |
| 6,692,642 B2 | 2/2004 | Josse et al. |
| 6,946,073 B2 | 9/2005 | Daigger et al. |
| 7,011,757 B1 | 3/2006 | Reid |
| 7,261,811 B2 | 8/2007 | Nakhla et al. |
| 7,326,343 B2 | 2/2008 | Nakhla et al. |
| 7,648,634 B2 | 1/2010 | Probst |
| 7,674,372 B2 | 3/2010 | Graves |
| 7,713,413 B2 | 5/2010 | Barnes |
| 7,736,513 B2 | 6/2010 | Zhu et al. |
| 8,012,352 B1 | 9/2011 | Giraldo et al. |
| 2004/0007523 A1 | 1/2004 | Gabon et al. |
| 2007/0187329 A1 | 8/2007 | Moller et al. |
| 2008/0179237 A1* | 7/2008 | Graves ............... B01D 21/0012 210/257.1 |
| 2010/0200496 A1 | 8/2010 | Graveleau |
| 2010/0282653 A1* | 11/2010 | Korzeniowski ........... C02F 3/12 210/151 |
| 2011/0168611 A1 | 7/2011 | Early et al. |
| 2014/0076800 A1 | 3/2014 | Graves |

FOREIGN PATENT DOCUMENTS

| | | |
|---|---|---|
| CA | 2617162 A1 | 7/2008 |
| CA | 2751221 A1 | 10/2012 |
| JP | 2007117908 A | 5/2007 |

OTHER PUBLICATIONS

Canadian Office Action dated May 25, 2018 in corresponding Canadian Patent Application No. 2,961,073.

* cited by examiner

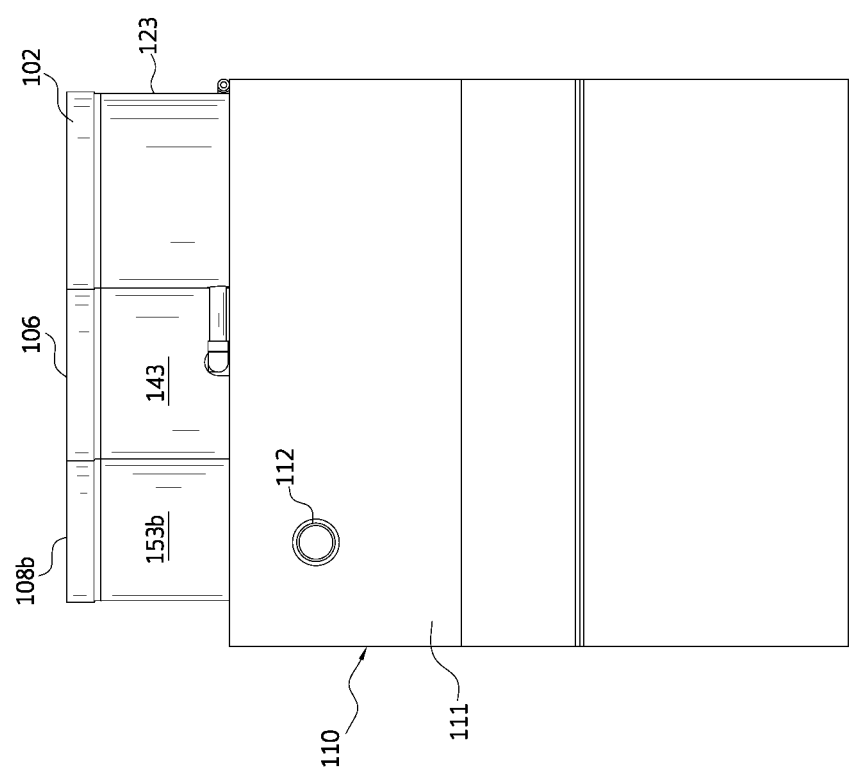

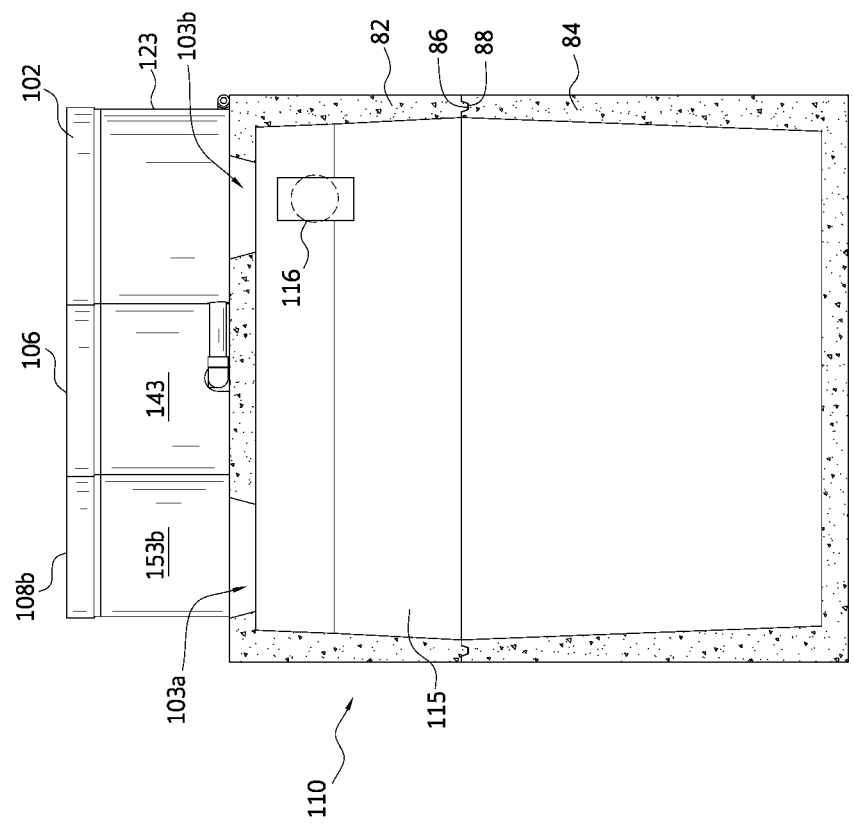

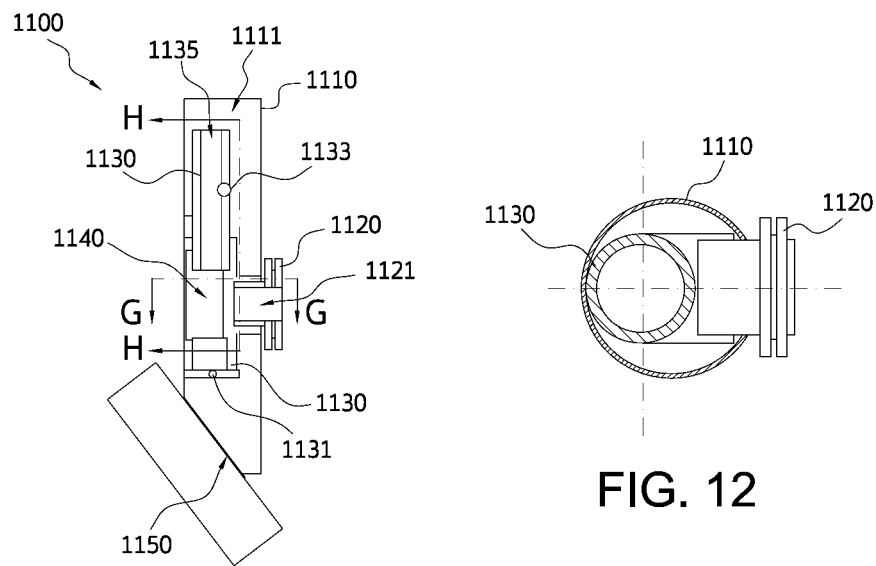
FIG. 11
FIG. 12
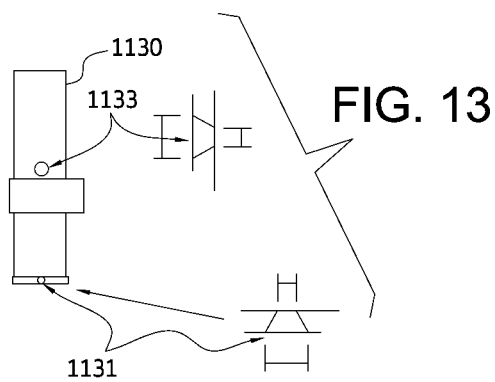
FIG. 13

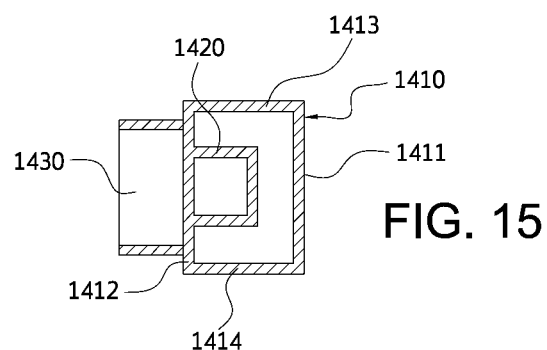
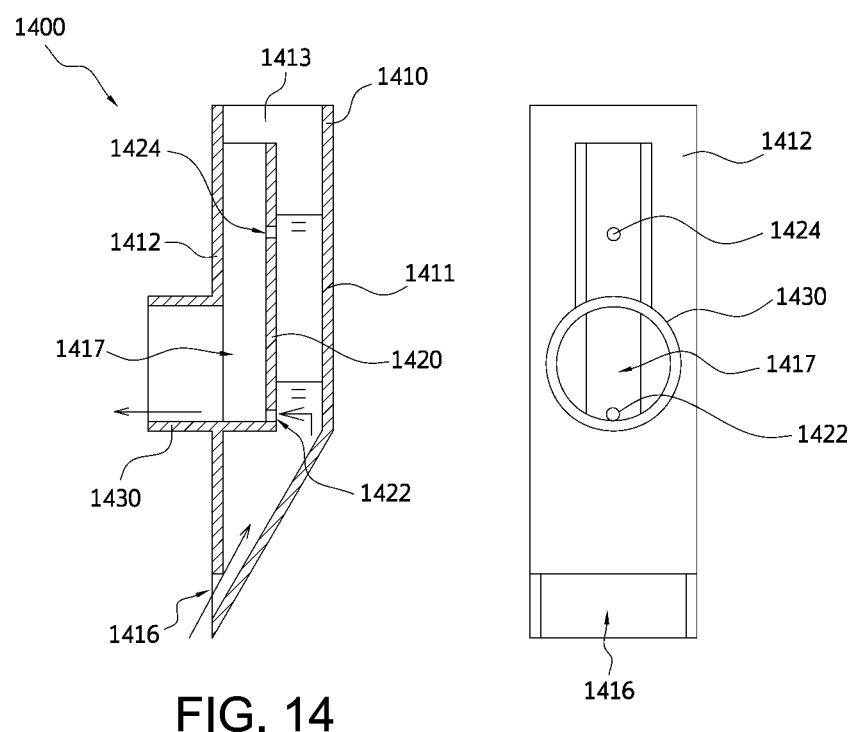
FIG. 14  FIG. 15  FIG. 16

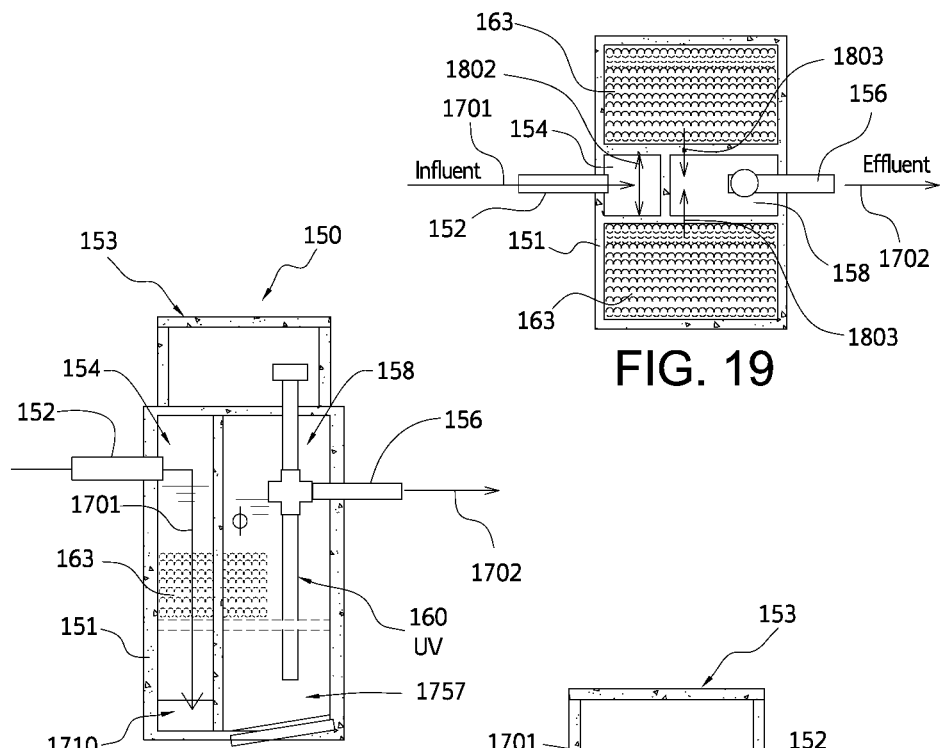
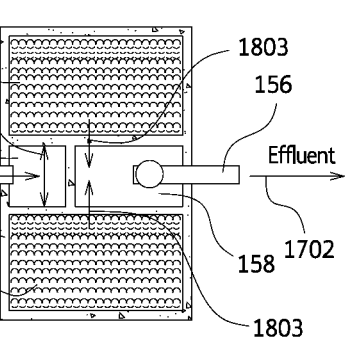
FIG. 19
FIG. 17
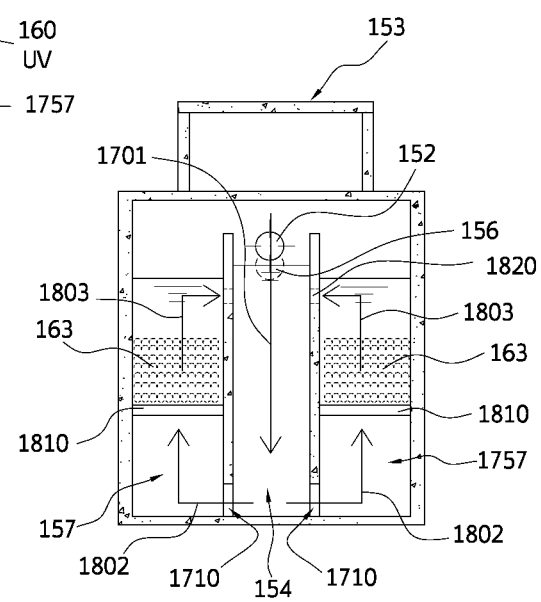
FIG. 18

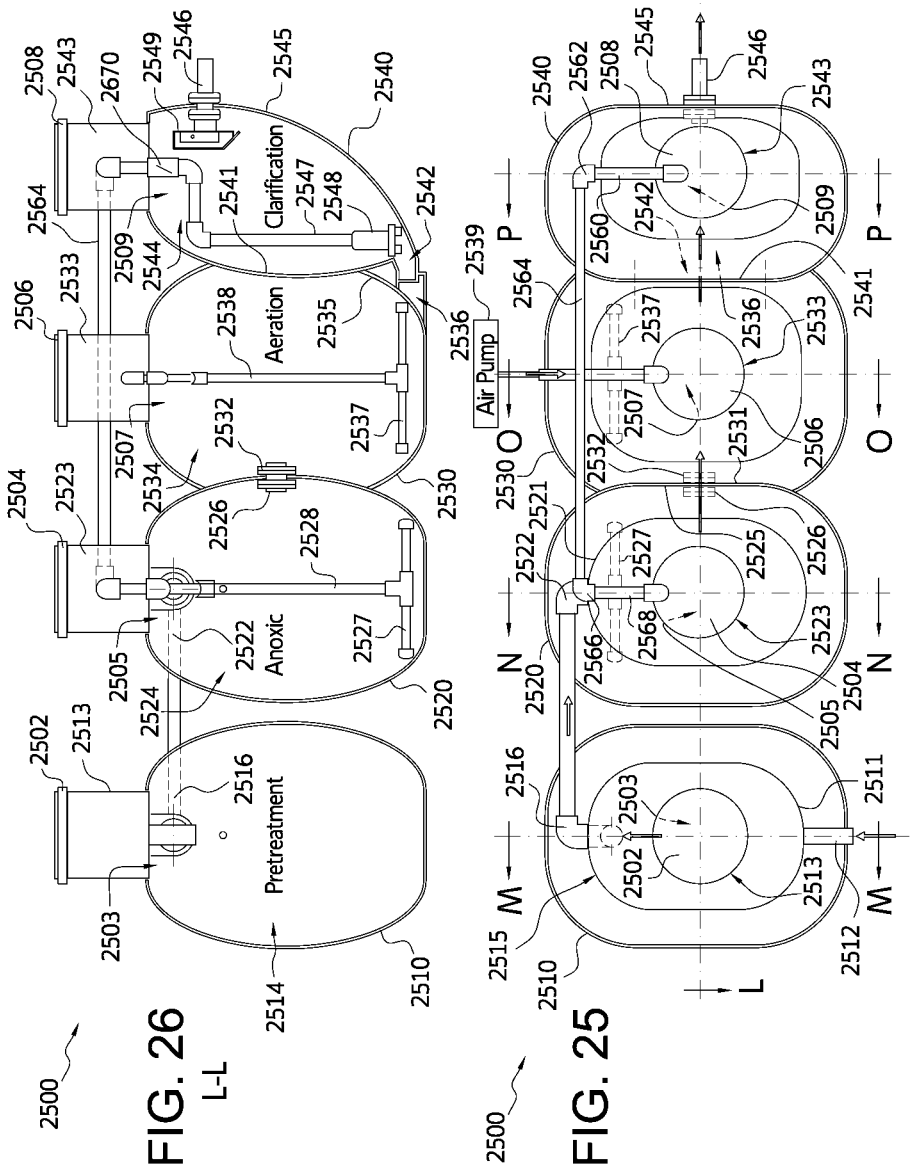

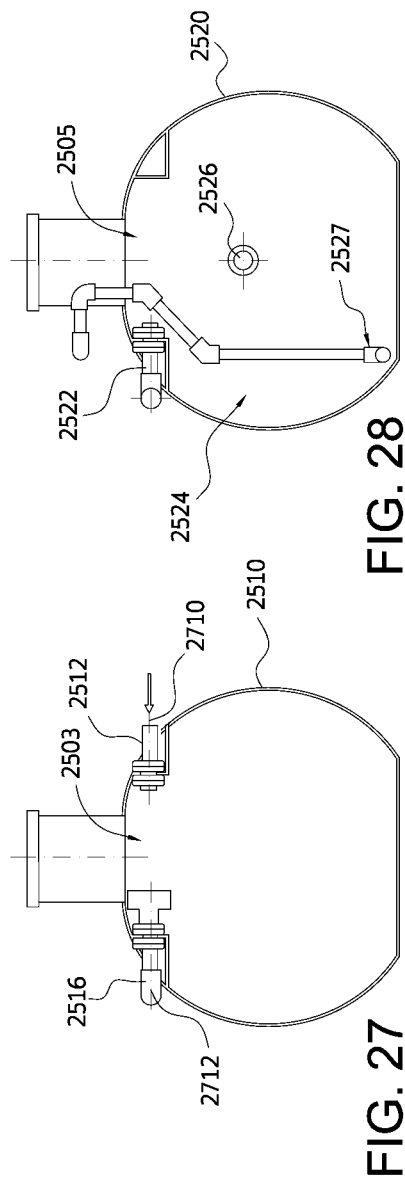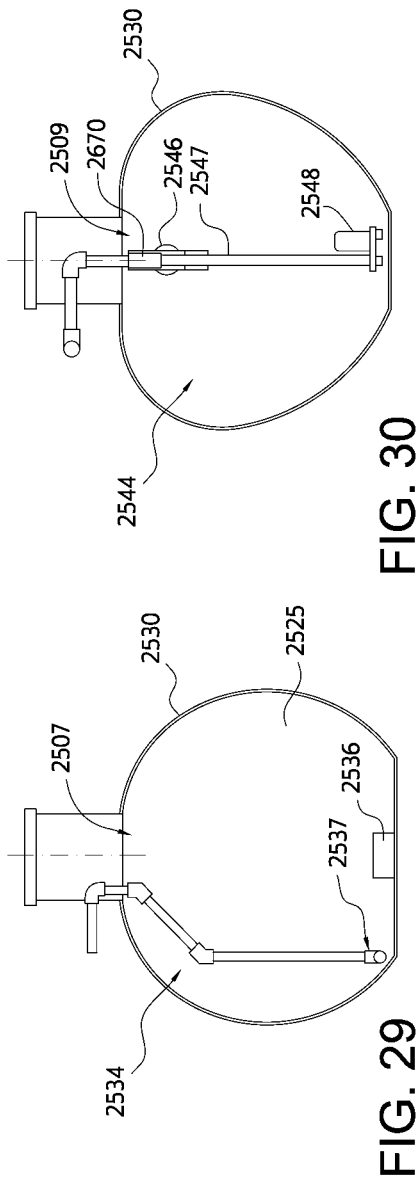

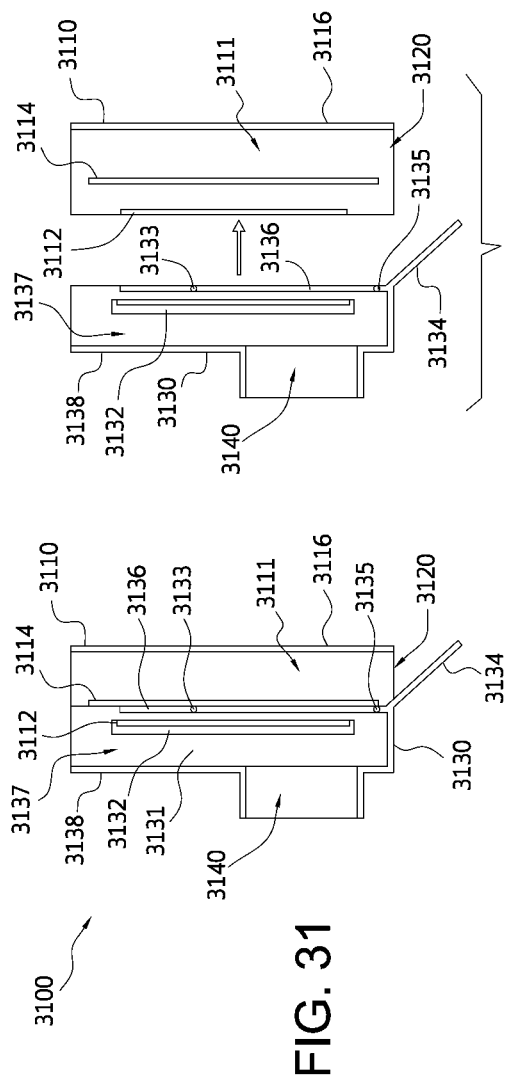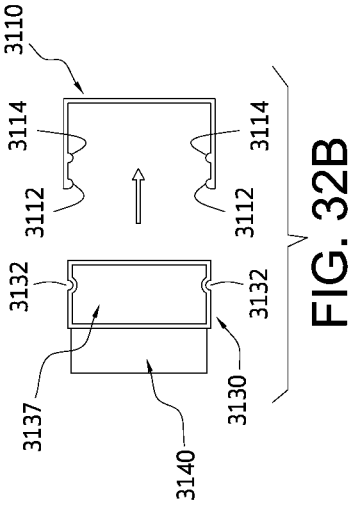

HIGH EFFICIENCY WASTEWATER TREATMENT SYSTEM

FIELD OF THE INVENTION

A High Efficiency Treatment System ("the system") is designed to remove pollutants from domestic wastewater. The system consists of one pretreatment chamber, one anoxic chamber, one aeration chamber, one clarification chamber and, in some embodiments, one polishing chamber. The system can be applied to remove suspended solids, BOD, ammonia, nitrate and TKN from wastewater.

BACKGROUND

The most widely used on-site wastewater treatment systems for individual households have traditionally been either septic systems or aerobic treatment units. Septic systems generally include a septic tank followed by a leaching tile field or a similar absorption device located downstream, but physically on-site of the individual residence. The septic tank allows for larger/heavier solids in the sewage to settle out within the tank, while anaerobic bacteria partially degrade the organic material in the waste. The discharge from the septic tank is further treated by dispersion into the soil through any number of soil absorption devices, such as a leaching tile field, whereby bacteria in the soil continue the biodegradation process.

SUMMARY

A High Efficiency Treatment System is designed to remove pollutants from domestic wastewater. Embodiments of the system, in general, can include (i.e., comprise) one pretreatment chamber, one anoxic chamber, one aeration chamber, one clarification chamber and, in some embodiments, one polishing chamber. The system can be applied to remove suspended solids, BOD, ammonia, nitrate and TKN from wastewater.

The system combines an aerobic process, an anaerobic process, an anoxic process, a clarification process and a polishing process in one treatment system. This combination of processes improves removal efficiencies of total nitrogen, SS and $BOD_5$. Also, the system has the advantage of consuming less power. Surprisingly, a recirculation pump that consumes low energy and is operated intermittently for short periods for example, but not limited to, about 5 to 20 and 10 to 15, 10 to 20, and 15 to 25 seconds, as well as ranges there between that total only 15 to 50 minutes per day has been applied to successfully treat domestic wastewater. This equipment plays a key role in the treatment processes for aerating mixed liquor, returning the activated sludge from the clarification chamber to the anoxic chamber, and mixing the returned sludge in the anoxic chamber.

A polishing chamber, which can be equipped with various final treatment pieces of equipment, is used to filter and/or disinfect the effluent from the clarification chamber. The optimal design of the filter is used to polish the effluent from the clarification chamber for 10 to 18 months without any required maintenance service.

The filtrate from the system contains low pollutants. If the influent characteristics are in certain ranges, the pollutants that are monitored by regulators and/or health authorities can be reduced to low levels.

BRIEF DESCRIPTION OF THE DRAWINGS

Non-limiting and non-exhaustive embodiments of the present invention are described with reference to the following figures, wherein like reference numerals and/or indicia refer to like parts throughout the various views unless otherwise precisely specified.

FIG. 3A is a front view of the pretreatment chamber in FIGS. 1 and 2, in accordance with one or more embodiments of the present invention.

FIG. 3B is a lateral cross-sectional view along line A-A of the pretreatment chamber in FIG. 2, in accordance with one or more embodiments of the present invention.

FIG. 11 is a close-up, cross-sectional side view of a flow equalization apparatus in the clarification chamber, in accordance with one or more embodiments of the present invention.

FIG. 12 is a cross-sectional, top view along line G-G of the flow equalization apparatus of FIG. 11, in accordance with one or more embodiments of the present invention.

FIG. 13 is a partially cut away, front view along line H-H of the flow equalization apparatus of FIG. 11, in accordance with one or more embodiments of the present invention.

FIG. 14 is a cross-sectional, side view of another flow equalization apparatus for use in a clarification chamber, in accordance with one or more other embodiments of the present invention.

FIG. 15 is a top view of the flow equalization apparatus of FIG. 14, in accordance with one or more embodiments of the present invention.

FIG. 16 is a front view of the flow equalization apparatus of FIG. 14, in accordance with one or more embodiments of the present invention.

FIG. 17 is a detailed cross-sectional, side view of the polishing chamber of FIG. 1, in accordance with one or more other embodiments of the present invention.

FIG. 18 is a cross-sectional, back view along line I-I of the polishing chamber of FIG. 17, in accordance with one or more embodiments of the present invention.

FIG. 19 is a cross-sectional, top view of the polishing chamber of FIG. 17, in accordance with one or more embodiments of the present invention.

FIG. 25 is a top view of a wastewater treatment system tank with a pretreatment chamber, an anoxic chamber, an aeration chamber, and a clarification chamber, in accordance with an another one or more embodiments of the present invention.

FIG. 26 is a cross-sectional, side view along line L-L of the wastewater treatment system tank with a pretreatment chamber, an anoxic chamber, an aeration chamber, and a clarification chamber of FIG. 25, in accordance with the another one or more embodiments of the present invention.

FIG. 27 is a cross-sectional, side view along line M-M of the pretreatment chamber of the wastewater treatment system tank of FIG. 25, in accordance with the another one or more embodiments of the present invention.

FIG. 28 is a cross-sectional, side view along line N-N of the anoxic chamber of the wastewater treatment system tank of FIG. 25, in accordance with the one or more embodiments of the present invention.

FIG. 29 is a cross-sectional, side view along line O-O of the aeration chamber of the wastewater treatment system tank of FIG. 25, in accordance with the another one or more embodiments of the present invention.

FIG. 30 is a cross-sectional, side view along line P-P of the clarification chamber of the wastewater treatment system tank of FIG. 25, in accordance with the another one or more embodiments of the present invention.

FIG. 31 is a cross-sectional, side view of a flow equalization apparatus, in accordance with yet other one or more embodiments of the present invention.

FIG. 32A is an exploded, cross-sectional, side view of a flow equalization apparatus, in accordance with the yet another one or more embodiments of the present invention.

FIG. 32B is a top view of FIG. 32A, in accordance with the yet another one or more embodiments of the present invention.

DETAILED DESCRIPTION

The present invention relates to a High Efficiency Treatment System that is designed to remove pollutants from domestic wastewater. Embodiments of the system, in general, can include (i.e., comprise) one pretreatment chamber, one anoxic chamber, one aeration chamber, one clarification chamber and, in some embodiments, one polishing chamber. The system can be applied to remove suspended solids, BOD, ammonia, nitrate and TKN from wastewater.

The system combines an aerobic process, an anoxic process, a clarification process and a polishing process in one treatment system. This combination of processes improves removal efficiencies of total nitrogen, SS and $BOD_5$. Also, the system has the advantage of consuming less power. Surprisingly, a recirculation pump that consumes low energy and is operated intermittently for short periods for example, but not limited to, about 5 to 20, 10 to 15, 10 to 20, and 15 to 25 seconds, as well as ranges there between for a total of only 15 to 50 minutes per day has been applied to successfully treat domestic wastewater. This equipment plays a key role in the treatment processes for aerating mixed liquor, returning the activated sludge from the clarification chamber to the anoxic chamber, and mixing the returned sludge in the anoxic chamber.

A polishing chamber, which can be equipped with various final treatment pieces of equipment, is used to filter and/or disinfect the effluent from the clarification chamber. The optimal design of the filter is used to polish the effluent from the clarification chamber in 10 to 18 months without any required maintenance service.

The filtrate from the system contains low pollutants. If the influent characteristics are in certain ranges, the pollutants that are monitored by regulators and/or health authorities can be reduced to low levels.

Figure 1:
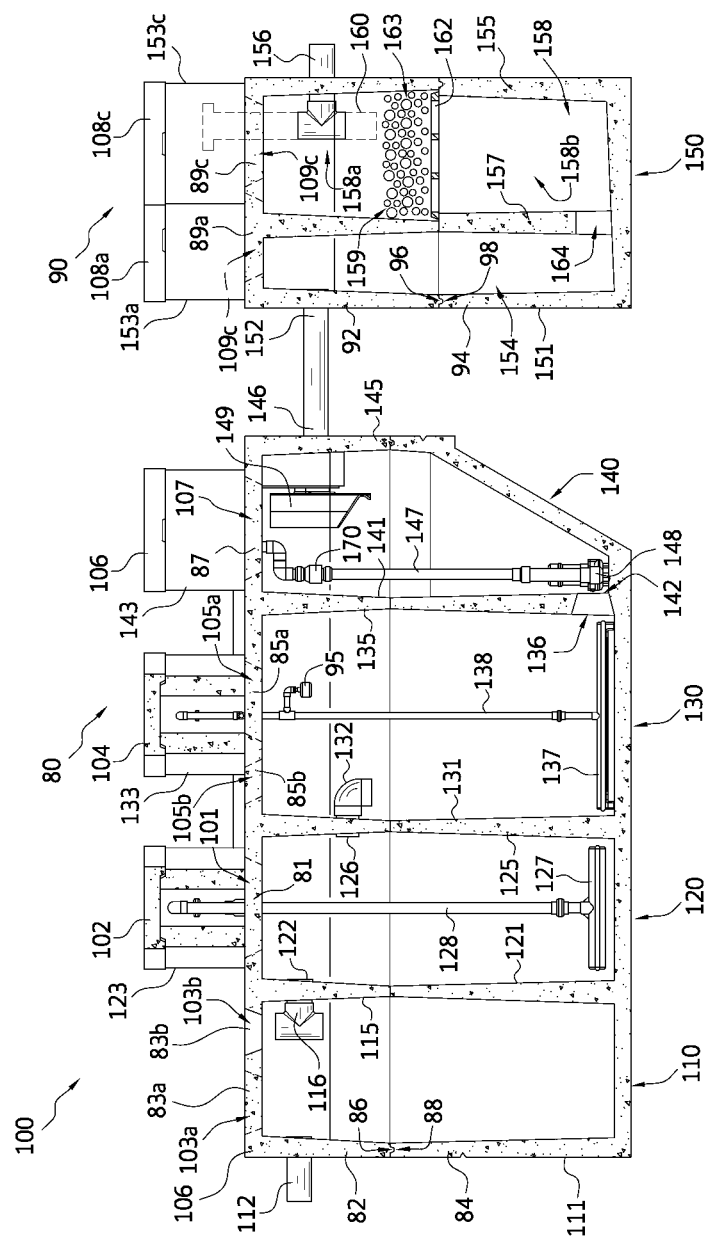
FIG. 1 is a cross-sectional, side view of a wastewater treatment system tank with a pretreatment chamber, an anoxic chamber, an aeration chamber, a clarification chamber and a polishing chamber, in accordance with one or more embodiments of the present invention.

FIG. 1 is a cross-sectional, side view of a wastewater treatment system with a pretreatment chamber, an anoxic chamber, an aeration chamber, a clarification chamber and a polishing chamber, in accordance with one or more embodiments of the present invention. In FIG. 1, a wastewater treatment system 100 includes a first component 80 and a second component 90. In the embodiment illustrated in FIG. 1, the first and second components 80, 90 each include a top half 82, 92 and a bottom half 84, 94, respectively. In general, the top components 82, 92 have a ridge 86, 96 extending from a bottom edge and the bottom components 84, 92 have a reciprocally shaped groove 88, 98, respectively, to receive the appropriate top component ridge 86, 96 when the two components are assembled together. The first component 80 includes a pretreatment chamber 110, an anoxic chamber 120 in fluid communication with the pretreatment chamber 110, an aeration chamber 130 in fluid communication with the anoxic chamber 120, a clarification chamber 140 in fluid communication with the aeration chamber 130 and the anoxic chamber 120. The second component 90 includes a polishing chamber 150 in fluid communication with the clarification chamber 140 of the first component 80.

In FIG. 1, the pretreatment chamber 110 has a front wall 111 through which an influent inlet pipe 112 is located in an upper left corner of the front wall 111, when viewed from the outside and facing the front wall 111 (see FIG. 3A), and provides access for an incoming flow of wastewater to be treated. The pretreatment chamber 110 also has a back wall 115 through which an outlet pipe 116 is located in an upper right corner of the back wall 115 (see FIG. 3B) and permits pretreated wastewater to flow into the anoxic chamber 120. Located in a top wall 106 of the pretreatment chamber 110 and above an exit of the influent inlet pipe 112 is a frustoconical first access opening 103a with a reciprocal frustoconical first access opening cover 83a. Also located in the top wall of the pretreatment chamber 110 and above an entrance of the outlet pipe 116 is a frustoconical second access opening 103b with a reciprocal frustoconical second access opening cover 83b. In general, the pretreatment chamber outlet pipe 116 is located at a height that is slightly below the pretreatment chamber influent inlet pipe 112.

In FIG. 1, the anoxic chamber 120 has a front wall 121 through which an inlet pipe 122 is located in an upper right corner of the front wall 121, when looking back toward the pretreatment chamber 110, and provides access for an incoming flow of pretreated wastewater from the pretreatment chamber 110. In fact, the anoxic chamber front wall 121 is also the pretreatment chamber back wall 115 and the anoxic chamber inlet pipe 122 is directly connected to and in fluid communication with the pretreatment chamber outlet pipe 116. The anoxic chamber 120 also has a back wall 125 through which an outlet pipe 126 is located in an upper left corner of the back wall 125 (see FIG. 3C) and permits anoxically treated wastewater to flow into the aeration chamber 130. In general, the anoxic chamber outlet pipe 126 is located at a height that is below the anoxic chamber influent inlet pipe 122. Located in a top wall of the anoxic chamber 120 and adjacent to the anoxic chamber inlet pipe 122 is a frustoconical access opening 101, which can include a reciprocal frustoconical first access opening cover 81. An anoxic chamber riser 123 is sealingly affixed around and extends upwardly away from opening 101 and riser 123 is covered by an anoxic chamber riser cover 102.

In FIG. 1, the aeration chamber 130 has a front wall 131 through which an inlet pipe 132 is located in an upper left corner of the front wall 131, when looking back toward the anoxic chamber 120, and provides access for an incoming flow of anoxically treated wastewater from the anoxic chamber 120. In fact, the aeration chamber front wall 131 is also the anoxic chamber back wall 125 and the aeration chamber inlet pipe 132 is directly connected to and in fluid communication with the anoxic chamber outlet pipe 126. The aeration chamber 130 also has a back wall 135 through which an outlet opening 136 is located in a bottom center of the back wall 135 (see FIG. 3D) and permits aerated wastewater to flow into the clarification chamber 140. In general, the aeration chamber outlet opening 136 is located at a height that is well below the aeration chamber inlet pipe 132 and permits a back and forth flow of wastewater between the aeration chamber 130 and the clarification chamber 140. Located in a top wall of the aeration chamber 130 and adjacent to the aeration chamber inlet pipe 132 is a frustoconical access opening 105b with a reciprocal frustoconical first access opening cover 85b. Also located in the top wall of the aeration chamber 130 on the same side as and in-line with access openings 103b and 101 is a frustoconical second access opening 105a which can include a reciprocal frustoconical second access opening cover 85a. An aeration chamber riser 133 is sealingly affixed around and extends upwardly away from opening 105a and riser 133 is covered by an aeration chamber riser cover 104.

The clarification chamber 140 has a front wall 141 through which an inlet opening 142 is located in a bottom center of the clarification chamber front wall 141 and provides access for an incoming flow of aerated wastewater from the aeration chamber 130. In fact, the clarification chamber front wall 141 is also the aeration chamber back wall 135 and the clarification chamber inlet opening 142 is directly connected to and in fluid communication with the aeration chamber outlet opening 136. The clarification chamber 140 also has a back wall 145 through which an outlet pipe 146 is located in a top center of the back wall 145 and permits clarified wastewater to flow into the polishing chamber 150. A flow equalization device 149 is positioned in front of and controls the flow to the clarification chamber outlet pipe 146 (see FIG. 3E). In general, the clarification chamber outlet pipe 146 is located at a height that is well above the clarification chamber inlet opening 142 and permits a one way flow of wastewater from the clarification chamber 140 to the polishing chamber 150. Located in substantially the center of a top wall of the clarification chamber 140 and above the clarification chamber inlet pipe 142, the flow equalization unit 149 and the clarification chamber outlet pipe 146 is a frustoconical access opening 107, which can include a reciprocal frustoconical first access opening cover 87. A clarification chamber riser 143 is sealingly affixed around and extends upwardly away from opening 107 and riser 143 is covered by a clarification chamber riser cover 106.

In FIG. 1, the polishing chamber 150 is shown as a separate system/component that is connected to and in fluid communication with the clarification chamber 140 via the clarification chamber outlet pipe 146, which connects to and is in fluid communication with a polishing chamber inlet pipe 152 in a front wall 151 of the polishing chamber 150. The polishing chamber inlet pipe 152 is located in a top center of the polishing chamber front wall 151 and provides access for an incoming flow of clarified wastewater from the clarification chamber 140. The polishing chamber 150 also has a back wall 155 through which an effluent outlet pipe 156 is located in a top center of the back wall 155 and permits fully treated wastewater to flow out of the polishing chamber 150. In general, the polishing chamber outlet pipe 156 is located at a height that is below the polishing chamber inlet opening 152 and permits a one way flow of wastewater from the clarification chamber 140 into and out of the polishing chamber 150. Located in a top wall of the polishing chamber 150 and above the polishing chamber inlet pipe 152 is a first frustoconical access opening 109a, which can include a first reciprocal frustoconical first access opening cover 89a. Also located in the top wall of the polishing chamber 150, but on the back wall 155 side of the top wall and adjacent to but not directly above the polishing chamber outlet pipe, is a third frustoconical second access opening 109c, which can include a third reciprocal frustoconical second access opening cover 89c. Although not shown in FIG. 1, located in the top wall of the polishing chamber 150, but on the back wall 155 side of the top wall and adjacent to but not directly above the polishing chamber outlet pipe, is a second frustoconical access opening 109b (See FIG. 2), which can include a second reciprocal frustoconical third access opening cover 89b (see FIG. 2). The second and third access openings 109b and 109c are substantially aligned with each other along the polishing chamber back wall 155 and offset from the first access opening 109a. A first, second and third polishing chamber risers 153a, 153b, 153c are each sealingly affixed around and extend upwardly away from openings 109a, 109b, 109c, respectively, and each of risers is covered by a polishing chamber riser cover 108a, 108b, 108c, respectively.

The embodiment of the system 100 in FIG. 1 is divided into two systems. In order to meet different application treatment requirements, the system is designed in different combinations to meet the different discharge requirements. For example, if a local authority requires a treatment plant to meet regular discharge limits or stringent discharge limits, a system including the first component 80 having the pre-treatment, anoxic, aeration and clarification chambers 110, 120, 130, 140 can be applied to meet the discharge limits. If water reuse or a water recycling program is required, the second component 90 including the polishing chamber 150 can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110 is to remove grit, floating material and large suspended particles from domestic wastewater. The wastewater is preconditioned by passing through the pretreatment chamber 110 prior to being introduced to the anoxic chamber 120. The outlet pipe 116 of the pretreatment chamber is equipped with a discharge tee or a baffle that extends vertically into the liquid so that only supernatant is displaced to the anoxic chamber 120. The distance between the inlet 112 and outlet 116 of the pretreatment chamber is designed to be as far apart as possible. This design creates a good settling condition and improves solids removal efficiency.

As described above, the system 100 is different from any residential sewage treatment system. Not only does it use an aeration process, but it also uses anoxic and anaerobic processes. The purpose of using the anoxic chamber 120 in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

Figure 5:
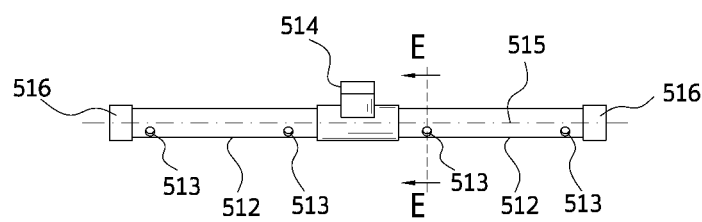
FIG. 5 is a longitudinal side view of a mixing bar of a wastewater treatment system tank with a pretreatment chamber, an anoxic chamber, an aeration chamber, a clarification chamber and a polishing chamber, in accordance with one or more embodiments of the present invention.

The nitrate sources from the effluent are pumped from the bottom of the clarification chamber 140 to the anoxic chamber 120 periodically. A mixing bar 127, which is further shown in and described herein in relation to FIG. 5, is installed at the end of a sludge return pipe 128 and located near the bottom of the anoxic chamber 120. An energy saving concept has been applied to design this system. Specifically, while a submersible sludge return pump 148 is pumping the mixture of liquid and sludge up a sludge return pipe 147 and back to the anoxic chamber 120, the current flows through holes (see FIG. 50) on the mixing bar 127. As a result, the settled sludge and liquid in the anoxic chamber 120 are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120 settle down to a certain level, the sludge return pump 148 in the clarification chamber 140 starts its pumping cycle and creates a mixing condition in the anoxic chamber 120. Frequent pumping keeps sludge in a suspension condition in the anoxic chamber. The pumping frequency can be selected based on the strength of the wastewater.

The sludge return pump 148 and mixing bar 127 play two functions: 1) sending settled aerobic sludge and nitrate from the clarification chamber 140 to the anoxic chamber 120 and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148 is turned on from 1 to 10 percent of the system operating time. The pumping duration and frequency are based upon the flow rate of the submersible sludge return pump 148 and the strength of the influent wastewater. The flow rate of the sludge return pump 148 is adjustable for a return flow rate of between 100 to 1,000 percent of system flow rate depending on the organic and hydraulic load.

Because the sludge in the treatment system 100 is not allowed to be discarded, all the solids or sludge produced during the treatment period is kept in the system 100. If a simple aeration system is operated under this kind of condition, floating sludge or scum is found at the surface of the clarification chamber 140. In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140 by tiny bubbles inside of the sludge particles. The floating solids or sludge affects the solids separation process. Some solids flow out of the clarification chamber 140 with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

Figure 2:
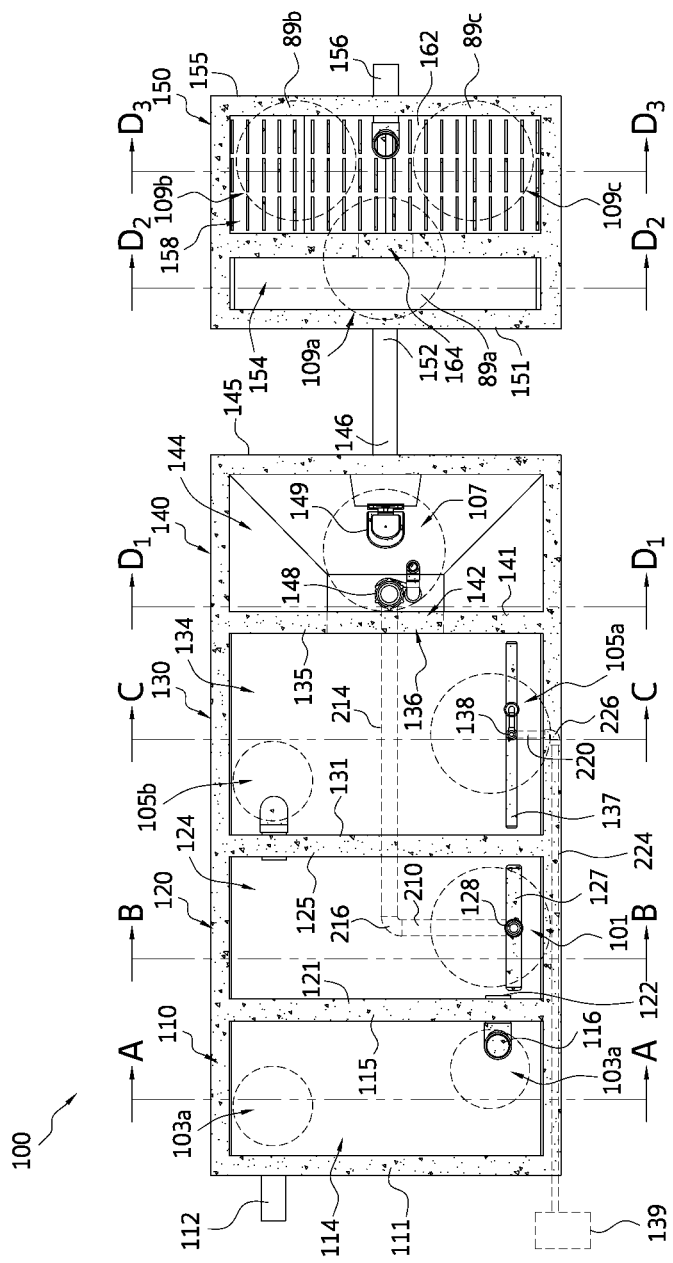
FIG. 2 is a partially exposed, top view of a wastewater treatment system tank with a pretreatment chamber, an anoxic chamber, an aeration chamber, a clarification chamber and a polishing chamber, in accordance with one or more embodiments of the present invention.

In the system 100 of FIG. 1, the denitrified domestic wastewater contains certain amounts of suspended solids, $BOD_5$ and nitrogen pollutants and flows through an elbow at an outlet end of the aeration chamber inlet tube 132 on that and enters the aeration chamber 130. A low energy consumption air pump 139 is used to inject air into the mixed liquor and the aerobic bio-organisms in the aeration chamber 130 digest and remove organic pollutants, and convert TKN and ammonia to nitrate under the aerobic condition. The aeration process is completed by an air pump 139, which can be located within the aeration chamber riser 133 or externally as shown in FIG. 2 as reference number 139, a diffusion bar 137 and an air supply pipe 138. The diffusion bar 137 is made from plastic pipe and tiny holes are distributed along the length of the pipe. Air bubbles released from the diffusion bar 137 are injected into the wastewater and mix and aerate the mixed liquor. Activated sludge that is constructed by biomass plays a key role to treat domestic wastewater in the aeration chamber. An overflow level detector 95 is connected to the air supply pipe 138 adjacent aeration chamber access opening 105a.

After the aeration process in the aeration chamber 130, although the pollutants in the domestic wastewater are reduced to a low level the activated sludge needs to be separated from mixed liquor before entering the polishing chamber 150 for final treatment and discharge. The clarification chamber 140 is used to remove the solids from the treated wastewater. The mixed liquor flows through an opening at the bottom of the wall that is constructed between the aeration chamber 130 and the clarification chamber 140. This small opening regulates flow from the aeration chamber 130 to the clarification chamber 140. Solids in the treated wastewater are separated from the liquid and settle down to the bottom of the clarification chamber 140 and form a sludge layer or pile. The sludge return pump 148 that is installed at the bottom of the clarification chamber 140 pumps settled activated sludge and liquid from the clarification chamber 140 through a check valve 170 and a pipe system 147 to the anoxic chamber 120 to be mixed with the wastewater and further treated in the anoxic chamber 120. Because the hydraulic detention time of the clarification chamber is more than 4 hours during a peak flow period, the accumulated sludge separated in the clarification chamber is gradually turned into an anoxic condition before entering the anoxic chamber 120. After returning to the anoxic chamber 120, the de-nitrification bacteria in the returned sludge are mixed with the existing sludge in the anoxic chamber 120. The de-nitrifiers in the sludge start to be active to digest nitrate and organics.

In order to improve the solids removal efficiency, a flow equalization apparatus 149 is installed on an inlet end of the outlet pipe 146 of the clarification chamber 140. At least one flow equalization port regulates the peak flow from the clarification chamber 140 to the polishing chamber 150 and improves solids removal efficiency. The purpose of using this flow equalization apparatus 149 is to average the effluent flow rate and enhance settling efficiency. This system has been experimentally tested for a 52 week period without discarding any sludge. Sometimes, small amounts of sludge turn into light weight sludge that cannot be removed by the settling process. The sludge usually floats from the bottom of the chamber to the water surface in the clarification chamber 140. To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150 through the at least one overflow port. Usually, the at least one flow equalization port is not plugged by solids easily. If sludge accumulates inside the flow equalization port and plugs the flow, the water level in the clarification chamber 140 will be raised to achieve the water level at the at least one overflow port. During the water level elevating time, the plugged at least one flow equalization port will be self-cleaned under the pressure of the water. If the plugged flow equalization port cannot be cleaned, the at least one overflow port allows liquid to flow into the polishing chamber 150. The diameter of the at least one flow equalization port varies from 0.25 to 0.5 inches. Additional details on embodiments of the flow equalization apparatus 149 are shown in FIGS. 11-14, 31, 32 and 59-65.

In FIG. 1, the polishing chamber 150 consists of an influent well 154 and an effluent well 158 separated by a central wall 157, all located transversely across the polishing chamber 150 with a filtration bed 159 horizontally located in and dividing the effluent well 158 of the polishing chamber 150 into upper and lower sections 158a, 158b. The effluent from the clarification chamber 140 flows into the polishing chamber 150. The flow is distributed to the effluent well through an opening 164 located at a bottom and in a center of the central wall 167 and moves up through filtration bed 159 where the treated wastewater passes through a filtration bed base 16 and a filtration media 163 to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the two filtration beds is collected from two submerged holes and directed to the effluent well 158, in which, a finishing treatment system 160 can be installed to perform a final treatment on the effluent water before being discharged from the polishing chamber 150. For example, the finishing treatment system 160 can include, but is not limited to, an UV assembly, a chlorination system, a de-chlorination system, a phosphorus removal system, a heavy metal removal system, a nitrogen/nitrate removal system and any combination of the above and is installed for disinfecting of the effluent from the filter. Since the filter is designed and structured very well and the filtrate is clear and contains less BOD and SS, disinfection performance of the UV assembly is excellent.

Several different types of material can be used as the filtration media for the system 100 of FIG. 1. For example, gravel, ceramic, closed cell Styrofoam, natural, synthetic, rubber and plastic materials in certain sizes can be used as the filtration media 163 in the filter. Specifically, the diameter of the filtration media 163 varies from 0.5 to 5 inches. Because coarse filtration media 163 and a thin filtration bed are used in this design, it is easy to clean the filtration media during maintenance services. After the liquid in the filter is pumped out though the influent well 154, an operator can rinse the filtration media 163 with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 1 can be constructed using concrete and/or a molded plastic.

FIG. 2 is a partially exposed, top view along line B-B of the wastewater treatment system tank of FIG. 1, in accordance with one or more embodiments of the present invention. In FIG. 2, the positions of the access openings 101,

103a, 103b, 105a, 105b, 107 in the top 106 of the first component 80 are shown in dashed line. In addition, the external components of the sludge return system are seen extending from the clarification chamber access opening 107 back toward anoxic chamber 120. Specifically, a first cross piece 214 is seen extending out from the clarification chamber 140 and across aeration chamber 130 to connect with a first end of a first elbow 216, which has a second end connected to a first end of a return piece 210, which connects to the mixing bar 127 via the mixing bar riser tube 128. An air pump 139 is connected to a first pipe section 224, which extends from off the front of the pretreatment chamber 110 and along a top, side edge of the first component 80 to connect to a first end of an elbow 226 and second end of the elbow is connected to a first end of a diffuser bar return piece 220, which connects to the diffuser bar 137 the diffuser bar riser 138.

In FIG. 2, the internal structure of the polishing chamber is more clearly illustrated. For example, inlet pipe 152 is seen attached to the front wall 151 of the polishing chamber and in fluid communication with an influent well 154. Adjacent to influent well 154 is an effluent well 158 in which a topside of the filtration bed base 162 is shown without the filtration media.

FIG. 3A is a front view of the pretreatment chamber in FIGS. 1 and 2, in accordance with one or more embodiments of the present invention. In FIG. 3A, the pretreatment chamber inlet opening 112 is seen in the upper left corner of the front wall 111 of the pretreatment chamber 110.

FIG. 3B is a lateral cross-sectional view along line A-A of the pretreatment chamber in FIG. 2, in accordance with one or more embodiments of the present invention. In FIG. 3B, the pretreatment chamber outlet pipe 116 is shown in the upper right corner of the pretreatment chamber back wall 115. The "T"-shape of the outlet pipe 116 permits wastewater to flow from the bottom in normal flow conditions and from the bottom and top in overflow conditions.

Figure 3C:
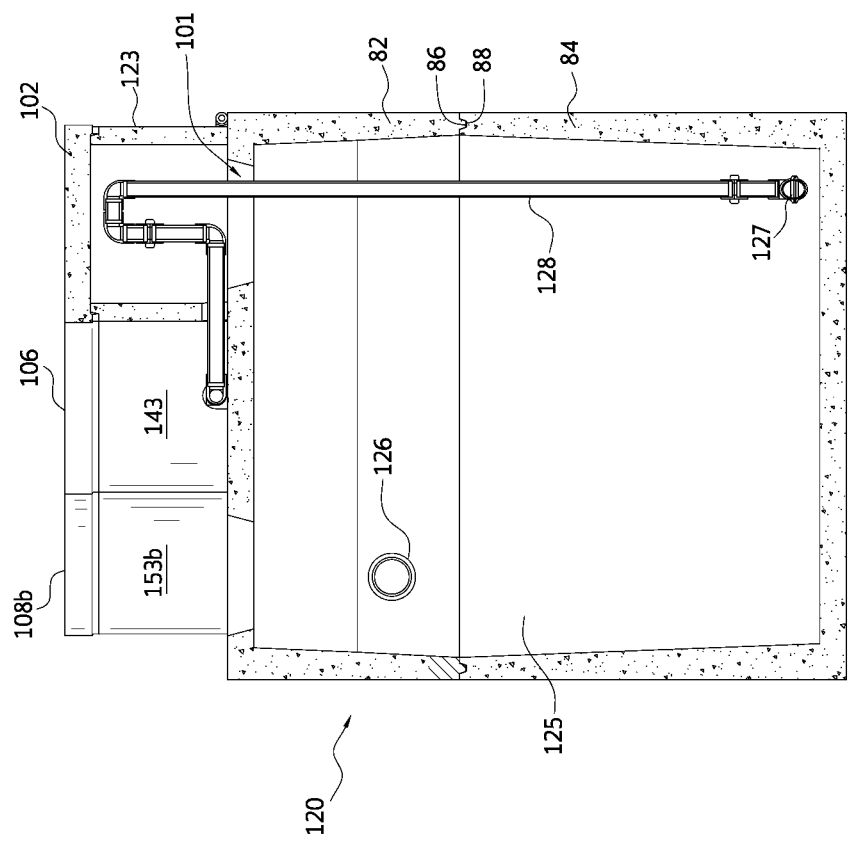
FIG. 3C is a lateral cross-sectional view along line B-B of the anoxic chamber in FIG. 2, in accordance with one or more embodiments of the present invention.

FIG. 3C is a lateral cross-sectional view along line B-B of the anoxic chamber in FIG. 2, in accordance with one or more embodiments of the present invention.

Figure 3D:
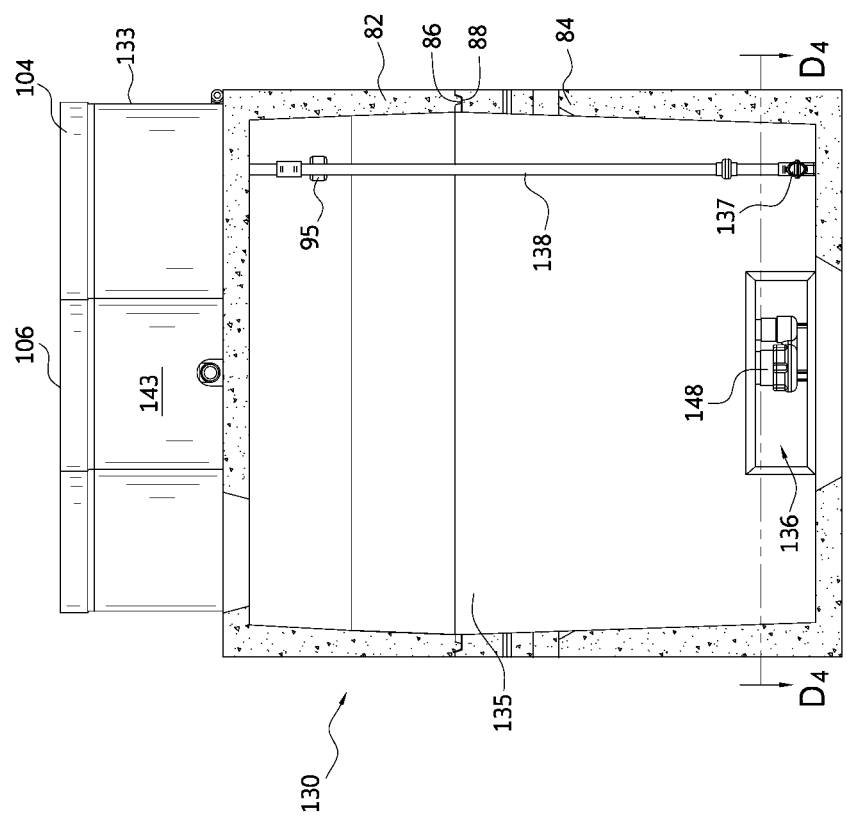
FIG. 3D is a lateral cross-sectional view along line C-C of the aerobic chamber in FIG. 2, in accordance with one or more embodiments of the present invention.

FIG. 3D is a lateral cross-sectional view along line C-C of the aerobic chamber in FIG. 2, in accordance with one or more embodiments of the present invention. In FIG. 3D, the aeration chamber outlet opening 136 is seen at the bottom of the back wall 135 of the aeration chamber 130. The outlet opening 136 is rectangular in shape with dimension of about 18 inches wide by about 6 inches high on the aeration chamber side and tapers down on all four sides to an opening in the clarification chamber front wall 141 of the about 16 inches wide and about 4 inches high. The sludge return pump 148 is partially visible through the aeration chamber outlet opening 136.

Figure 3E:
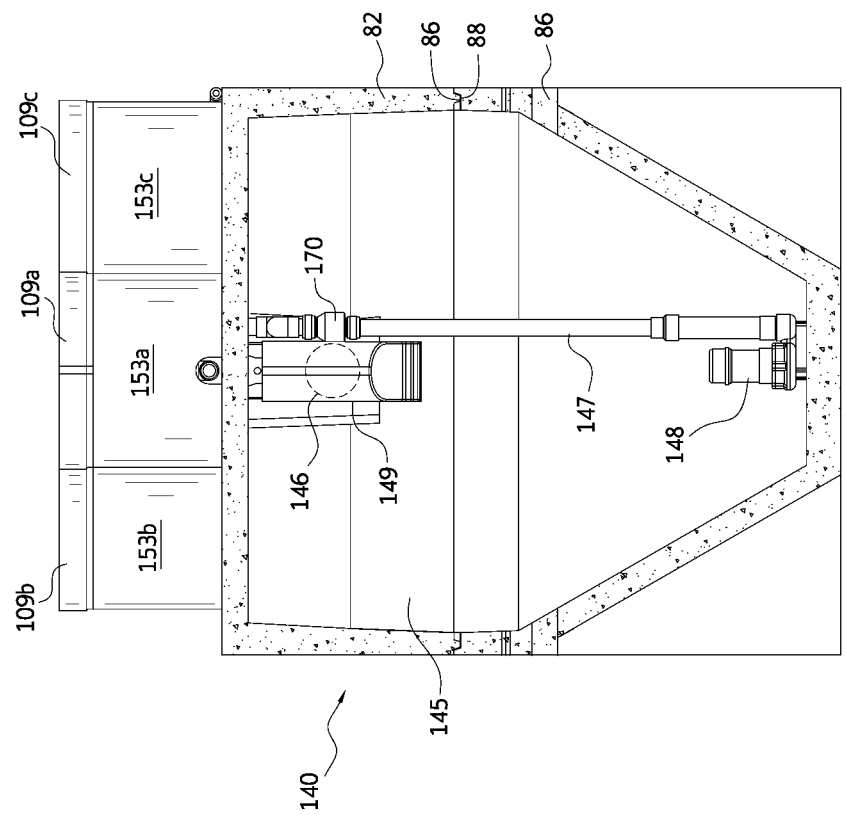
FIG. 3E is a lateral cross-sectional view along line $D_1$-$D_1$ of the clarification chamber in FIG. 2, in accordance with one or more embodiments of the present invention.

FIG. 3E is a lateral cross-sectional view along line $D_1$-$D_1$ of the clarification chamber in FIG. 2, in accordance with one or more embodiments of the present invention. In FIG. 3E, the clarification chamber outlet opening 146 is shown in broken line behind the flow equalization device 149 in the top center of the clarification chamber back wall 145.

Figure 3F:
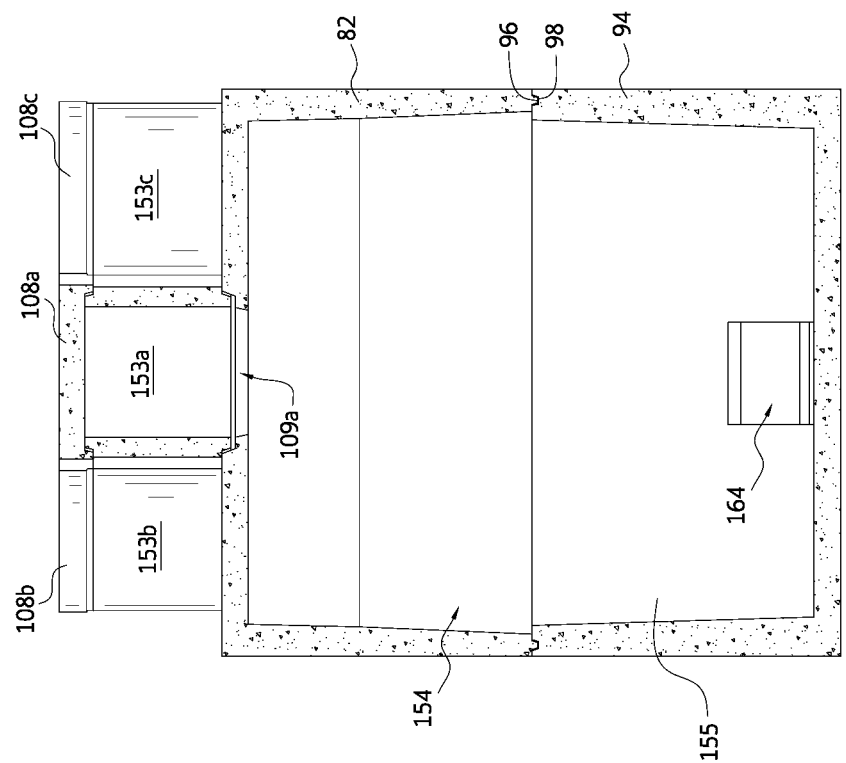
FIG. 3F is a lateral cross-sectional view along line $D_2$-$D_2$ of the polishing chamber in FIG. 2, in accordance with one or more embodiments of the present invention.

FIG. 3F is a lateral cross-sectional view along line $D_2$-$D_2$ of the polishing chamber in FIG. 2, in accordance with one or more embodiments of the present invention. In FIG. 3F, the influent well outlet opening 164 is shown in the bottom of the chamber back wall 155.

Figure 3G:
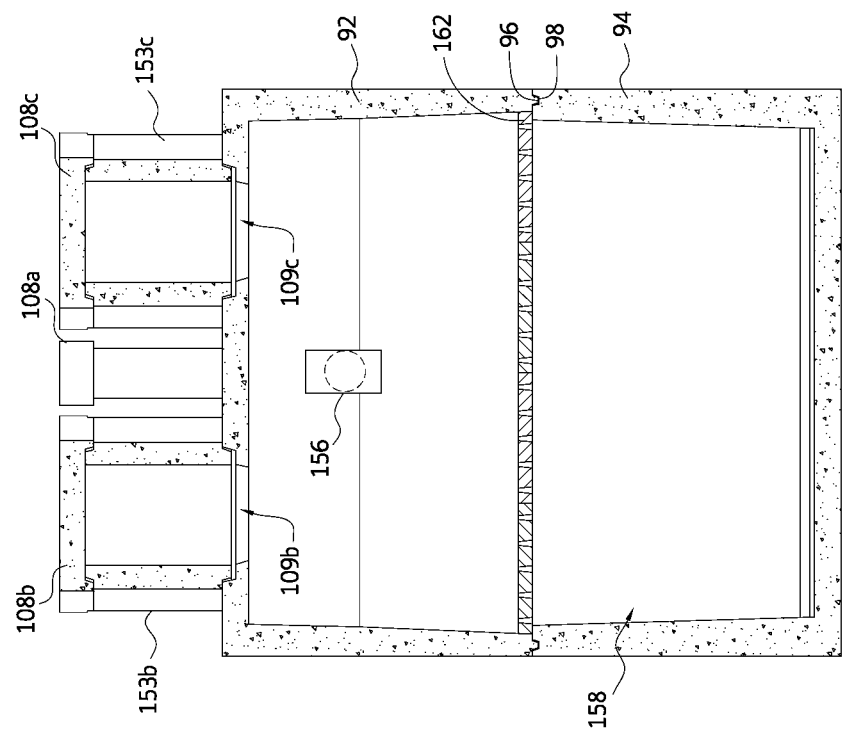
FIG. 3G is a lateral cross-sectional view along line $D_3$-$D_3$ of the polishing chamber in FIG. 2, in accordance with one or more embodiments of the present invention.

FIG. 3G is a lateral cross-sectional view along line $D_3$-$D_3$ of the polishing chamber in FIG. 2, in accordance with one or more embodiments of the present invention. In FIG. 3G, the effluent well outlet opening 156 is shown in broken line behind a "T"-shaped junction inlet.

Figure 4:
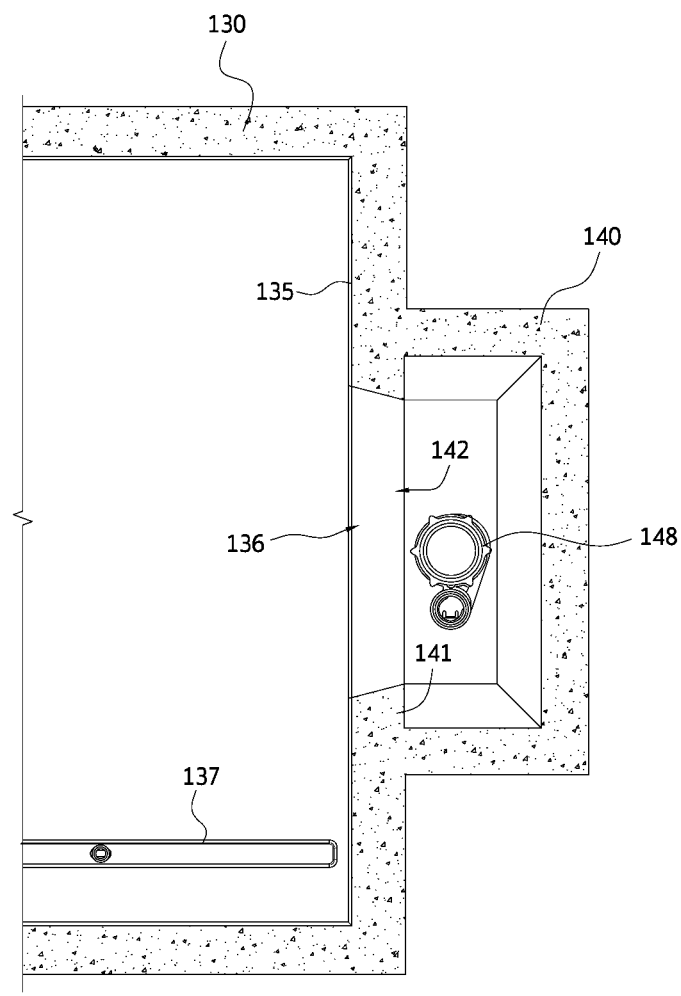
FIG. 4 is a cross-sectional, top view along line $D_4$-$D_4$ of a bottom opening between the aerobic chamber and the clarification chamber of FIG. 3D, in accordance with one or more embodiments of the present invention.

FIG. 4 is a cross-sectional, top view along line $D_4$-$D_4$ of a bottom opening between the aerobic chamber and the clarification chamber of FIG. 3D, in accordance with one or more embodiments of the present invention. In FIG. 4, the outlet opening 136 of the aeration chamber 130 and inlet opening 142 of the clarification chamber 140 is shown with a wall 141 on the side of the inlet opening 142.

FIG. 5 is a longitudinal side view of a mixing bar of a wastewater treatment system tank with a pretreatment chamber, an anoxic chamber, an aeration chamber, a clarification chamber and a polishing chamber, in accordance with one or more embodiments of the present invention. In FIG. 5, a mixing bar 510, such as, for example the mixing bar 127 of FIG. 1 includes two substantially equal body portions 512 that are connected together by a "T"-shaped junction 514 at a first end and a second end of each body portion 512 is sealed with an end cap 516. The body portions 512 are made from plastic pipe, the "T"-shaped junction 514 and the end caps 516 are also made from plastic. In general, on the mixing bar 510, the body portions 512 each have multiple inch openings 513, for example, but not limited to, about ⅜", ½", ⅝", and ¾" diameter, as well as diameters in between extending through an exterior wall of and into an inside of each body portion 512. In general, the openings 513 are below a midline 515 of each body portion 512 and are angled downwardly away from the midline at an angle α of, for example, but not limited to about, 10 degrees, 15 degrees, and 20 degrees, as well as angles in between. In addition, the openings are equally spaced apart along a length of the mixing bar 510, however, they may also be spaced unequally along the length of the mixing bar 510, have different diameter openings, be angled at different downward angles, as well as various combinations thereof. The downward angle provides a more complete mixing of the sludge provided from the clarification chamber with the wastewater in the anoxic chamber, especially any material that is settled on the bottom of the anoxic chamber.

Figure 6:
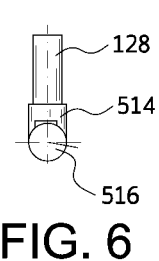
FIG. 6 is an end view of the mixing bar of FIG. 5, in accordance with one or more embodiments of the present invention.

FIG. 6 is an end view of the mixing bar of FIG. 5, in accordance with one or more embodiments of the present invention. In FIG. 6, a front face of the end cap 516 is seen below a top portion of the "T"-shaped junction 514 in which a portion of the sludge return pipe 128 is fixed.

Figure 7:
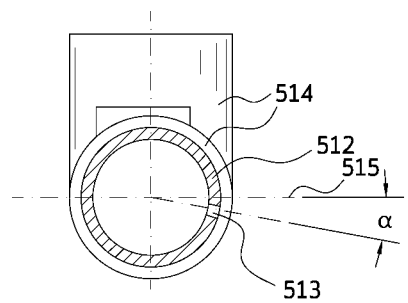
FIG. 7 is a cross-sectional, end view along line E-E of the mixing bar of FIG. 5, in accordance with one or more embodiments of the present invention.

FIG. 7 is a cross-sectional, end view along line E-E of the mixing bar of FIG. 5, in accordance with one or more embodiments of the present invention. In FIG. 7, the downward angled α of the opening 513 below the midline 515 is shown.

Figure 8:
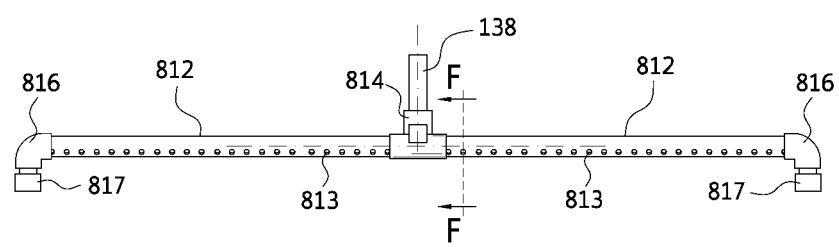
FIG. 8 is a side view of a diffusion bar of a wastewater treatment system tank with a pretreatment chamber, an anoxic chamber, an aeration chamber, a clarification chamber and a polishing chamber, in accordance with one or more embodiments of the present invention.

FIG. 8 is a longitudinal side view of a diffusion bar of a wastewater treatment system tank with a pretreatment chamber, an anoxic chamber, an aeration chamber, a clarification chamber and a polishing chamber, in accordance with one or more embodiments of the present invention. In FIG. 8, a diffusion bar 810, such as, for example the diffusion bar 137 of FIG. 1, includes two substantially equal body portions 812 that are connected together by a "T"-shaped junction 814 at a first end and a second end of each body portion 812 is connected to an elbow joint 816, which is sealed at its other end with an end cap 817. The body portions 812 are made from plastic pipe, the "T"-shaped junction 814, the elbow joints 816 and the end caps 817 are also made from plastic. In general, the mixing bar body portions 812 each have multiple openings 813 with, for example, but not limited to, about 1/16", ⅛", 3/32", and ¼" diameters, as well as diameters in between extending through an exterior wall of and into an inside of each body portion 812. In general, the openings 813 are below a midline 815 of each body portion 512 and equally spaced apart and are angled downwardly below the midline 815 at an angle β of, for example, but not limited to, about 35 degrees, 40 degrees, 45 degrees, 50 degrees, 55 degrees, as well as angles in between. The downward angle of the openings 813 ensures proper aeration of substantially all of the contents of the aeration chamber 130. The openings 813 may also be differently-sized, spaced unequally and/or at a single different uniform and/or multiple different downward angles.

Figure 9:
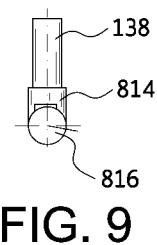
FIG. 9 is an end view of the diffusion bar of FIG. 8, in accordance with one or more embodiments of the present invention.

FIG. 9 is an end view of the diffusion bar of FIG. 8, in accordance with one or more embodiments of the present invention. In FIG. 9, a front surface of the elbow joint 816 is seen below a top portion of the "T"-shaped junction 814 in which a portion of the air supply pipe 138 is fixed.

Figure 10:
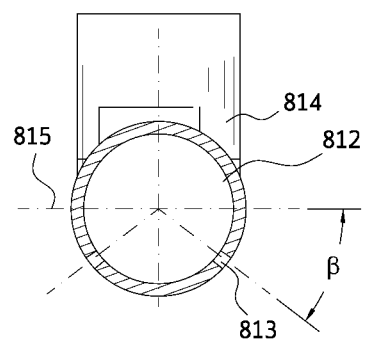
FIG. 10 is a cross-sectional, end view along line F-F of the diffusion bar of FIG. 8, in accordance with one or more embodiments of the present invention.

FIG. 10 is a cross-sectional, end view along line F-F of the diffusion bar of FIG. 8, in accordance with one or more embodiments of the present invention. In FIG. 10, the downward angle β the opening 813 below the midline 815 is shown.

FIG. 11 is a close-up, cross-sectional side view of a flow equalization apparatus in the clarification chamber of FIG. 1, in accordance with one or more embodiments of the present invention. In FIG. 11, a flow equalization apparatus 1100 includes an outer housing or main body 1110, which is made from plastic pipe with a spill tube 1120 having a passageway 1121 and inserted through a side wall of the main body 1110 to provide fluid communication from the clarification chamber 140 to an inside 1111 of the main body 1110. An inner body 1130, which is made from plastic pipe with a sealed bottom end, is affixed to an inside of the main body 1110 that is opposite to the side on which the spill tube 1120 is affixed. The inner body 1130 has a substantially conical flow equalization port 1131 extending through a bottom end of the inner body 1140. The flow equalization port 1131 has an opening on the outside of the bottom end of the inner body 1130 and reduces down inside of the bottom end of the inner body 1130. Located about 5 to 8 inches above the flow equalization port 1131 is a sustained flow port 1133, which has a generally greater outer diameter opening on the outside wall of inner body 1130 and reduces down on the inside of the inner body 1130. A top of the inner body 1130 is open and acts as a peak flow or overflow port 1135. A portion of the bottom of the main body 1110 is cut on a diagonal and covered with a baffle 1150.

FIG. 12 is a cross-sectional, top view along line G-G of the flow equalization apparatus of FIG. 11, in accordance with one or more embodiments of the present invention. In FIG. 12, the positioning of the spill tube 1120 and the inner body 1130 within the main body 1110 is shown.

FIG. 13 is a partially cut away, front view along line H-H of the flow equalization apparatus of FIG. 11, in accordance with one or more embodiments of the present invention. In FIG. 13, the positioning, configurations and sizes of the flow equalization port 1131 and the sustained flow port 1133 of the inner body 1130 are detailed.

FIG. 14 is a cross-sectional, side view of another flow equalization apparatus for use in a clarification chamber, in accordance with one or more other embodiments of the present invention. In FIG. 14 a flow equalization apparatus 1400 is shown to include a substantially rectangular main body 1410 with a front wall 1411, a back wall 1412, a right side wall 1413 and a left side wall (not shown, but see left side wall 1414 in FIG. 15). The top of main body 1410 is open and the bottom portion of the front wall 1411 angles back toward and connects with the back wall 1412. At the bottom of the back wall 1412 a substantially rectangular inlet opening 1416 is located that provides for fluid communication into the inside of the main body 1410. Attached to the back wall 1412 is a substantially square inner body 1420 in which a flow equalization port 1422 is located near the bottom of a front wall 1421 of the inner body 1420. A sustained flow port 1424 is located above the flow equalization port 1422 toward the top of the front wall 1421 of the inner body 1420. A substantially cylindrical outlet pipe 1430 is attached to the back wall 1412 of main body 1410 and is in fluid communication with the inside of the inner body 1420 via an outlet opening 1417 in the back of the inner body 1420 and the back wall 1412.

FIG. 15 is a top view of the flow equalization apparatus of FIG. 14, in accordance with one or more embodiments of the present invention. In FIG. 15, the location of the inner body 1420 on the back wall 1412 is shown as well as its position relative to the front wall 1411, the right side wall 1413 and the left side wall 1414.

FIG. 16 is a front view of the flow equalization apparatus of FIG. 14, in accordance with one or more embodiments of the present invention. In FIG. 16, the positions in the back wall 1412 of the substantially rectangular inlet opening 1416 and the outlet opening 1417 are shown.

FIG. 17 is a detailed cross-sectional, side view of a polishing chamber that can be used in, for example, the system shown in FIG. 1, in accordance with one or more other embodiments of the present invention. In FIG. 17, the polishing chamber 150 includes the finishing treatment system 160, which in FIG. 17 is an Ultra Violet (UV) light disinfection system 160. Although the finishing treatment system 160 in FIG. 17 is the UV light disinfection system 160, in other embodiments it can be a chlorination system with or without a de-chlorination system, a phosphorus removal system, a heavy metal removal system, and/or a nitrogen/nitrate removal system. In FIG. 17, influent treated wastewater 1701 flows through polishing chamber inlet pipe 152 and into influent well 154 and a final effluent 1702 passes out of the polishing chamber 150 via effluent outlet pipe 156. Influent well 154 has two outlet openings 1710 at the bottom of and that pass through opposite influent well side walls to permit fluid communication with two filtration wells 1757 on each side of the polishing chamber 150 (see also FIGS. 18 and 19).

FIG. 18 is a cross-sectional, back view along line I-I of the polishing chamber of FIG. 17, in accordance with one or more embodiments of the present invention. After the influent 1701 passes into each of the filtration wells 1757 it moves up through a porous filtration bed 1810 that is covered with filtration media 163 and the filtered water 1803 that exits the filtration media 163 flows through a spill port 1820 in a side wall of each effluent well 158. The filtered water 1803 is then treated by the finishing treatment system 160 to produce the final effluent 1702 that passes out a polishing chamber outlet pipe 156. The filtration media 163 can include gravel, plastic, rubber, ceramic and closed cell foam (e.g., Styrofoam) filtration elements.

FIG. 19 is a cross-sectional, top view of the polishing chamber of FIG. 17, in accordance with one or more embodiments of the present invention. In FIG. 19, the top of the filtration media 163 can be seen completely occupying the area between the walls of each filtration well 157 to ensure all the water that passes out of each filtration well 157 has been filtered.

Figure 20:
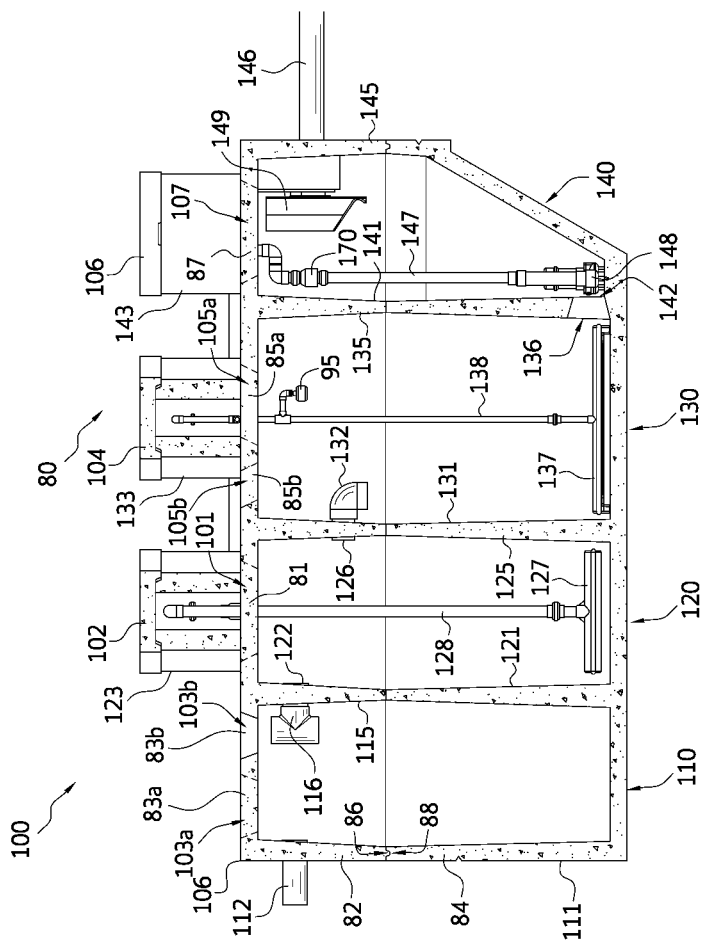
FIG. 20 is a cross-sectional, side perspective view of the wastewater treatment system tank of FIG. 1 without the polishing chamber, in accordance with one or more embodiments of the present invention.

FIG. 20 is a cross-sectional, side perspective view of the wastewater treatment system tank of FIG. 1 without the polishing chamber, in accordance with one or more embodiments of the present invention. In FIG. 20, the first component 80 of FIG. 1 is shown without the second component 90. The first component 80 includes the pretreatment chamber 110, the anoxic chamber 120 in fluid communication with the pretreatment chamber 110, the aeration chamber 130 in fluid communication with the anoxic chamber 120, and the clarification chamber 140 in fluid communication with the aeration chamber 130 and the anoxic chamber 120.

In FIG. 20, the pretreatment chamber 110 has the front wall 111 through which the influent inlet pipe 112 is located in the upper left corner of the front wall 111 and provides access for the incoming flow of wastewater to be treated. The pretreatment chamber 110 also has the back wall 115 through which the outlet pipe 116 is located in the upper right corner of the back wall 115 and permits pretreated wastewater to flow into the anoxic chamber 120. In general, the pretreatment chamber outlet pipe 116 is located at a height that is slightly below the pretreatment chamber influent inlet pipe 112. The anoxic chamber 120 has the front wall 121 through which the inlet pipe 122 is located in the upper right corner of the front wall 121, when viewed from the back wall 125, and provides access for the incoming flow of pretreated wastewater from the pretreatment chamber 110. In fact, the anoxic chamber front wall 121 is also the pretreatment chamber back wall 115 and the anoxic chamber inlet pipe 122 is directly connected to and in fluid communication with the pretreatment chamber outlet pipe 116. The anoxic chamber 120 also has the back wall 125 through which the outlet pipe 126 is located in the upper left corner of the back wall 125, when viewed from the front wall 121, and permits anoxically treated wastewater to flow into the aeration chamber 130. In general, the anoxic chamber outlet pipe 126 is located at a height that is below the anoxic chamber influent inlet pipe 122.

In FIG. 20, the aeration chamber 130 has the front wall 131 through which the inlet pipe 132 is located in the upper right corner of the front wall 131, when viewed from the back wall 135, and provides access for the incoming flow of anoxically treated wastewater from the anoxic chamber 120. In fact, the aeration chamber front wall 131 is also the anoxic chamber back wall 125 and the aeration chamber inlet pipe 132 is directly connected to and in fluid communication with the anoxic chamber outlet pipe 126. The aeration chamber 130 also has a back wall 135 through which an outlet opening 136 is located in a bottom center of the back wall 135 and permits aerated wastewater to flow into the clarification chamber 140. In general, the aeration chamber outlet opening 136 is located at a height that is well below the aeration chamber inlet pipe 132 and permits a back and forth flow of wastewater between the aeration chamber 130 and the clarification chamber 140. The clarification chamber 140 has a front wall 141 through which an inlet opening 142 is located in a bottom center of the clarification chamber front wall 141 and provides access for an incoming flow of aerated wastewater from the aeration chamber 130. In fact, the clarification chamber front wall 141 is also the aeration chamber back wall 135 and the clarification chamber inlet opening 142 is directly connected to and in fluid communication with the aeration chamber outlet opening 136. The clarification chamber 140 also has a back wall 145 through which an outlet pipe 146 is located in a top center of the back wall 145 and permits clarified wastewater to flow out. In general, the clarification chamber outlet pipe 146 is located at a height that is well above the clarification chamber inlet opening 142 and permits a one way flow of wastewater out of the clarification chamber 140.

In FIG. 20, the first component 80 also includes the pretreatment chamber access openings 103a and 103b in the top side 106 of the first component 80. The first component 80 also includes an anoxic chamber access opening 101 in the top side 106 of the first component 80 and on the side opposite the anoxic chamber inlet pipe 122. The anoxic chamber access opening 101 is covered by the anoxic chamber riser section 123 and top 102. Above the first aeration chamber access opening 105a can be mounted the air pump 139 that pumps air to the diffusion bar 137 via riser tube 138 and all are covered by the aeration chamber riser section 133 and top 104. The first component 80 further includes a clarification chamber access opening 107 in the top side 106 of the first component 80 in substantially the center of the clarification chamber 140. The clarification chamber access opening 107 is covered by the clarification chamber riser section 143 and top 106.

Figure 21:
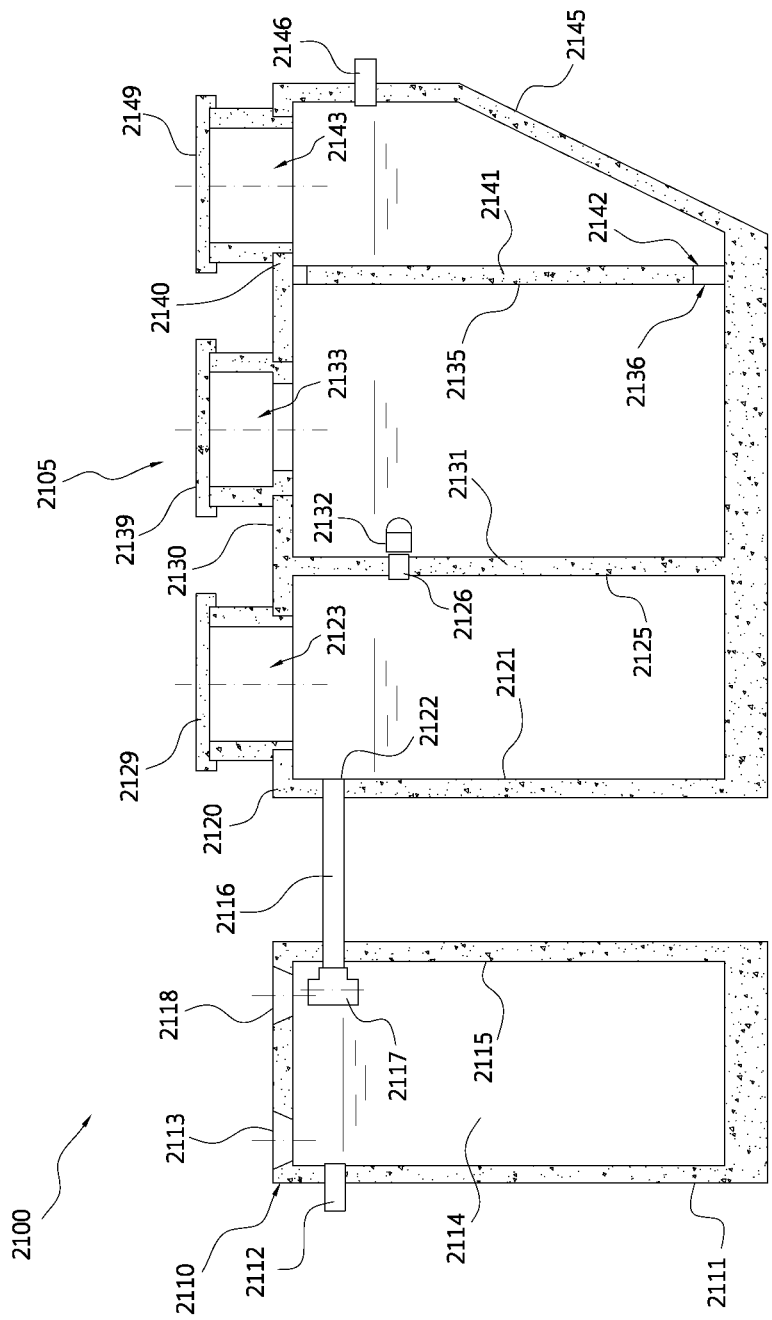
FIG. 21 is a side-perspective view of a wastewater treatment system tank with a pretreatment chamber, an anoxic chamber, an aeration chamber, and a clarification chamber, in accordance with one or more other embodiments of the present invention.

FIG. 21 is a side-perspective view of a wastewater treatment system tank with a pretreatment chamber, an anoxic chamber, an aeration chamber, and a clarification chamber, in accordance with one or more other embodiments of the present invention. In FIG. 21, a wastewater treatment plant 2100 includes a standalone pretreatment chamber 2110 that is connected to and in fluid communication with an anoxic chamber 2120 that is adjacent to and in fluid communication with an aeration chamber 2130 that is adjacent to and in fluid communication with a clarification chamber 2140. The anoxic, aeration and clarification chambers 2120, 2130, 2140 are part of a single treatment component 2105 that is connected to and in fluid communication with the pretreatment chamber via a pretreatment chamber outlet pipe 2116 that extends through a back wall 2115 of the pretreatment chamber 2110 and an anoxic chamber inlet pipe 2122 that extends through a front wall 2121 of the anoxic chamber 2120 and connects to and is in fluid communication with the pretreatment chamber outlet pipe 2116. The end of the pretreatment outlet pipe 2116 has a "T"-shaped intake 2117 that permits pretreated wastewater to enter into the pretreatment chamber outlet pipe 2116 and flow into the anoxic chamber 2120 through the anoxic chamber inlet pipe 2122. The pretreatment chamber 2110 has an inlet pipe 2112 through a front wall 2111 of the pretreatment chamber 2110 through which incoming wastewater flows into an inside 2114 of the pretreatment chamber 2110. The pretreatment chamber 2110 also has a first top access opening 2113 positioned over the end of the pretreatment chamber inlet pipe 2112 and a second top access opening 2118 positioned over the pretreatment outlet pipe 2116 and the "T"-shaped intake 2117. In general, both access openings 2113, 2118 have slightly conical shapes to permit reciprocally-shaped access opening covers (not shown) to seat in and close the openings 2113, 2118.

In FIG. 21, the anoxic chamber 2120 includes an anoxic chamber outlet pipe 2126 in a back wall 2125 of the anoxic chamber 2120 that is connected to and in fluid communication with an aeration chamber inlet pipe 2132 in a front wall 2131 of the aeration chamber 2130 and the anoxic chamber outlet pipe 2126 is positioned below the anoxic chamber inlet pipe 2122. The anoxic chamber 2120 has a top access opening 2123 located in a top wall of the anoxic chamber 2120 and that is located above the anoxic chamber inlet pipe 2122 and covered by an anoxic chamber riser 2129.

In FIG. 21, the aeration chamber 2130 includes an aeration chamber outlet opening 2136 in a back wall 2135 of the aeration chamber 2130 that is connected to and in fluid communication with clarification chamber inlet opening 2142 in a front wall 2141 of the clarification chamber 2140 and the aeration chamber outlet opening 2136 is positioned below the aeration chamber inlet pipe 2132. In fact, the aeration chamber outlet opening 2136 is located at the bottom of the back wall 2135 of the aeration chamber 2130. The aeration chamber 2130 has a top access opening 2133 located in a top wall of the aeration chamber 2130 and that is located in the top wall of the aeration chamber 2130 on the side opposite of the aeration chamber inlet pipe 2132 and covered by an aeration chamber riser 2139.

Figure 22:
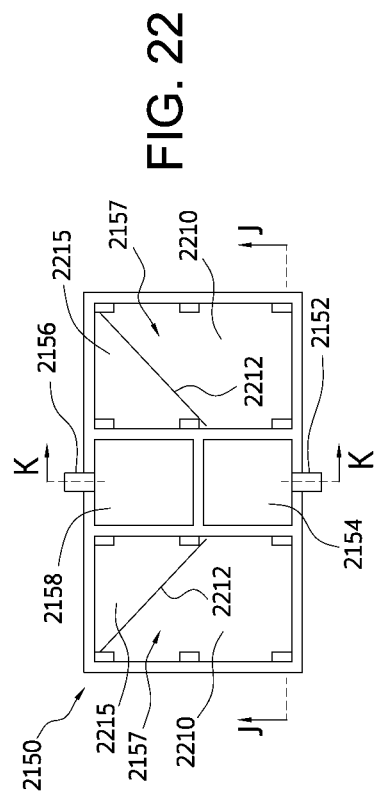
FIG. 22 is a plan view of a polishing chamber for the wastewater treatment system tank with a pretreatment chamber, an anoxic chamber, an aeration chamber, and a clarification chamber of FIG. 21, in accordance with the one or more other embodiments of the present invention.

In FIG. 21, the clarification chamber 2140 includes an clarification chamber outlet opening 2146 in a back wall 2145 of the clarification chamber 2140 that is connected to and in fluid communication with either a drain field feeder pipe (not shown), a wastewater storage tank (not show) and/or a polishing chamber (see FIG. 22). The clarification chamber 2140 also includes a clarification chamber inlet opening 2142 in a front wall 2141 of the clarification chamber 2140 and the clarification chamber outlet opening 2146 is positioned above the clarification chamber inlet opening 2142. The clarification chamber 2140 has a top access opening 2143 located in a top wall of the clarification chamber 2140 and that is located in the top wall of the clarification chamber 2140 in substantially a center of the top wall of the clarification chamber 2140 and above the clarification chamber outlet pipe 2146 and is covered by a clarification chamber riser 2149.

The wastewater treatment system tank of FIG. 21 can be constructed using concrete and/or a molded plastic. Although not explicitly shown in FIG. 21, the positioning of the inlet and outlet pipes and openings is essentially the same as the positions shown in FIG. 2 for the similar elements. One or more of the various embodiments of the wastewater treatment system 2100 can include up to a 1,500 gallon per day ("gpd") plant.

FIG. 22 is a plan view of a polishing chamber for the wastewater treatment system tank with a pretreatment chamber, an anoxic chamber, an aeration chamber, and a clarification chamber of FIG. 21, in accordance with the one or more other embodiments of the present invention. In FIG. 22, a polishing chamber 2150 is shown as a separate system/component that can be connected to and in fluid communication with the clarification chamber 2140 via the clarification chamber outlet pipe 2146 of FIG. 21 which connects to and is in fluid communication with a polishing chamber inlet pipe 2152 in a front wall 2151 of the polishing chamber 2150 of FIG. 22. The clarification chamber inlet pipe 2152 is located in a top center of the polishing chamber front wall 2151 and provides access for an incoming flow of clarified wastewater from the clarification chamber 2140 into an influent well 2154. The polishing chamber 2150 also has a back wall 2155 through which an effluent outlet pipe 156 is located in a top center of the back wall 2155 and permits fully treated wastewater to flow out of an effluent well 2158. In general, the polishing chamber outlet pipe 2156 is located at a height that is below the polishing chamber inlet opening 2152 and permits a one way flow of wastewater from the clarification chamber 2140 into and out of the polishing chamber 2150. In each filtration well 2157 there is a two-piece angled floor with a front angled piece 2210 that is raised at an outside front corner and angles downwardly toward a joint 2212 and a back angled piece 2215 that is raised at a diagonally opposite back corner and likewise angles downwardly to the joint 2212.

One or more of the various embodiments of the wastewater treatment system 2100 in FIG. 22 can include up to a 1,500 gpd plant.

Figure 23:
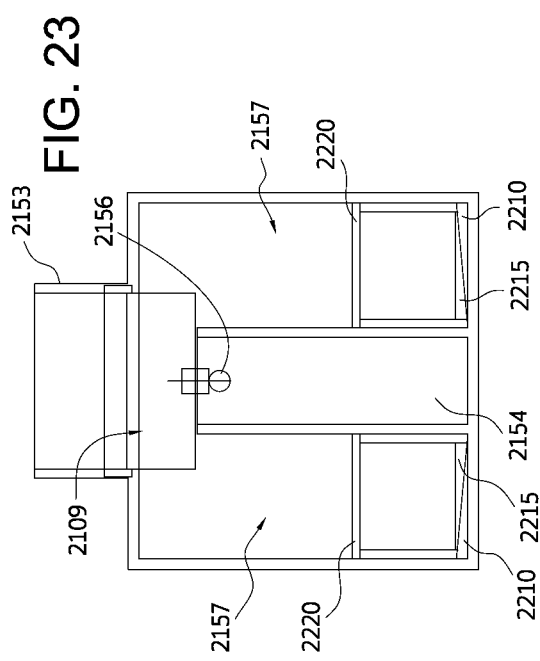
FIG. 23 is a cross-sectional, side view along line J-J of polishing chamber of FIG. 22, in accordance with the one or more other embodiments of the present invention.

FIG. 23 is a cross-sectional, side view along line J-J of polishing chamber of FIG. 22, in accordance with the one or more other embodiments of the present invention. In FIG. 23, a riser 2153 is seen to have a rectangular shape that covers polishing chamber access opening 2109, both of which extend across a portion of each filtration well 2157, the influent well 2154 and the effluent well 2158. A porous filtration bed 2220 similar to the porous filtration bed 1810 in FIG. 18 is located about one-third of the way up each filtration well 2157 in FIG. 23 and is used to support a depth of a filtration media (not shown) such as for example, gravel, plastic, rubber, ceramic, and/or Styrofoam filtration media elements (not shown here, but see, the filtration media 163 in FIGS. 1 and 17-19).

Figure 24:
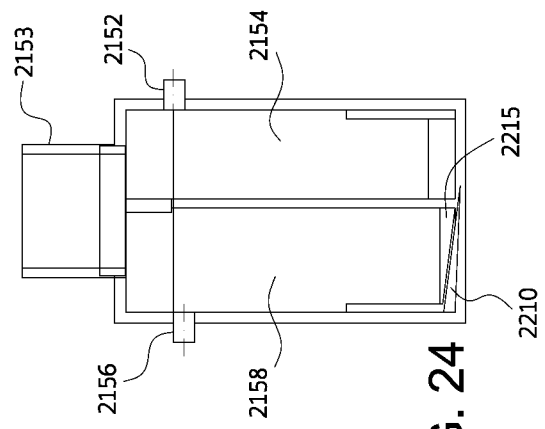
FIG. 24 is a cross-sectional, side view along line K-K of polishing chamber of FIG. 22, in accordance with the one or more other embodiments of the present invention.

FIG. 24 is a cross-sectional, side view along line K-K of polishing chamber of FIG. 22, in accordance with the one or more other embodiments of the present invention.

FIG. 25 is a top view of a wastewater treatment system tank with a pretreatment chamber, an anoxic chamber, an aeration chamber, and a clarification chamber, all with risers, in accordance with an another one or more embodiments of the present invention. In FIG. 25, a four chamber wastewater plant 2500 includes four separate chambers, a pretreatment chamber 2510, an anoxic chamber 2520, an aeration chamber 2530 and a clarification chamber 2540, that are either directly connected together or connected to and in fluid communication via one or more pipes and/or openings. Each chamber has a substantially ellipsoid shape with a portion of the bottom being generally flat. The design and construction of each chamber can be of, for example, a plastic material, both with and without ribs. For example, an embodiment having ribs can be constructed similar to the system disclosed in U.S. Pat. No. 8,137,544 ("the '544 patent") to the inventor of this application, the entire disclosure of which is hereby incorporated in its entirety. Specifically, the pretreatment chamber 2510 is separate from but connected to and in fluid communication with the anoxic chamber 2520 via a pretreatment chamber outlet pipe 2516 that exits the pretreatment chamber 2510 near a top of a first side wall 2515 and that connects to an anoxic chamber inlet pipe 2522 that enters an inside 2524 of the anoxic chamber 2520 near a top of a first side wall 2521. The pretreatment chamber 2510 also has an inlet pipe 2512 that enters through a second side wall 2511 into an inside 2514 of the pretreatment chamber 2510 that is opposite the first side wall 2515 to receive influent wastewater and a pretreatment chamber riser 2513 and a pretreatment chamber riser lid 2502 covering an access opening 2503 in a top of the pretreatment chamber 2510. In the embodiment in FIG. 25, the anoxic, aeration and clarification chambers 2520, 2530, 2540 are directly connected to each other to form a multi-chamber unit.

In FIGS. 25 and 26, the anoxic chamber 2520 has an outlet pipe 2526 that exits through a back wall 2525 of the anoxic chamber and the outlet pipe 2526 is directly connected to and in fluid communication with an aeration chamber inlet pipe 2532 that enters through an aeration chamber front wall 2531 to receive anoxically treated wastewater from the anoxic chamber 2520 and an anoxic chamber riser 2523 and an anoxic chamber riser lid 2504 covering an anoxic chamber access opening 2505 in a top of the anoxic chamber 2530. A mixing bar 2527 is seen in broken line inside of the anoxic chamber 2520 and connected to a pump 2548 in the clarification chamber. Details on the diffusion bar design and operation are provided herein in relation to FIGS. 5-7 and 33.

In FIG. 25, the aeration chamber 2530 has an outlet opening 2536 that exits through a bottom of a back wall 2535 of the aeration chamber and that is directly connected to and in fluid communication with a clarification chamber inlet opening 2542 that enters through a clarification chamber front wall 2541 to receive aerated wastewater from the aeration chamber 2530 and an aeration chamber riser 2533 and an aeration chamber riser lid 2506 covering an aeration chamber access opening 2507 in a top of the aeration chamber 2530. An air diffusion bar 2537 is seen in broken line inside of the aeration chamber 2530 and connected to an air pump 2539. Details on the diffusion bar design are provided herein in relation to FIGS. 8-10 and 34.

In FIG. 25, the clarification chamber 2540 has an outlet pipe 2546 that exits through a top half of a back wall 2545 of the clarification chamber 2540 and that is directly connected to and in fluid communication with either an optional polishing chamber (not shown, but see FIGS. 17 to 19 and 22 to 24 and their related description herein) or a final disposal location. For example, the final disposal location could include a final holding tank and/or a drain field (not shown). A flow equalization apparatus 2549 is located on an intake end of the outlet pipe 2546 to control the amount and rate of the outflow of the treated wastewater. Embodiments of the possible designs of the flow equalization apparatus 2549 are shown and described in relation to FIGS. 14 to 16, 11 to 12, 31 and 32. The clarification chamber 2540 also includes a clarification chamber riser 2543 and a clarification chamber riser lid 2508 covering a clarification chamber access opening 2509 in a top of the clarification chamber 2540. The clarification chamber 2540 further includes a sludge return system that is connected to and in fluid communication with the mixing bar 2527 in the anoxic chamber 2520 via plastic pipe, for example, but not limited to, a first lateral pipe 2560 extending from the clarification chamber access opening 2509 and connected to a first end of a first elbow 2562, a longitudinal pipe 2564 connected to a second end of the first elbow 2562 and extending back toward the anoxic chamber 2520 and connecting to a first end of a second elbow 2566, and a second lateral pipe 2568 extending toward the anoxic chamber access opening 2505 and connecting to a second end of the second elbow 2566. The sludge pump 2545 is located in a bottom of the clarification chamber 2540 adjacent to the clarification chamber inlet opening 2542 and, when operated, pumps sludge, other sediment and settled wastewater up through a clarification sludge return pipe 2547 (see FIG. 26), the first lateral pipe 2560, the longitudinal pipe 2564, the second lateral pipe 2568, and an anoxic sludge return pipe 2528 (see FIG. 26) to the mixing bar 2527 in the anoxic chamber 2520.

FIG. 26 is a cross-sectional, side view along line L-L of the wastewater treatment system tank with a pretreatment chamber, an anoxic chamber, an aeration chamber, and a clarification chamber of FIG. 25, showing the risers on each chamber, in accordance with the another one or more embodiments of the present invention. In FIG. 26, the positions of the recirculation pump 2548 and a check valve 2670 in the clarification chamber 2540, the position of the mixing bar 2527 in the anoxic chamber 2520, and the position of the diffusion bar 2537 in the aeration chamber 2530 are clearly illustrated.

FIG. 27 is a cross-sectional, side view along line M-M of the pretreatment chamber of the wastewater treatment system tank of FIG. 25, in accordance with the another one or more embodiments of the present invention. In FIG. 27, a center line 2710 of the pretreatment chamber inlet pipe 2512 is positioned above a center line 2712 of the pretreatment chamber outlet pipe 2516.

FIG. 28 is a cross-sectional, side view along line N-N of the anoxic chamber of the wastewater treatment system tank of FIG. 25, in accordance with the another, one or more embodiments of the present invention. In FIG. 28, the anoxic chamber inlet pipe 2522 is shown to be at approximately the same height as the pretreatment chamber outlet pipe 2516 of FIG. 27. Returning to FIG. 28, the mixing bar 2527 is shown to be located adjacent to the bottom of the anoxic chamber 2520 and below the end of anoxic chamber inlet pipe 2522 located in the inside 2524 of the anoxic chamber 2520.

FIG. 29 is a cross-sectional, side view along line O-O of the aeration chamber of the wastewater treatment system tank of FIG. 25, in accordance with the another one or more embodiments of the present invention. In FIG. 29, the diffusion bar 2537 is shown to be located adjacent to the bottom of the aeration chamber 2530 and, although not illustrated in FIG. 29, it is also below the end of aeration chamber inlet pipe 2532 located in the inside 2534 of the aeration chamber 2530. Also illustrated in FIG. 29 is the location of the aeration chamber outlet opening 2536 through the back wall 2535 and adjacent the bottom of the aeration chamber 2530.

FIG. 30 is a cross-sectional, side view along line P-P of the clarification chamber of the wastewater treatment system tank of FIG. 25, in accordance with the another one or more embodiments of the present invention. In FIG. 30, the location of the recirculation pump 2548 in the inside 2544 and adjacent the bottom of the clarification chamber 2540 and the sludge return pipe 2547 extending upwardly from the sludge return pump 2548 to and the check valve 2670 are clearly illustrated.

FIG. 31 is a cross-sectional, side view of a flow equalization apparatus, in accordance with yet another, one or more embodiments of the present invention. In FIG. 31, a flow equalization apparatus 3100. In FIG. 31, a flow equalization apparatus 3100 includes an outer housing or main body 3110, which is made from molded plastic to form a "U" shape with an open top and bottom ends, with an outer vertical rib 3112 and an inner vertical rib 3114 located on the outer vertical edges of the ends of the "U". The main body 3110 has an open bottom 3120 to provide fluid communication from the clarification chamber 2540 to an inside 3111 of the main body 3110. An inner body 3130, which is a substantially closed rectangular portion made from molded plastic with a width of about 4½ inches and a depth of about 1¾ inches and with an open top end and a closed bottom end and an inside 3131, is affixed to the main body 3110 using the vertical ribs 3112, 3114 and a reciprocally-shaped vertical groove 3132 in each side of the inner body 3130 into which the outer vertical rib 3112 is removably positioned and the inner vertical rib 3114 rests against a front wall 3136 of the inner body. The inner body 3130 has an outlet pipe 3140 connected through a back wall of the inner body 3130 and in fluid communication with the inside 3131 of the inner body 3130 to permit clarified wastewater to drain from the inside 3131 of the inner body 3130. The inner body 3130 has a substantially conical flow equalization port 3135 extending through the bottom end of the front wall 3136 of the inner body 3130. The flow equalization port 3135 has a generally greater diameter opening on the outside of the bottom end of the inner body 3130 and reduces down on the inside of the bottom end of the inner body 3130. Located above the flow equalization port 3135 is a sustained flow port 3133, which has a generally greater diameter opening on the outside wall of inner body 3130 and reduces down on the inside of the inner body 3130. The two ports 3133, 3135 are similar to the structure shown in FIG. 13. Returning to FIG. 31, a downwardly depending flange 3134 extends downwardly from the bottom edge of the inner body 3130 closest to the main body 3110 and toward the main body 3110 and partially obstructs the open bottom 3120 of the main body 3110. This flange 3134 serves to reduce the amount of solids that enter into the interior 3111 of the main body 3110, which helps reduce clogging of the flow equalization port 3135 and the sustained flow port 3133. An overflow port 3137 is formed by an open top of the inner body 3120 as defined by a top of the front wall 3136, which is below the height of a back wall 3138. Although not shown, an optional screen, a mesh or a filter element may be positioned to cover the flow equalization, sustained and overflow ports to provide further filtration of the wastewater. Examples of the types of mesh, screen, or filter, as well as alternative flow equalization apparatus designs, that may be used are described in U.S. Pat. No. 5,413,706 issued on May 9, 1995, and U.S. Pat. No. 7,674,372, also issued to Jan D. Graves, but on Mar. 9, 2010, both of which are incorporated herein in their entireties. As shown in the '706 and '372 patents, the mesh can be a single layer having a single density as well as two or more layers with different densities.

FIG. 32A is an exploded, cross-sectional, side view of the flow equalization apparatus of FIG. 31, in accordance with the yet another one or more embodiments of the present invention.

Figure 33:
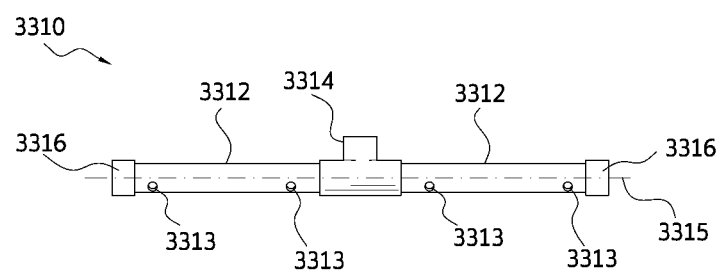
FIG. 33 is a longitudinal side view of a mixing bar of a wastewater treatment system tank with a pretreatment chamber, an anoxic chamber, an aeration chamber, a clarification chamber and a polishing chamber, in accordance with yet other one or more embodiments of the present invention.

FIG. 33 is a longitudinal side view of a mixing bar of a wastewater treatment system tank with a pretreatment chamber, an anoxic chamber, an aeration chamber, a clarification chamber and a polishing chamber, in accordance with yet another, one or more embodiments of the present invention. In FIG. 33, a mixing bar 3310, such as, for example the mixing bar 2527 of FIG. 25 includes two substantially equal body portions 3312 that are connected together by a "T"-shaped junction 3314 at a first end and a second end of each body portion 3312 is sealed with an end cap 3316. The body portions 3312 are made from plastic pipe, the "T"-shaped junction 3314 and the end caps 3316 are also made from plastic. In general, the mixing bar 3310 has multiple openings 3313 extending through an exterior wall of and into an inside of each body portion 3312. The openings can range in size from about ⅜" to ¾" diameter. In general, the openings 3313 are below a midline 3315 of each body portion 3312 and are angled downwardly at about 10 to 25 degrees below the midline 3315 to maximize the mixing effect of the pumped in sludge from the clarification chamber with the sediment in the anoxic chamber. In the embodiment in FIG. 33, four ½" openings 3313 are shown with one adjacent each end of each body portion 3312 with a downward angle of about 15 degrees. In addition, the openings 3313 can be equally or alternatively spaced apart along a length of the mixing bar 3310.

Figure 34:
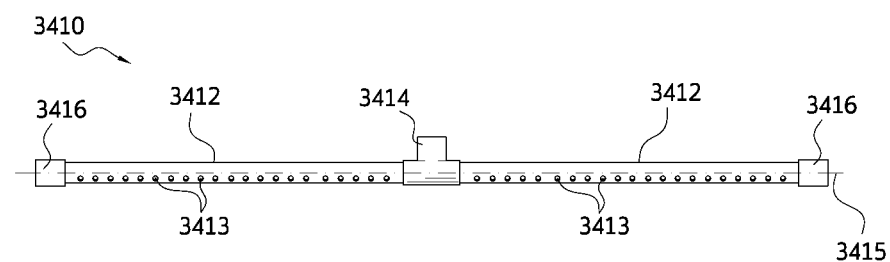
FIG. 34 is a side view of a diffusion bar of a wastewater treatment system tank with a pretreatment chamber, an anoxic chamber, an aeration chamber, a clarification chamber and a polishing chamber, in accordance with yet other one or more embodiments of the present invention.

FIG. 34 is a side view of a diffusion bar of a wastewater treatment system tank with a pretreatment chamber, an anoxic chamber, an aeration chamber, a clarification chamber and a polishing chamber, in accordance with yet another, one or more embodiments of the present invention. In FIG. 34, a diffusion bar 3410, such as, for example the diffusion bar 2537 of FIG. 25, includes two substantially equal body portions 3412 that are connected together by a "T"-shaped junction 3414 at a first end and a second end of each body portion 3412 is connected to an end cap 3416. The body portions 3412 are made from plastic pipe, the "T"-shaped junction 3414 and the end caps 3417 are also made from plastic, for example, PVC, however, other materials, for example, nylon and HDPE can also be used. In general, the diffusion bar 3410 has multiple openings 3413 extending through an exterior wall of and into an inside of each body portion 3412. The openings 3413 can range in size from about 1/16" to 3/16" diameter. In general, the openings 3413 are below a midline 3415 of each body portion 3412 and are angled downwardly at about between 35 degrees and 55 degrees below the midline 3415. In addition, the openings are equally spaced apart along a length of each body portion 3412 to achieve uniform airflow into the aeration chamber 3420. In the embodiment in FIG. 34, the multiple openings 3413 each have a 3/32" diameter opening and are angled downwardly below the midline 3415 at about 45 degrees. In other embodiments the openings 3413 can be of various different sizes as well as being oriented at different downward angles.

Figure 35:
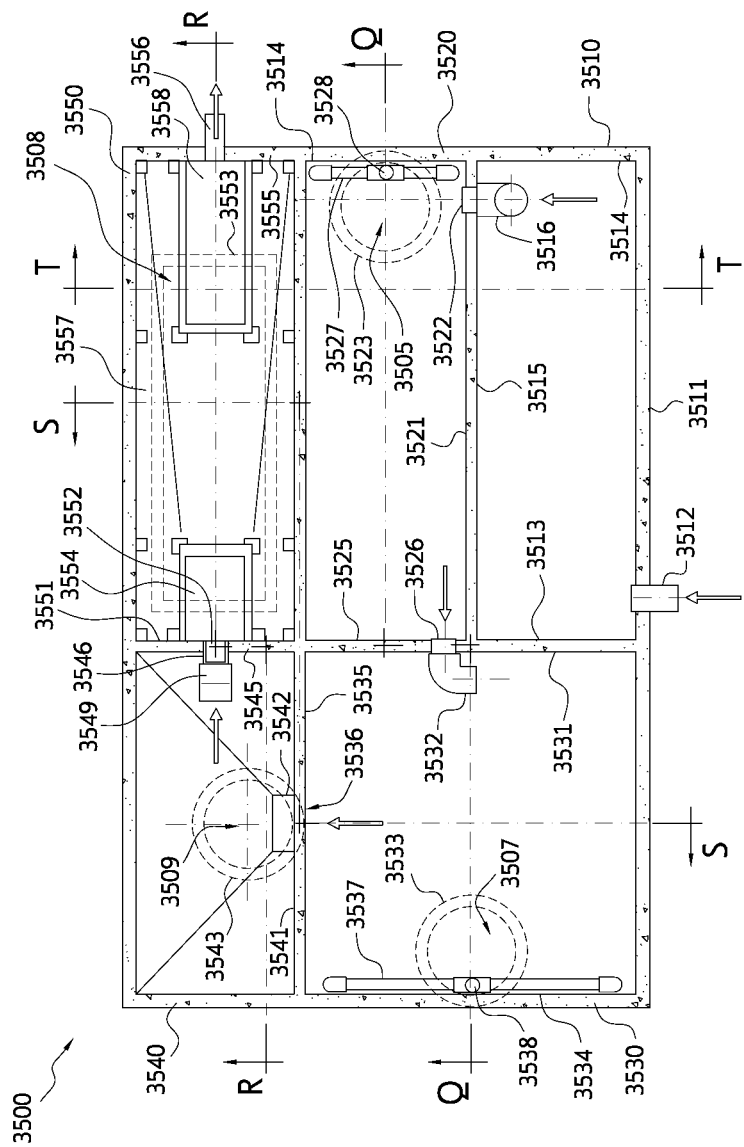
FIG. 35 is a plan view of a single unit wastewater treatment system tank with a pretreatment chamber, an anoxic chamber, an aeration chamber, a clarification chamber and a polishing chamber, in accordance with the another one or more embodiments of the present invention.

FIG. 35 is a plan view of a single unit wastewater treatment system tank with a pretreatment chamber 3510, an anoxic chamber 3520, an aeration chamber 3530, a clarification chamber 3540 and a polishing chamber 3550, in accordance with still another, one or more embodiments of the present invention. In FIG. 35, a single unit wastewater treatment system tank 3500 includes five separate chambers. First in the lower right corner of the tank 3500 is located a pretreatment chamber 3510 with an inlet pipe 3512 extending through a first pretreatment chamber longitudinal wall 3511 adjacent a left wall 3513 to permit the passage of wastewater into the pretreatment chamber. A pretreatment outlet pipe 3516 extends through a second pretreatment chamber longitudinal wall 3515 adjacent a right wall 3514 and connects to and is in fluid communication with an anoxic chamber inlet pipe 3522 in and extending through a first anoxic chamber longitudinal wall 3521. Below the anoxic chamber inlet pipe 3522 and adjacent the bottom of the right wall 3514 of the anoxic chamber 3520 is located a mixing bar 3527 that, although not shown, is in fluid communication with the clarification chamber 3540 via a sludge return pipe 3528. Above the mixing bar 3527 is located an anoxic chamber access opening 3505 in a top of the tank and the anoxic chamber access opening 3505 is covered by an anoxic chamber riser 3523 (shown in broken line). At the opposite end of the anoxic chamber 3520 is an anoxic chamber outlet pipe 3526 that extends through a left anoxic chamber wall 3525 adjacent the first anoxic chamber longitudinal wall 3521 and connects to and is in fluid communication with an aeration chamber inlet pipe 3532 in and extending through a right aeration chamber wall 3531.

In FIG. 35, the aeration chamber inlet pipe 3532 has an elbow shape and is substantially almost horizontal to the bottom of the tank 3500, but with a slight downward tilt to aid in the flow of anoxically treated wastewater into the aeration chamber 3530. On an opposite left aeration chamber wall 3534 a diffusion bar 3537 is located adjacent a bottom of the left aeration chamber wall 3534 and is in fluid communication with an air pump (not shown, but see, for example, air pump 139 in FIG. 2 via an air supply pipe 3538. Above the diffusion bar 3537 is located an aeration chamber access opening 3507 in a top of the tank and the aeration chamber access opening 3507 is covered by an aeration chamber riser 3533 (shown in broken line). An aeration chamber outlet opening 3536 is located in a bottom center of and extends through a first longitudinal wall 3535 and connects to and is in fluid communication with a clarification chamber inlet opening 3542 that is located in a bottom center of a first clarification chamber longitudinal wall 3541. Above the clarification chamber inlet opening 3542 is located a clarification chamber access opening 3509 in a top of the tank and the clarification chamber access opening 3509 is covered by an clarification chamber riser 3543 (shown in broken line). A clarification chamber outlet pipe 3546 is located adjacent a top of and extends through a first right wall 3545 and connects to and is in fluid communication with a polishing chamber inlet opening 3552 that is adjacent a top of and extends through a left wall 3551 and into an influent well 3554. Attached to a front of the clarification chamber outlet pipe 3546 is a flow equalization apparatus 3549, which in this embodiment includes the flow equalization apparatus design shown and described herein in relation to FIGS. 31 and 32. In addition, the other flow equalization apparatus designs shown and described herein can also be used.

In FIG. 35, and adjacent and surrounding the influent well 3554 on three sides is a filtration well 3557. Unlike prior designs of the polishing chamber, in polishing chamber 3550 the influent well 3554 and the effluent well 3558 are not immediately adjacent to each other. In addition, the filtration well 3557 is a single well that extends from end to end of the polishing chamber 3550 and between the influent well 3554 and the effluent well 3558 and not two separate wells as seen, for example, in FIGS. 2 and 19. Above part of the influent well 3554, a filtration well 3557 and an effluent well 3558 is located a polishing chamber access opening 3508 in a top of the tank and the polishing chamber access opening 3508 is covered by a polishing chamber riser 3553 (shown in broken line). A polishing chamber outlet pipe 3556 extends from the effluent well 3558 through a right wall 3555 to permit the discharge of a final treated wastewater effluent.

Figure 36:
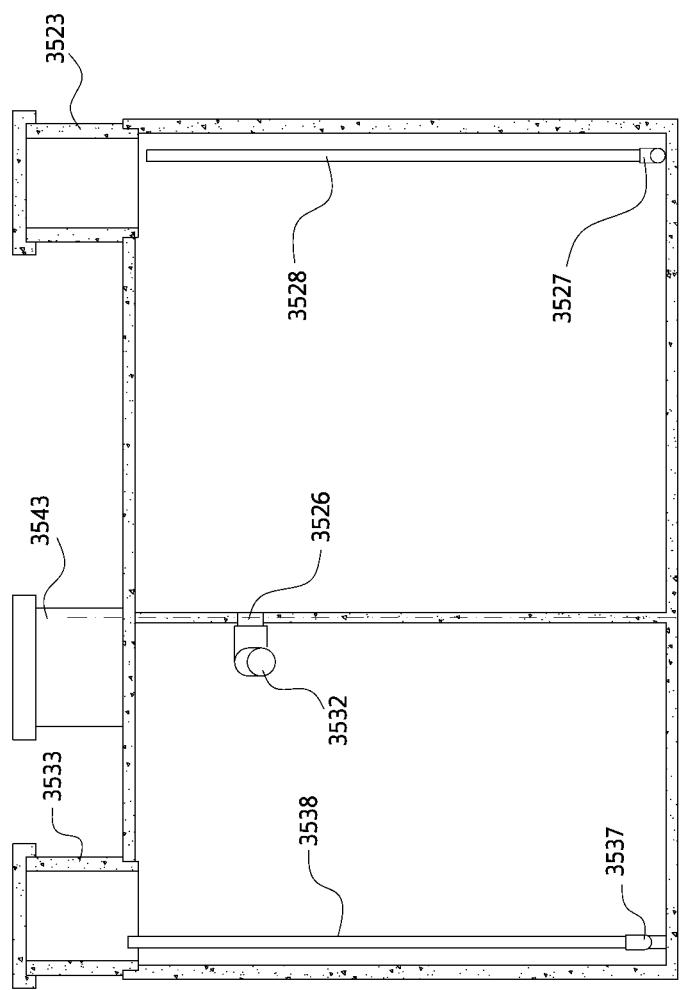
FIG. 36 is a cross-sectional, side view along line Q-Q of the aeration and anoxic chambers of the wastewater treatment system tank of FIG. 35, in accordance with the another one or more embodiments of the present invention.

FIG. 36 is a cross-sectional, side view along line Q-Q of the aeration and anoxic chambers of the wastewater treatment system tank of FIG. 35, in accordance with the still another one or more embodiments of the present invention. In FIG. 36, the downward tilt of the aeration chamber inlet pipe 3532 is illustrated.

Figure 37:
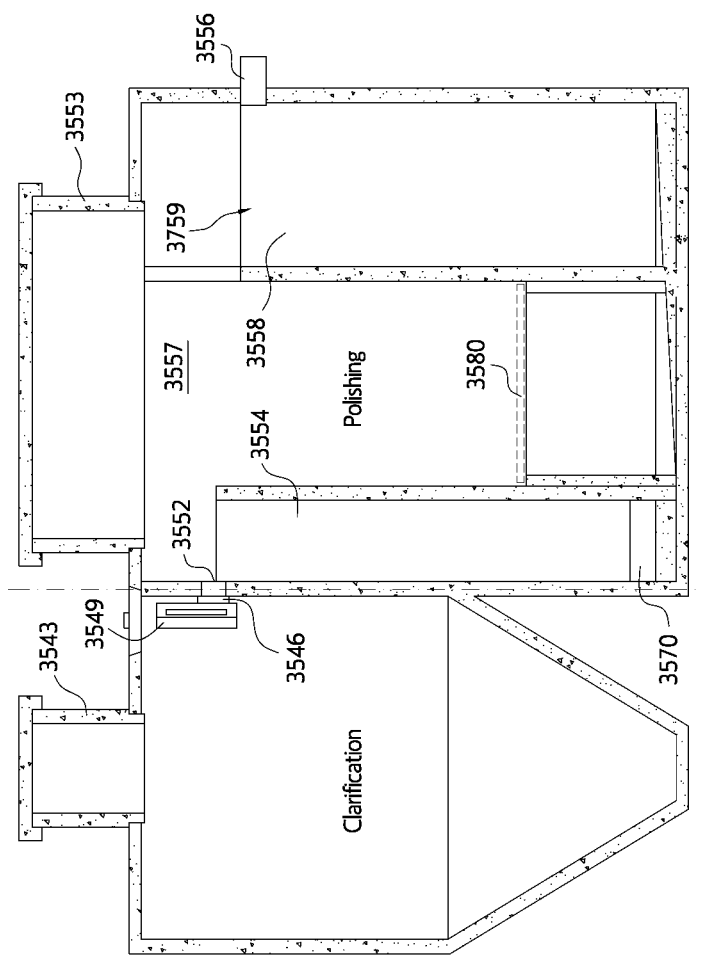
FIG. 37 is a cross-sectional, side view along line R-R of the clarification and polishing chambers of the wastewater treatment system tank of FIG. 35, in accordance with the another one or more embodiments of the present invention.

FIG. 37 is a cross-sectional, side view along line R-R of the clarification and polishing chambers of the wastewater treatment system tank of FIG. 35, in accordance with the still another one or more embodiments of the present invention. In FIG. 37, the polishing chamber inlet opening 3552 opens into a top end of the influent well 3554, and the influent well 3554 has openings 3570 at the bottom and on each side to permit the flow of water from the influent well 3554 into the filtration well 3557. A porous filtration bed 3580 is shown on which a plurality of filtration media (not shown) are placed to filter the water as it rises up in the filtration well 3557 and spills over an opening 3759 in a top of and into the effluent well 3558.

Figure 38:
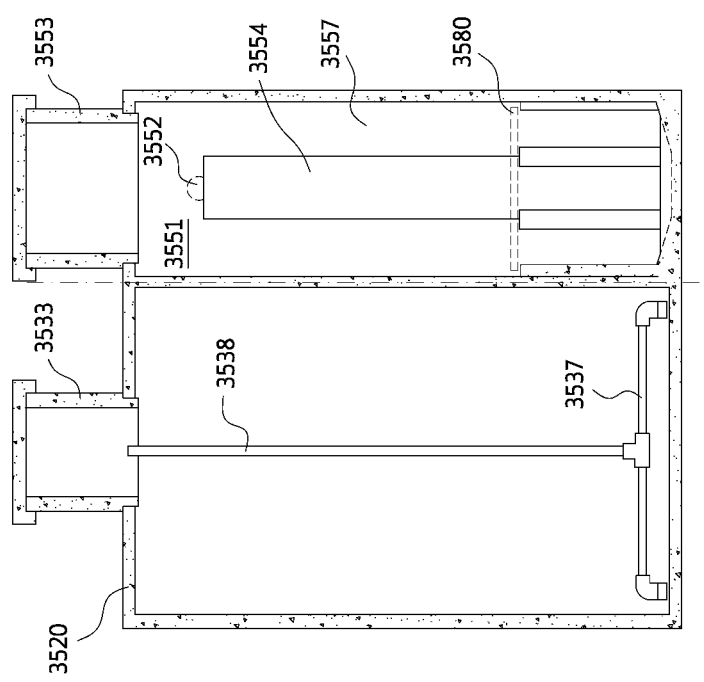
FIG. 38 is a cross-sectional, side view along line S-S of the aeration and polishing chambers of the wastewater treatment system tank of FIG. 35, in accordance with another one or more embodiments of the present invention.

FIG. 38 is a cross-sectional, side view along line S-S of the aeration and polishing chambers of the wastewater treatment system tank of FIG. 35, in accordance with the still another one or more embodiments of the present invention. In FIG. 38, the polishing chamber inlet pipe 3552 is shown positioned in polishing chamber left wall 3551 *t* partially above the top of the influent well 3554. The diffusion bar 3557 and air supply pipe 3538 are shown in the aeration chamber 3520.

Figure 39:
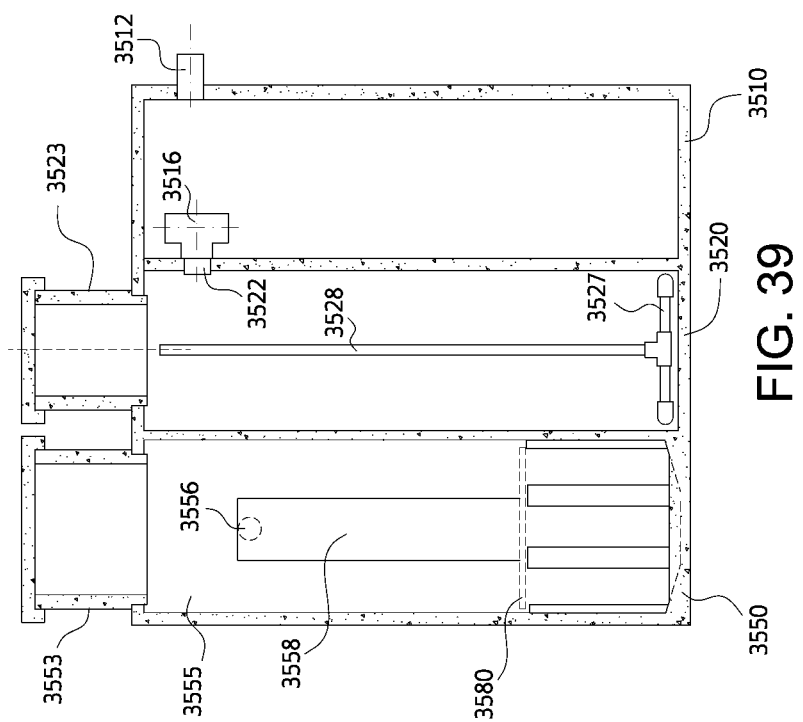
FIG. 39 is a cross-sectional, side view along line T-T of the pretreatment, anoxic and polishing chambers of the wastewater treatment system tank of FIG. 31, in accordance with the another one or more embodiments of the present invention.

FIG. 39 is a cross-sectional, side view along line T-T of the pretreatment, anoxic and polishing chambers of the wastewater treatment system tank of FIG. 35, in accordance with the another one or more embodiments of the present invention. In FIG. 39, the polishing chamber outlet pipe 3556 is shown positioned in the polishing chamber 3550 left wall 3555 to be below the top of the effluent well 3558.

Figure 40:
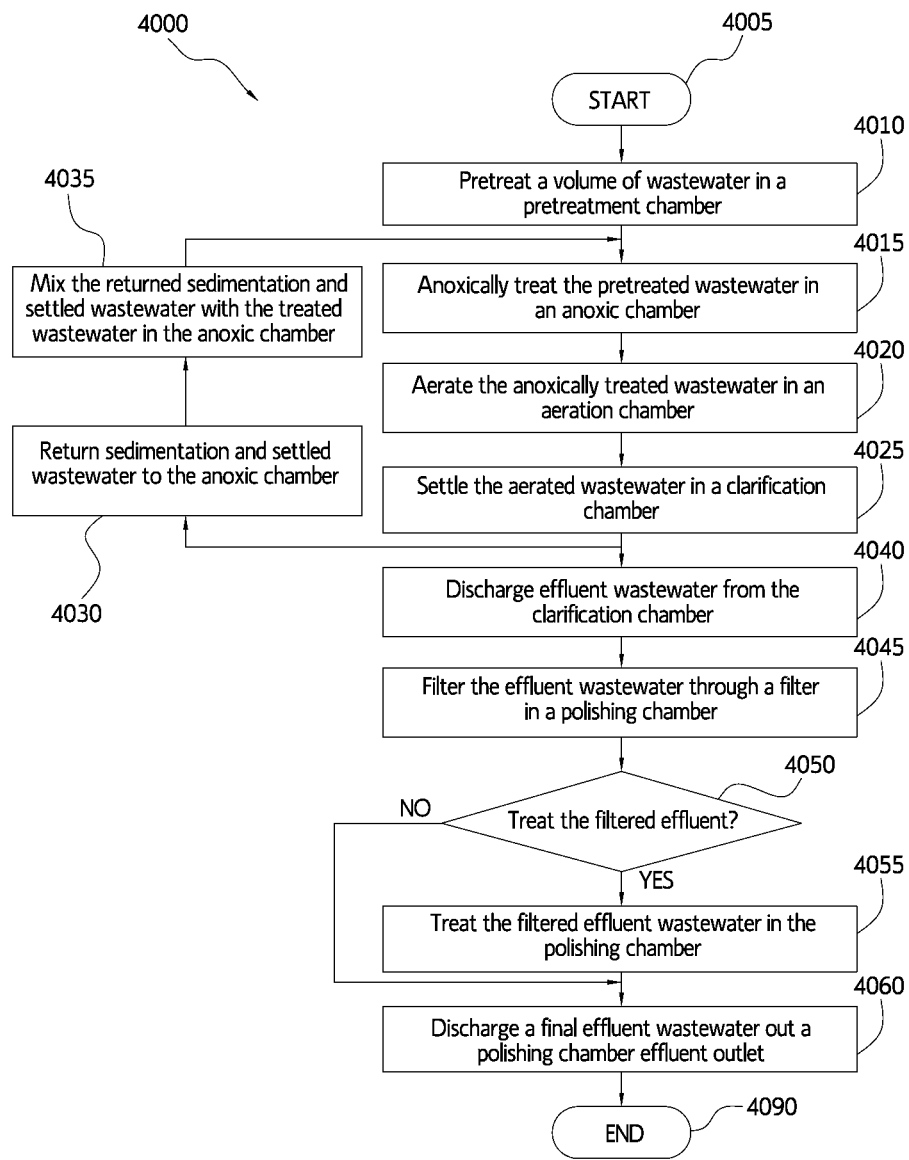
FIG. 40 is flow chart of the method of operation of a wastewater treatment system tank with a pretreatment chamber, an anoxic chamber, an aeration chamber, a clarification chamber and a polishing chamber, in accordance with one or more of the many embodiments of the present invention.

FIG. 40 is flow chart of the method of operation of a wastewater treatment system tank with a pretreatment chamber, an anoxic chamber, an aeration chamber, a clarification chamber and a polishing chamber, in accordance with one or more of the many embodiments of the present invention. In FIG. 40, the method starts (4005) with the receipt of an influent wastewater volume into a pretreatment chamber. The system pretreats (4010) the volume of wastewater contained in the pretreatment chamber and as the level of pretreated waste water rises to the required level, it spills into an anoxic chamber. The system then anoxically treats (4015) the wastewater in the anoxic chamber and as the level of anoxically treated waste water rises to the required level, it spills into an aeration chamber. The system then aerates (4020) the wastewater in the aeration chamber and the aerated waste water passes into a clarification chamber where the aerated wastewater is settled (4025). As the wastewater is settling (4025), some of the sedimentation and settled wastewater is returned (4030) to the anoxic chamber to be mixed (4035) with the treated wastewater in the anoxic chamber and then further anoxically treated (4015), aerated (4020) and settled (4025). The wastewater that floats to the top of the clarification chamber is discharged (4040) from the clarification chamber, in general, by passing through a flow equalization apparatus, and into a polishing chamber. In the polishing chamber the wastewater is filtered (4045) and then, if determined to be required (4055), it is finally treated (4055), for example, using a disinfection treatment system and/or a phosphorus, nitrogen/nitrate or heavy metal removal system. After either being finally treated (4055) or not, a final effluent wastewater is discharged (4060) from the polishing chamber. The method is ongoing based on the amount and level of wastewater in the system and the extent and concentration of sediment and impurities in the wastewater.

Figure 41:
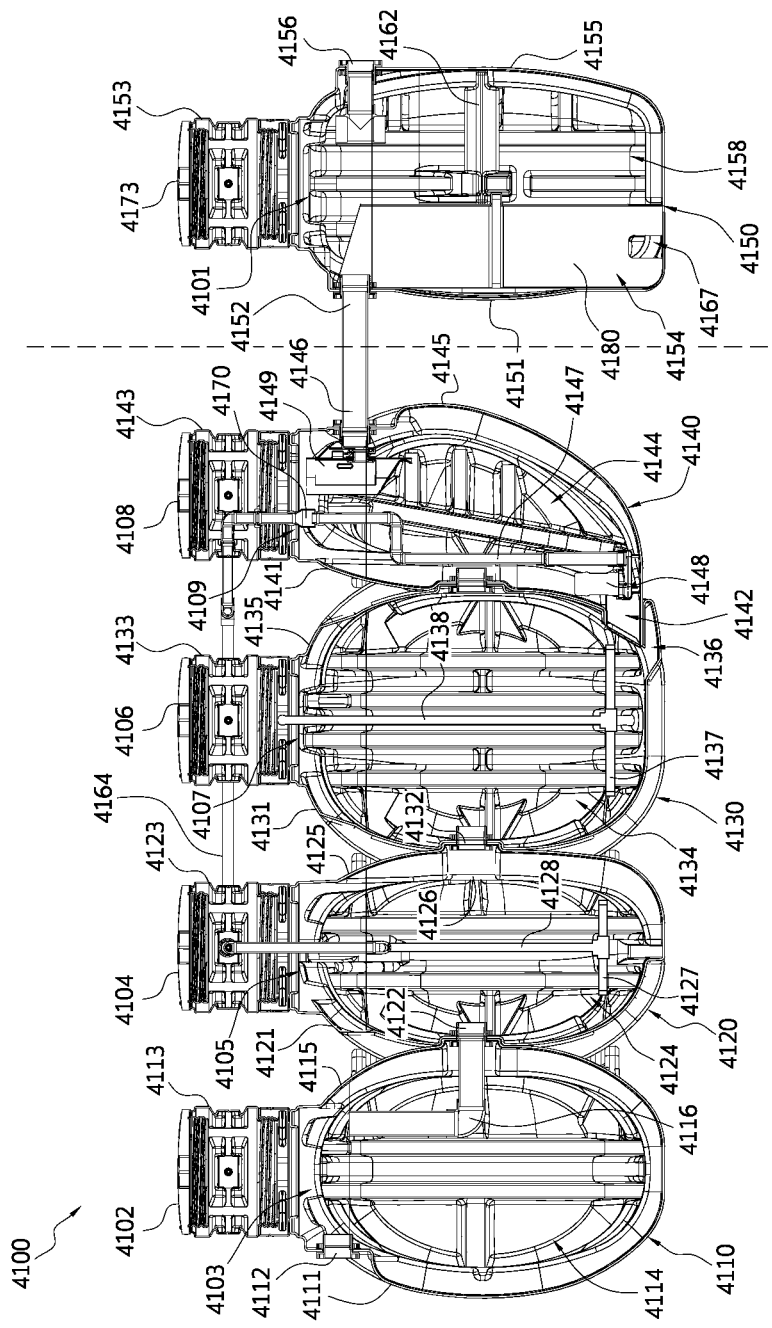
FIG. 41 is a side view of a wastewater treatment system tank with a pretreatment chamber, an anoxic chamber, an aeration chamber, a clarification chamber, and optionally, a polishing chamber, all with risers, in accordance with yet another, one or more embodiments of the present invention.

FIG. 41 is a cross-sectional, side view of a wastewater treatment system tank with a pretreatment chamber, an anoxic chamber, an aeration chamber, a clarification chamber, and optionally, a polishing chamber, all with risers, in accordance with yet another, one or more embodiments of the present invention. In FIG. 41, a four to five chamber wastewater plant 4100 is shown that is similar to but with some differences from the wastewater plant 2500 shown in FIG. 25. In FIG. 41, the four chamber wastewater plant 4100 includes four separate chambers, a pretreatment chamber 4110, an anoxic chamber 4120, an aeration chamber 4130 and a clarification chamber 4140, that are directly connected together while the five chamber plant includes the above-noted and directly connected four chambers connected to and in fluid communication via a pipe with a polishing chamber 4150. The design and construction of each chamber is similar to that disclosed in the '544 patent. Specifically, the pretreatment chamber 4110 is connected to and in fluid communication with the anoxic chamber 4120 via a pretreatment chamber outlet pipe 4116 that exits the pretreatment chamber 4110 near a middle of a first side wall 4115 and that connects to an anoxic chamber inlet pipe 4122 that enters into an inside 4124 of the anoxic chamber 4120 near a middle of a first side wall 4121. The pretreatment chamber 4110 also has an inlet pipe 4112 that enters through a second side wall 4111 into an inside 4114 of the pretreatment chamber and that is opposite the first side wall 4115 to receive influent wastewater and a pretreatment chamber riser 4113 and a pretreatment chamber riser lid 4102 covering an access opening 4103 in a top of the pretreatment chamber 4110. In the embodiment in FIG. 41, the pretreatment, anoxic, aeration and clarification chambers 4110, 4120, 4130, 4140 are directly connected to each other to form a multi-chamber unit.

In FIG. 41, the anoxic chamber 4120 has an outlet pipe 4126 that exits through a back wall 4125 of the anoxic chamber and the outlet pipe 4126 is directly connected to and in fluid communication with an aeration chamber inlet pipe 4132 that enters through an aeration chamber front wall 4131 into an inside 4134 of the aeration chamber 4130 to receive anoxically treated wastewater from the anoxic chamber 4120 and an anoxic chamber riser 4123 and an anoxic chamber riser lid 4104 covering an anoxic chamber access opening 4105 in a top of the anoxic chamber 4130. A mixing bar 4127 is seen inside of the anoxic chamber 4120 and connected to a pump 4148 in the clarification chamber. Details on the diffusion bar design and operation are provided herein in relation to FIGS. 5-7 and 33.

In FIG. 41, the aeration chamber 4130 has an outlet opening 4136 that exits through a bottom of a back wall 4135 of the aeration chamber and that is directly connected to and in fluid communication with a clarification chamber inlet opening 4142 that enters through a clarification chamber front wall 4141 into an inside 4144 of the clarification chamber 4140 to receive aerated wastewater from the aeration chamber 4130 and an aeration chamber riser 4133 and an aeration chamber riser lid 4106 covering an aeration chamber access opening 4107 in a top of the aeration chamber 4130. An air diffusion bar 4137 is seen inside of the aeration chamber 4130 and connected to an air pump (not shown, but see, 4139 in FIG. 42) via an air supply pipe 4138 and an air inlet line (not shown, but see, 4174 in FIG. 42). Details on the diffusion bar design are provided herein in relation to FIGS. 8-10 and 34. In one or more other embodiments, the air pump 4139 can be located within aeration chamber riser 4133.

In FIG. 41, the clarification chamber 4140 has an outlet pipe 4146 that exits through a top half of a back wall 4145 of the clarification chamber 4140 and that is directly connected to and in fluid communication with either an optional polishing chamber 4150 or a final disposal location. For example, the final disposal location could include a final holding tank and/or a drain field (not shown). A flow equalization apparatus 4149 is located on an intake end of the outlet pipe 4146 to control the amount and rate of the outflow of the treated wastewater. Embodiments of the possible designs of the flow equalization apparatus 4149 are shown and described in relation to FIGS. 14 to 16, 11 to 12, 31 and 32. The clarification chamber 4140 also includes a clarification chamber riser 4143 and a clarification chamber riser lid 4108 covering a clarification chamber access opening 4109 in a top of the clarification chamber 4140. The clarification chamber 4140 further includes a sludge return system that is connected to and in fluid communication with the mixing bar 4137 in the anoxic chamber 4120 via plastic pipe, for example, but not limited to, a first lateral pipe (not shown, but see, 4160 in FIG. 42) extending from the clarification chamber access opening 4109, a longitudinal pipe 4164 extending back toward the anoxic chamber 4120, and a second lateral pipe 4168 extending toward the anoxic chamber access opening 4105. A sludge pump 4148 is located in a bottom of the clarification chamber 4140 adjacent to the clarification chamber inlet opening 4142 and when operated pumps sludge, other sediment and settled wastewater up through a clarification sludge return pipe 4147 (see FIG. 42) and a check valve 4170, the first lateral pipe 4160, the longitudinal pipe 4164, the second lateral pipe 4168, and an anoxic sludge return pipe 4128 (see FIG. 42) to the mixing bar 4127 in the anoxic chamber 4120.

In FIG. 41, the polishing chamber 4150 is shown as a separate system/component that is connected to and in fluid communication with the clarification chamber 4140 via the clarification chamber outlet pipe 4146, which connects to and is in fluid communication with a polishing chamber inlet pipe 4152 in a front wall 4151 of the polishing chamber 4150. The clarification chamber inlet pipe 4152 is located in a top center of the polishing chamber front wall 4151 and provides access for an incoming flow of clarified wastewater from the clarification chamber 4140. The polishing chamber 4150 also has a back wall 4155 through which an effluent outlet pipe 4156 is located in a top center of the back wall 4155 and permits fully treated wastewater to flow out of the polishing chamber 4150. In general, the polishing chamber effluent outlet pipe 4156 is located at a height that is below the polishing chamber inlet opening 4152 and permits a one way flow of wastewater from the clarification chamber 4140 into and out of the polishing chamber 4150. The polishing chamber 4150 also includes a polishing chamber riser 4153 and a polishing chamber riser lid 4173 covering a polishing chamber access opening 4101 in a top of the polishing chamber 4150.

In FIG. 41, the internal structure of the polishing chamber is more clearly illustrated. For example, the inlet pipe 4152 is seen attached to the front wall 4151 of the polishing chamber and in fluid communication with an influent well 4154 in the polishing chamber 4150. The influent well 4154 is located adjacent to and on three sides of and in fluid communication with an effluent well 4158. The influent well 4154 is defined by three walls 4180, 4181 (see, FIG. 49), 4182 (see, FIG. 43) and the front wall of the polishing chamber 4151 and each of the three walls 4180, 4181, 4182 have an opening 4167 to provide fluid communication with the effluent well 4158. A filtration media support tray 4162 is shown generally in the middle of the effluent well 4158 upon which a filtration media (not shown), for example, but not limited to, gravel, plastic elements, natural elements, synthetic elements, rubber elements, ceramic elements and Styrofoam elements.

Figure 42:
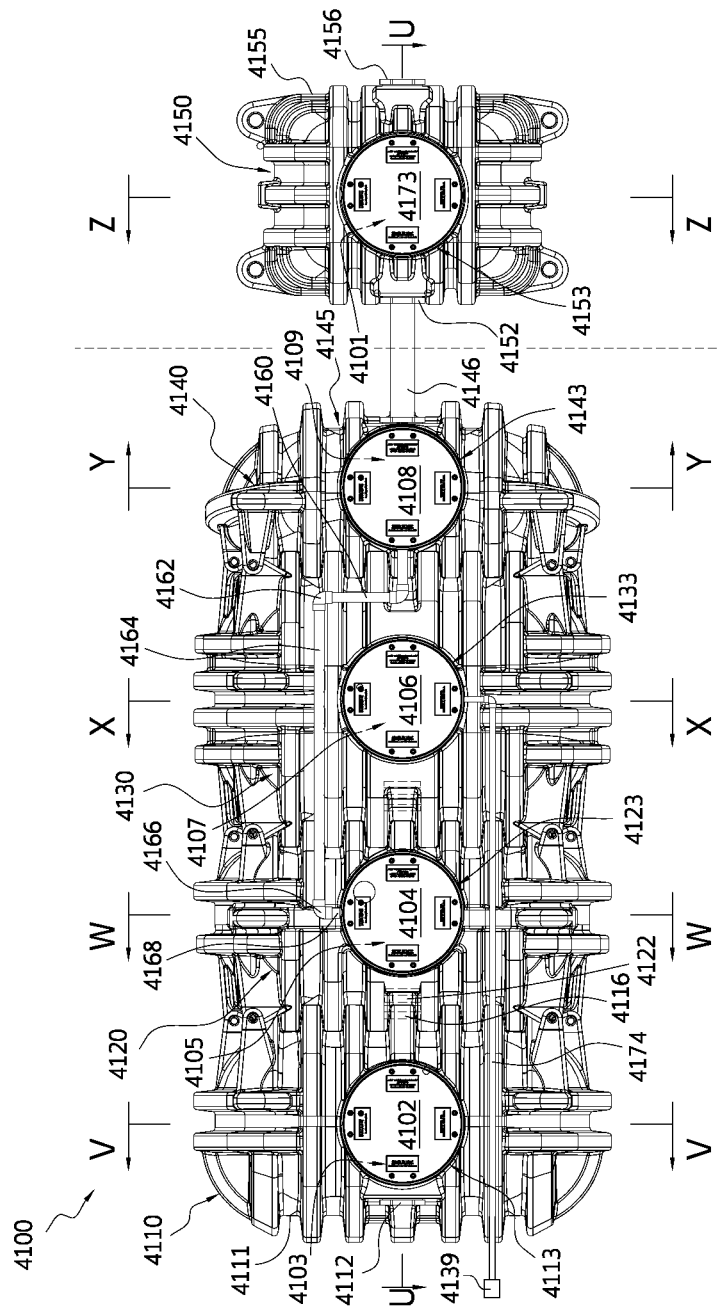
FIG. 42 is a top view of the wastewater treatment system tank with a pretreatment chamber, an anoxic chamber, an aeration chamber, and a clarification chamber of FIG. 41, but with risers on each chamber, in accordance with the another one or more embodiments of the present invention.

FIG. 42 is a top view of the wastewater treatment system tank with the pretreatment chamber 4110, the anoxic chamber 4120, the aeration chamber 4130, the clarification chamber 4140, and optionally, the polishing chamber 4150, of FIG. 41, but with risers on each chamber, in accordance with the another one or more embodiments of the present invention. In FIG. 42, unlike FIG. 26, the pretreatment chamber 4110 is directly attached to the anoxic chamber 4120, which is in turn directly attached to the aeration chamber 4130, which is directly attached to the clarification chamber 4140. In FIG. 42, the polishing chamber 4150 is not directly attached to the other chambers, but is connected to and in fluid communication with the clarification chamber 4140 via outlet pipe 4146 and inlet pipe 4152. As seen in FIG. 42, the sludge return pipe 4164 is connected to and provides for fluid communication between the pump 4148 in the clarification chamber 4140 and the mixing bar 4127 in the anoxic chamber 4120. An air inlet line 4174 is shown extending from below the pretreatment chamber riser 4113 toward and connecting to the aeration chamber riser 4133. An air pump 4139 is connected to the air inlet line 4174 to supply air to the diffusion bar 4137 in the aeration chamber 4130.

Figure 43:
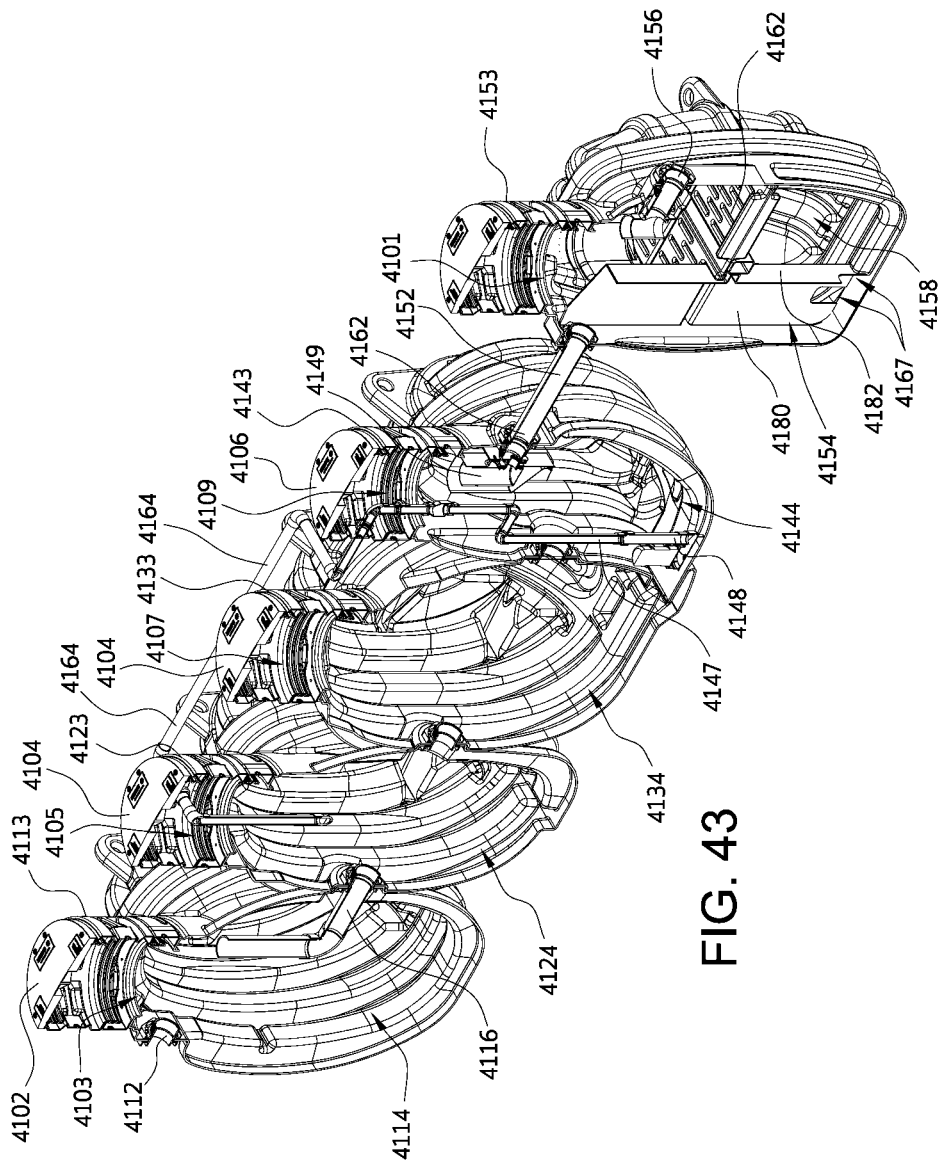
FIG. 43 is a cross-sectional, top front perspective view along line U-U of the wastewater treatment system tank with a pretreatment chamber, an anoxic chamber, an aeration chamber, a clarification chamber and a polishing chamber of FIG. 42, in accordance with the another one or more embodiments of the present invention.

FIG. 43 is a cross-sectional, top front perspective view along line U-U of the wastewater treatment system tank with a pretreatment chamber, an anoxic chamber, an aeration chamber, a clarification chamber and a polishing chamber of FIG. 42, in accordance with the another one or more embodiments of the present invention. Not all internal elements/features are shown in FIG. 43.

Figure 44:
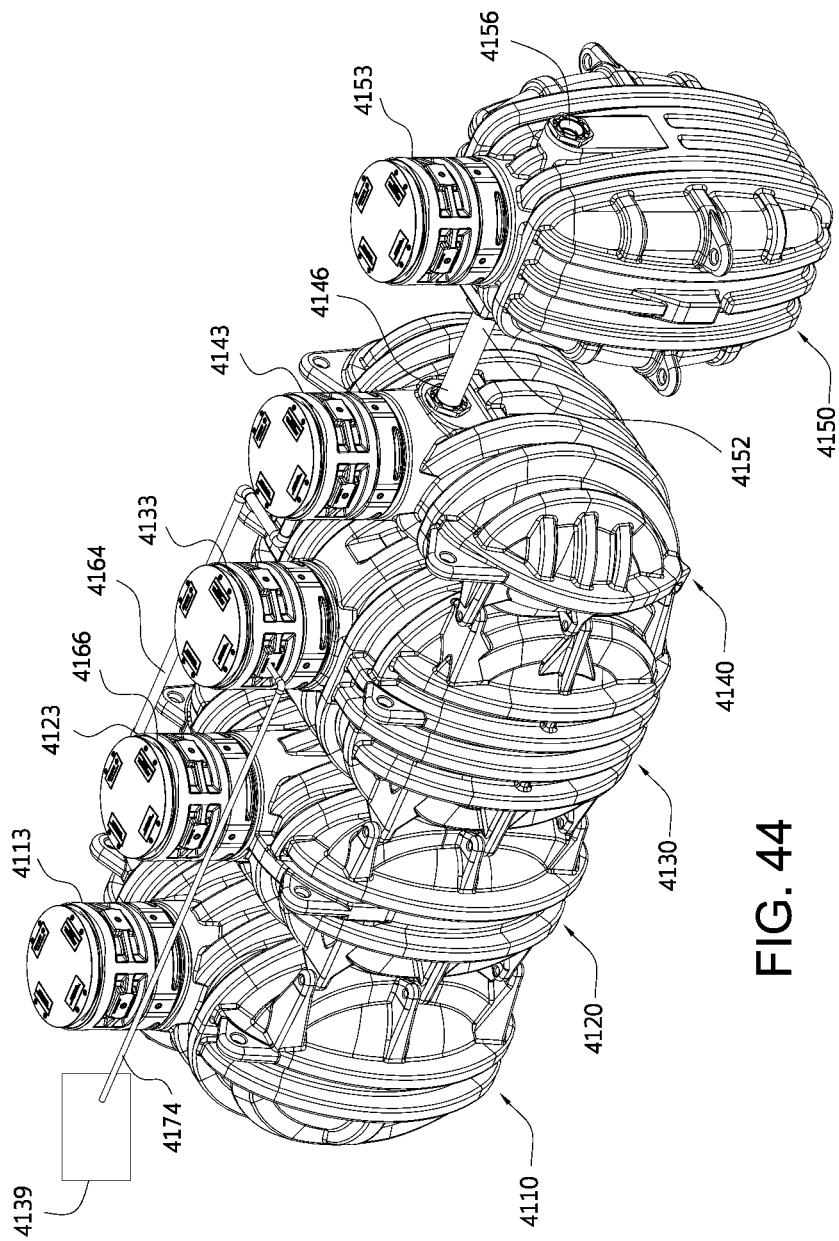
FIG. 44 is a top front perspective view of the wastewater treatment system tank with a pretreatment chamber, an anoxic chamber, an aeration chamber, a clarification chamber and a polishing chamber of FIG. 41, in accordance with the another one or more embodiments of the present invention.

FIG. 44 is a top front perspective view of the wastewater treatment system tank with a pretreatment chamber, an anoxic chamber, an aeration chamber, a clarification chamber and a polishing chamber of FIG. 41, in accordance with the another one or more embodiments of the present invention. In FIG. 44, and the air pump 4139 is shown connected to the air inlet pipe 4174, which is in turn connected to the air supply pipe 4138 and the diffuser bar 4137 in the aeration chamber 4130.

Figure 45:
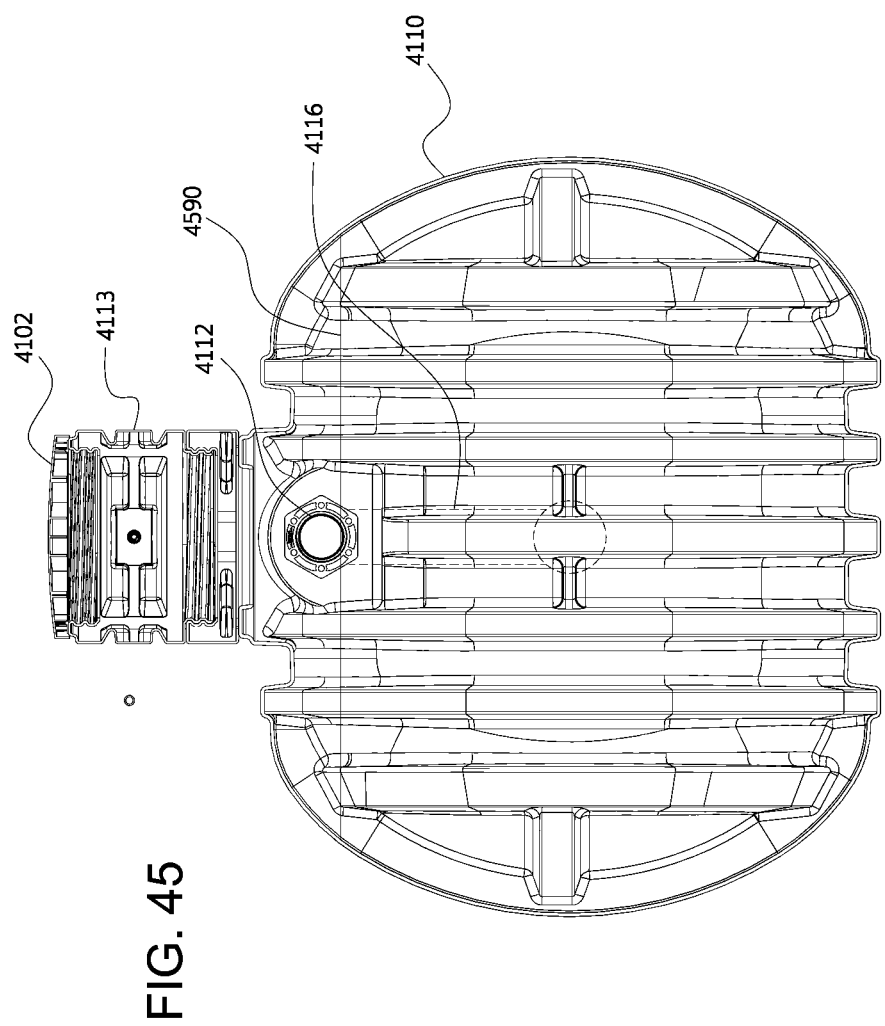
FIG. 45 is a cross-sectional, side view along line V-V of the pretreatment chamber of the wastewater treatment system tank of FIG. 42, in accordance with the another one or more embodiments of the present invention.

FIG. 45 is a cross-sectional, side view along line V-V of the pretreatment chamber 4110 of the wastewater treatment system tank of FIG. 42, in accordance with the another one or more embodiments of the present invention. In FIG. 45, a water line 4590 of the pretreatment chamber is shown at bottom of inlet pipe 4112 and at a top of is positioned pretreatment chamber outlet pipe 4116 (shown in broken line).

Figure 46:
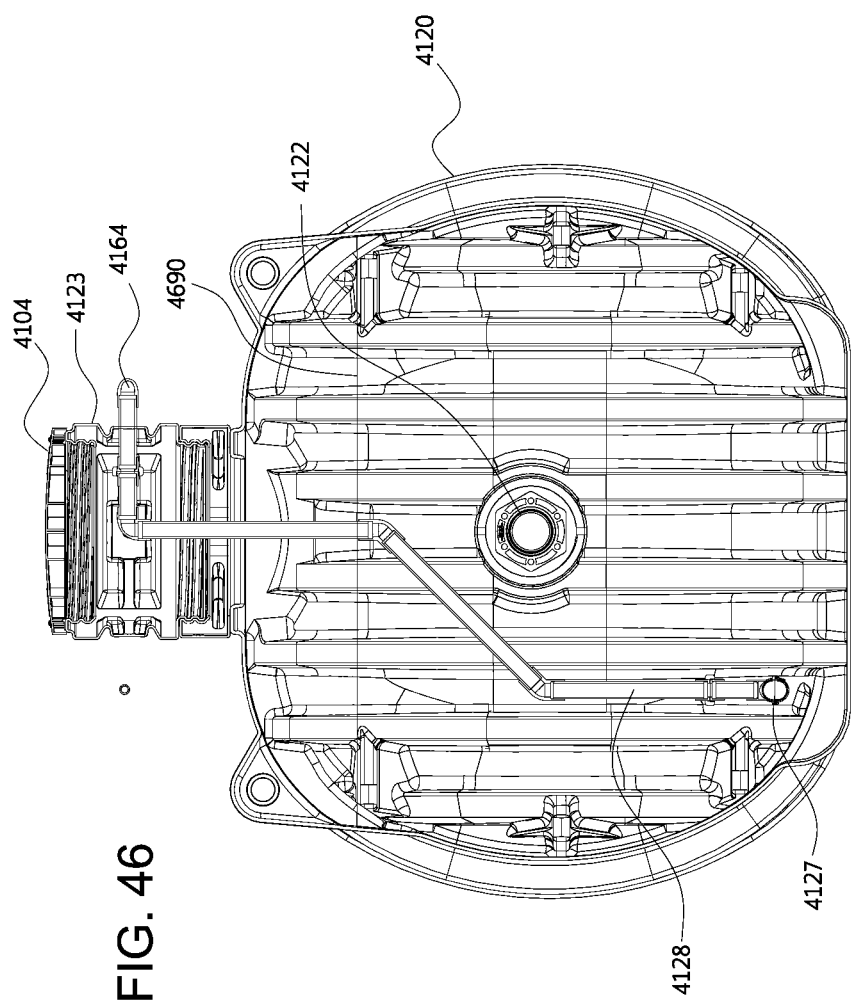
FIG. 46 is a cross-sectional, side view along line W-W of the anoxic chamber of the wastewater treatment system tank of FIG. 42, in accordance with the one or more embodiments of the present invention.

FIG. 46 is a cross-sectional, side view along line W-W of the anoxic chamber 4120 of the wastewater treatment system tank of FIG. 42, in accordance with the one or more embodiments of the present invention. In FIG. 46, an anoxic chamber water line 4690 is shown above the anoxic chamber inlet pipe 4122, which is at approximately the same height as an outlet end of the pretreatment chamber outlet pipe 4116 of FIG. 45. Returning to FIG. 46, the mixing bar 4127 is shown to be located adjacent, but generally, above, the bottom of the anoxic chamber 4120 and below the end of anoxic chamber inlet pipe 4122 located inside the anoxic chamber 4120.

Figure 47:
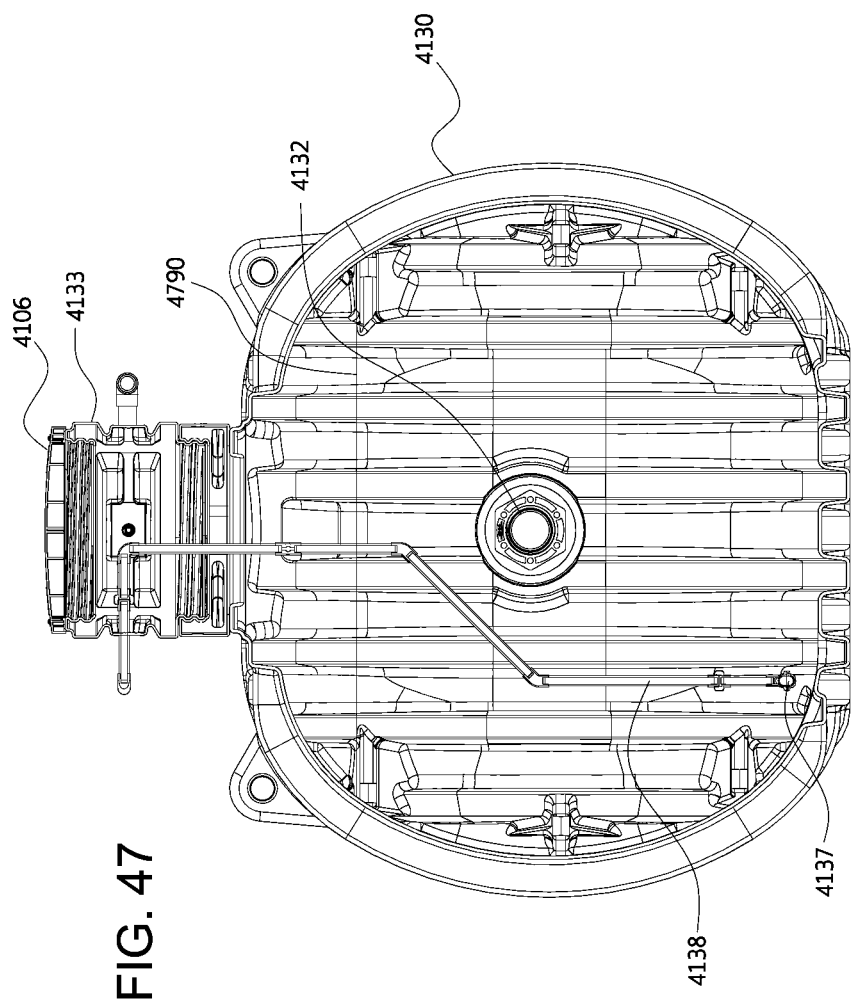
FIG. 47 is a cross-sectional, side view along line X-X of the aeration chamber of the wastewater treatment system tank of FIG. 42, in accordance with the another one or more embodiments of the present invention.

FIG. 47 is a cross-sectional, side view along line X-X of the aeration chamber 4130 of the wastewater treatment system tank of FIG. 42, in accordance with the another one or more embodiments of the present invention. In FIG. 47, an aeration chamber water line 4790 is shown above the aeration chamber inlet pipe 4132, while the diffusion bar 4137 is located adjacent the bottom of the aeration chamber 4130 and below the end of aeration chamber inlet pipe 4132 located inside the aeration chamber 4130.

Figure 48:
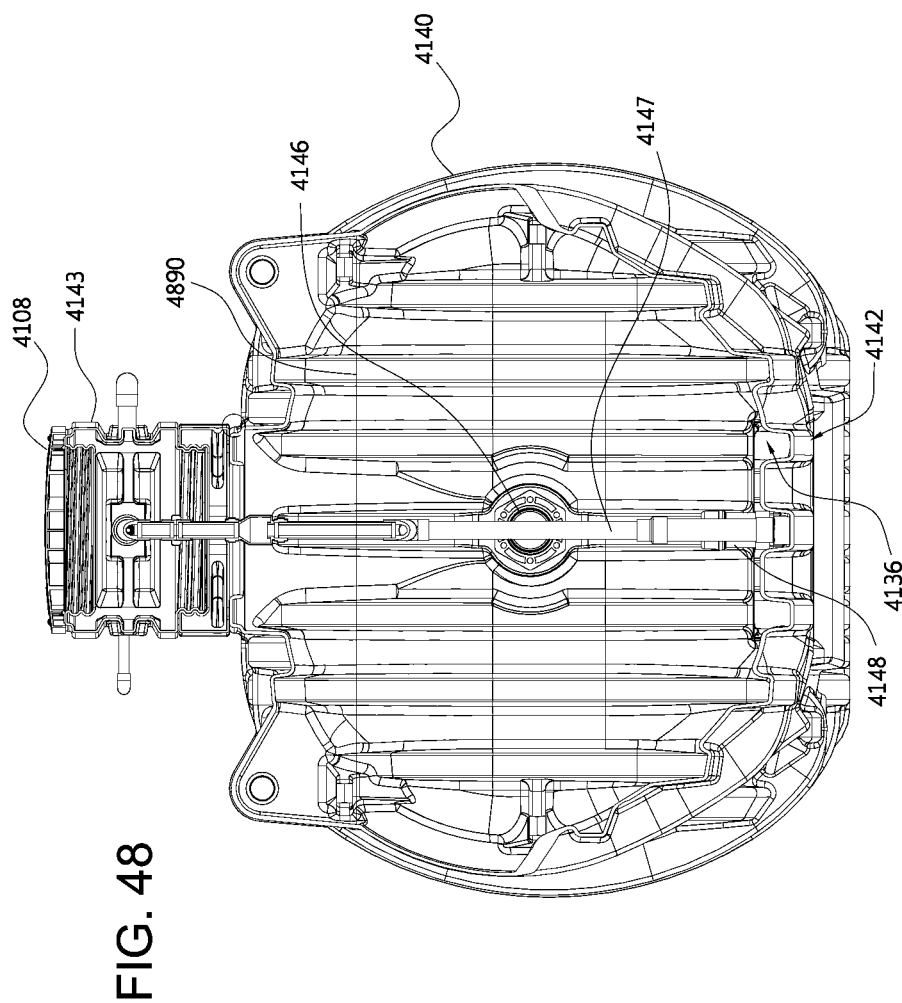
FIG. 48 is a cross-sectional, side view along line Y-Y of the clarification chamber of the wastewater treatment system tank of FIG. 42, in accordance with the another one or more embodiments of the present invention.

FIG. 48 is a cross-sectional, side view along line Y-Y of the clarification chamber of the wastewater treatment system tank of FIG. 42, in accordance with the another one or more embodiments of the present invention. In FIG. 48, a clarification chamber water line 4890 is shown above the clarification chamber outlet pipe 4146; while the return sludge pump 4148 is located adjacent the bottom of the clarification chamber 4140 and the sludge return pipe 4147 extends upwardly away from the sludge return pump 4148 and to the check valve 4170.

Figure 49:
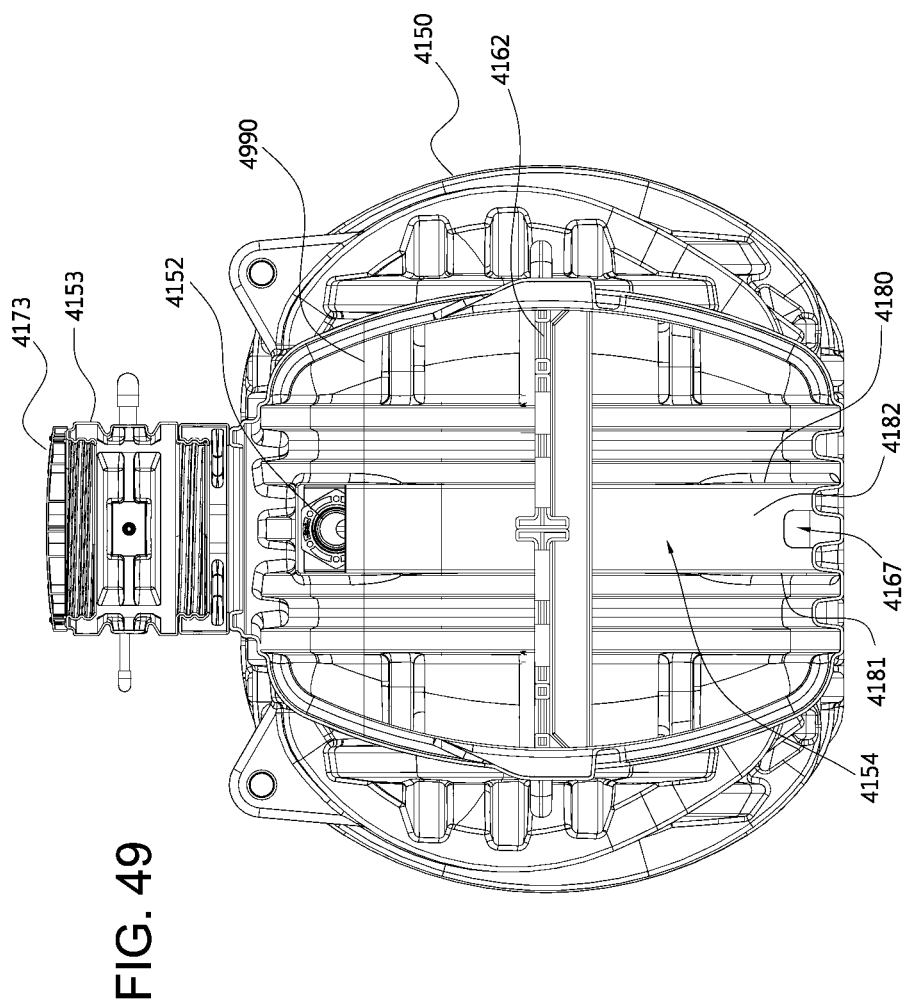
FIG. 49 is a cross-sectional, side view along line Z-Z of the polishing chamber of the wastewater treatment system tank of FIG. 42, in accordance with the another one or more embodiments of the present invention.

FIG. 49 is a cross-sectional, side view along line Z-Z of the polishing chamber of the wastewater treatment system tank of FIG. 42, in accordance with the another one or more embodiments of the present invention. In FIG. 49, location of the influent well 4154 and one of the influent well exits 4167 adjacent the bottom of the influent well 4154 in the polishing chamber 4150 and the filtration media tray 4162 are clearly illustrated. In addition, the polishing chamber inlet pipe 4152 is shown above atop of the influent well 4154 and a water line 4990 is shown slightly below the top of the influent well 4154.

Figure 50:
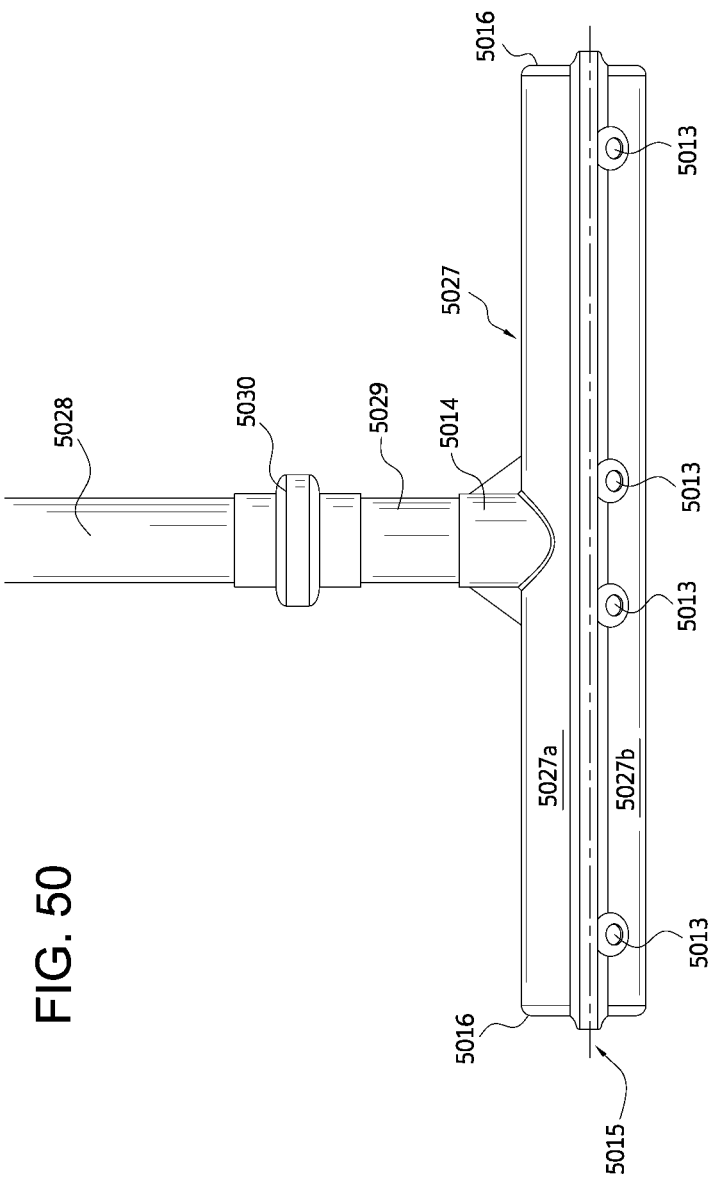
FIG. 50 is a longitudinal front view of another mixing bar of a wastewater treatment system tank with a pretreatment chamber, an anoxic chamber, an aeration chamber, a clarification chamber and a polishing chamber, in accordance with one or more embodiments of the present invention.

FIG. 50 is a longitudinal front view of another mixing bar of a wastewater treatment system tank with a pretreatment chamber, an anoxic chamber, an aeration chamber, a clarification chamber and a polishing chamber, in accordance with one or more embodiments of the present invention. In FIG. 50, a mixing bar 5027, which may be similar to and used the same as the mixing bar 127 in FIG. 1, is shown in FIG. 50 being connected to a short supply pipe 5029 that is in turn connected to a bottom end of a connector 5030 that is connected at a top of the connector 5030 to a long supply pipe 5028. The mixing bar includes two body portions, a top portion 5027a and a bottom portion 5027b that are connected together longitudinally. The top portion 5027a has a "T"-shaped junction 5014 located about in a middle of the top portion 5027a and that connects with a bottom end of the short supply pipe 5029. Each end of the mixing bar 5027 is sealingly covered with an end cap 5016. The body portions 5027a, 5027b and the end caps 5016 are made from plastic. In general, on the mixing bar 5027, the bottom portion 5027b has multiple openings 5013 extending through an exterior wall of and into an inside of the bottom portion 5027b. In general, the openings 5013 are below a midline 5015 between the top and bottom portions 5027a, 5027b and are angled downwardly away from the midline 5015. In the embodiment in FIG. 50, the openings are about ½" in diameter and at about a 15 degree downward angle measured from the midline 5015. In FIG. 50, four openings 5013 are shown on the front side of and in the bottom portion 5027b with the two inner openings being located below and to either side of where the short supply pipe 5029 connects to the top portion 5027b. The other two openings 5013 are located on the same front side and in line with the inner openings, but adjacent opposite ends of the bottom portion 5027b. The openings 5013 may also include more than four openings and be equally spaced apart along a length of the mixing bar 5027.

Figure 51:
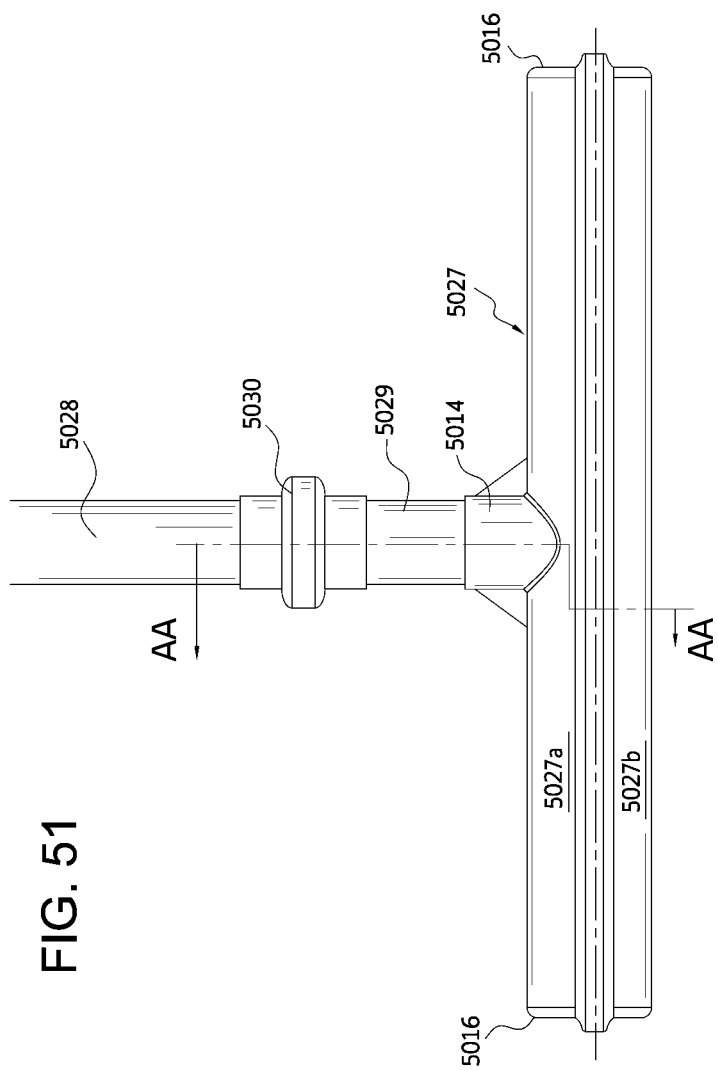
FIG. 51 is a longitudinal back view of the mixing bar of FIG. 50, in accordance with one or more embodiments of the present invention.

FIG. 51 is a longitudinal back view of the mixing bar of FIG. 50, in accordance with one or more embodiments of the present invention. In FIG. 51, the back side of the bottom portion 5027b is shown not to include openings.

Figure 52:
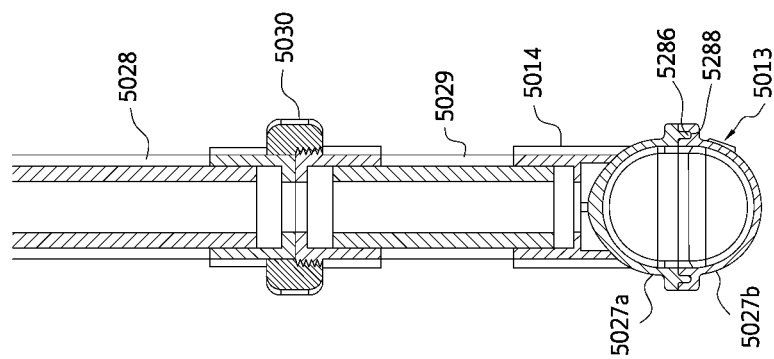
FIG. 52 is a cross-sectional end view of the mixing bar of FIG. 51 along line AA-AA, in accordance with one or more embodiments of the present invention.

FIG. 52 is a cross-sectional end view of the mixing bar of FIG. 51 along line AA-AA, in accordance with one or more embodiments of the present invention. In FIG. 52, the two-piece construction of the mixing bar 5027 is illustrated. Specifically, the top portion 5027a is shown to have a ridge 5286 downwardly depending from a bottom surface of the top portion 5027a. The bottom portion 5027b is shown to have a groove 5288 downwardly depending from a top surface of the bottom portion 5027b where the groove 5288 is reciprocally shaped to receive and mate with the ridge 5286 of the top portion 5027a. The top and bottom portions may be permanently affixed to each other with glue, adhesive or other method, or they may be removably connected by the end caps 5016, which could be removably affixed at each end of the top and bottom portions 5027a, 5027b.

Figure 53:
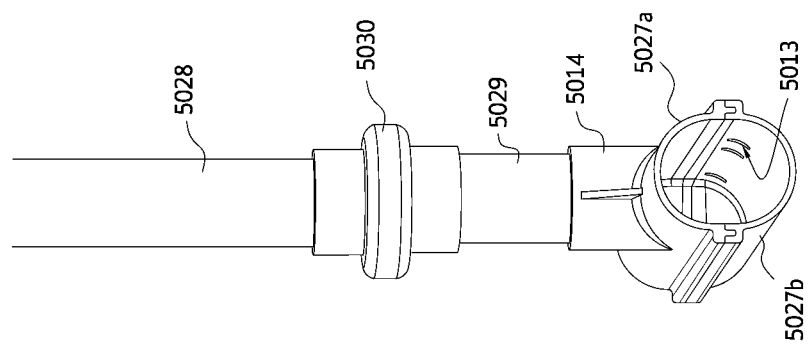
FIG. 53 is a top perspective, cross-sectional, end view along line AA-AA of the mixing bar of FIG. 51, in accordance with one or more embodiments of the present invention.

FIG. 53 is a top perspective, cross-sectional, end view along line AA-AA of the mixing bar of FIG. 51, in accordance with one or more embodiments of the present invention. In FIG. 53, the inside ends of three of the openings 5013 is shown.

Figure 54:
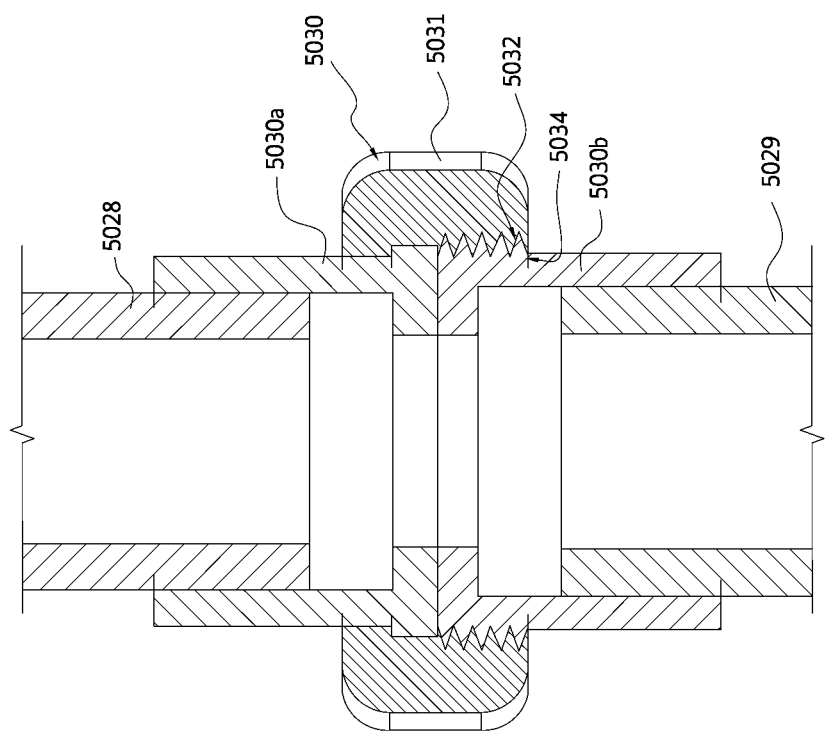
FIG. 54 is close up, cross-sectional view of the connector of FIG. 52, in accordance with one or more embodiments of the present invention.

FIG. 54 is close up, cross-sectional view of the connector of FIG. 52, in accordance with one or more embodiments of the present invention. In FIG. 54, the connector 5030 is shown to include a top section 5030a with a circumferential center section 5031 with internal threads 5032 located at a bottom of the circumferential center section 5031 and a bottom portion 5030b with a top end with reciprocally threaded threads 5034 for threadingly connecting with circumferential center section 5031.

Figure 55:
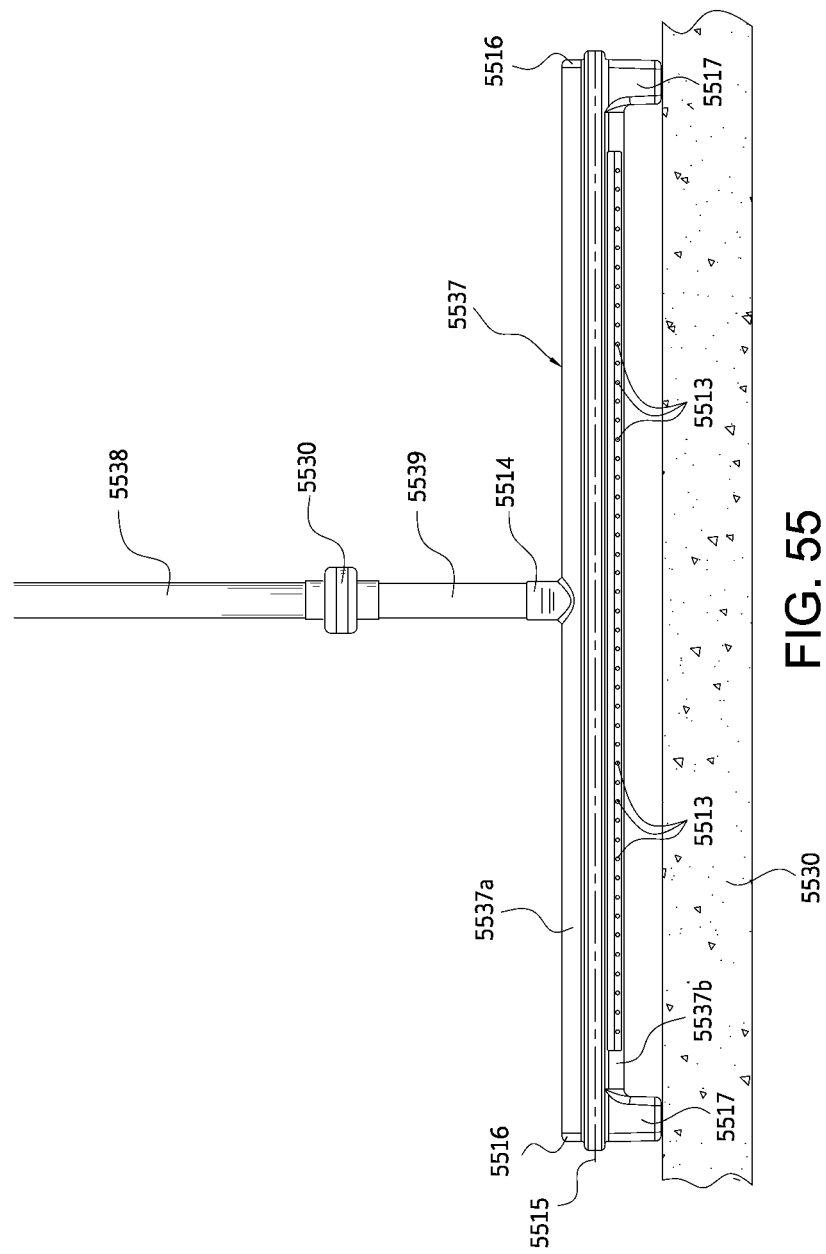
FIG. 55 is a front view of a diffusion bar of a wastewater treatment system tank with a pretreatment chamber, an anoxic chamber, an aeration chamber, a clarification chamber and a polishing chamber, in accordance with one or more embodiments of the present invention.

FIG. 55 is a front view of a diffusion bar of a wastewater treatment system tank with a pretreatment chamber, an anoxic chamber, an aeration chamber, a clarification chamber and a polishing chamber, in accordance with one or more embodiments of the present invention. In FIG. 55, a diffusion bar 5537, such as, for example the diffusion bar 137 of FIG. 1, is shown in FIG. 55 being connected to a short supply pipe 5539 that is in turn connected to a bottom end of a connector 5530 that is connected at a top of the connector 5530 to a long supply pipe 5538. The diffusion bar 5537 includes two body portions, a top portion 5537a and a bottom portion 5537b that are connected together longitudinally. The top portion 5537a has a "T"-shaped junction 5514 located about in a middle of the top portion and that connects with a bottom end of the short supply pipe 5539. Each end of the diffusion bar 5537 is sealingly covered with an end cap 5516. The body portions 5537a, 5537b and the end caps 5516 are made from plastic. In general, on the diffusion bar 5537, the bottom portion 5537b has multiple air openings 5513 extending through an exterior wall of and into an inside of the bottom portion 5537b to rest on a bottom of aeration chamber 5530. In general, the openings 5513 are below a midline 5515 between the top and bottom portions 5537a, 5537b and are angled downwardly away from the midline 5515. The bottom portion 5037b also includes two supports 5517 that extend downwardly from opposite ends of the bottom portion 5037b. In FIG. 55, the bottom portion 5037b further includes multiple openings 5513 that are equally spaced apart along a length of the bottom portion of the diffusion bar 5537. In FIG. 55, the multiple air openings 5513 are about 3/32" in diameter and angled downwardly at about 45 degrees below the midline 5515.

Figure 56:
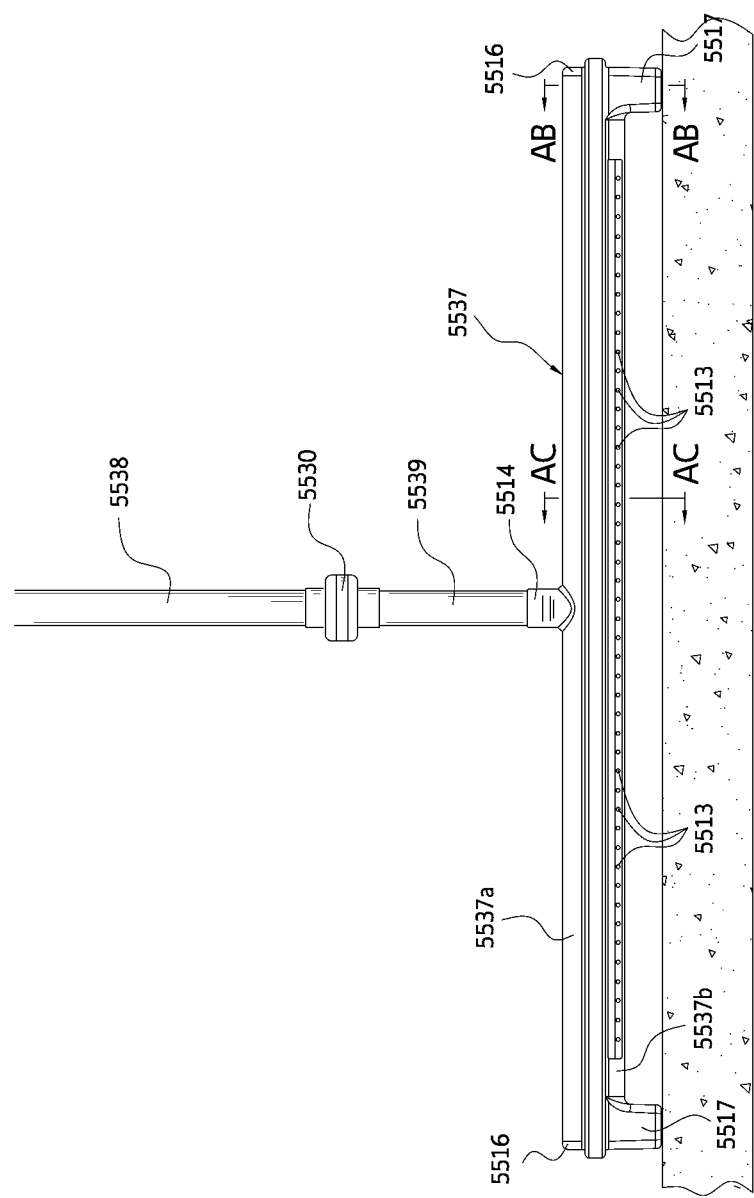
FIG. 56 is a back view of the diffusion bar of FIG. 55, in accordance with one or more embodiments of the present invention.

FIG. 56 is a back view of the diffusion bar of FIG. 55, in accordance with one or more embodiments of the present invention. In FIG. 56, the back side of the bottom portion 5027b is also shown to include openings 5513.

Figure 57:
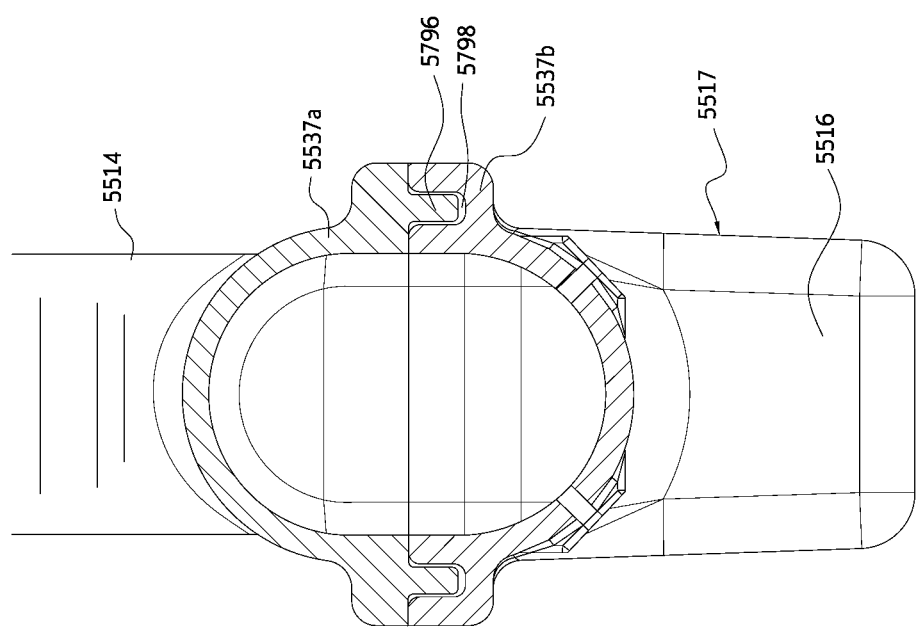
FIG. 57 is a partial cross-sectional, end view of the diffusion bar of FIG. 56 along line AB-AB, in accordance with one or more embodiments of the present invention.

FIG. 57 is a partial cross-sectional, end view of the diffusion bar of FIG. 56 along line AB-AB, in accordance with one or more embodiments of the present invention. In FIG. 57, the two-piece construction of the diffusion bar 5537 is illustrated. Specifically, the top portion 5537a is shown to have a ridge 5796 downwardly depending from a bottom surface of the top portion 5537a. The bottom portion 5537b is shown to have a groove 5798 downwardly depending from a top surface of the bottom portion 5537b where the groove 5798 is reciprocally shaped to receive and mate with the ridge 5796 of the top portion 5537a. The top and bottom portions may be permanently affixed to each other with glue, adhesive or other method, or they may be removably connected by the end caps 5516, which could be removably affixed at each end of the top and bottom portions 5537a, 5537b.

Figure 58:
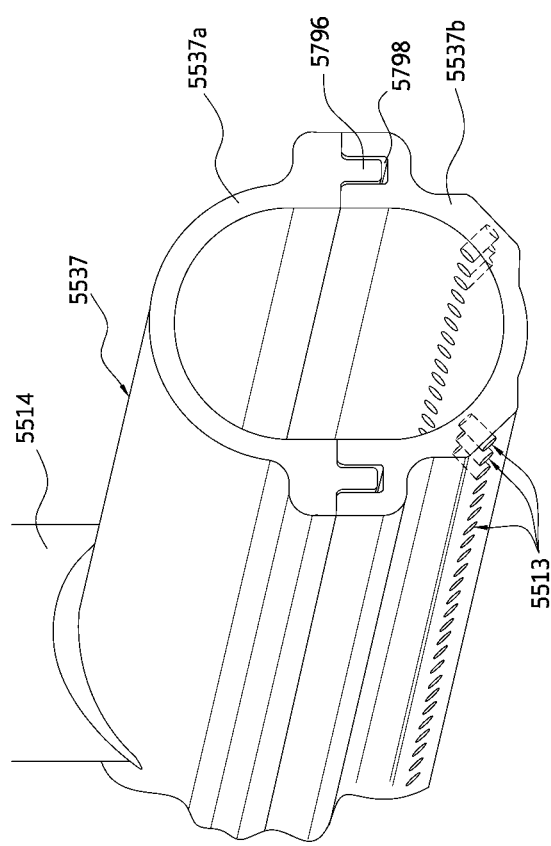
FIG. 58 is a cross-sectional, end view along line AC-AC of the diffusion bar of FIG. 56, in accordance with one or more embodiments of the present invention.

FIG. 58 is a cross-sectional, end view along line AC-AC of the diffusion bar of FIG. 56, in accordance with one or more embodiments of the present invention. In FIG. 55, the orientation and path of the openings 5513 are shown.

Figure 59:
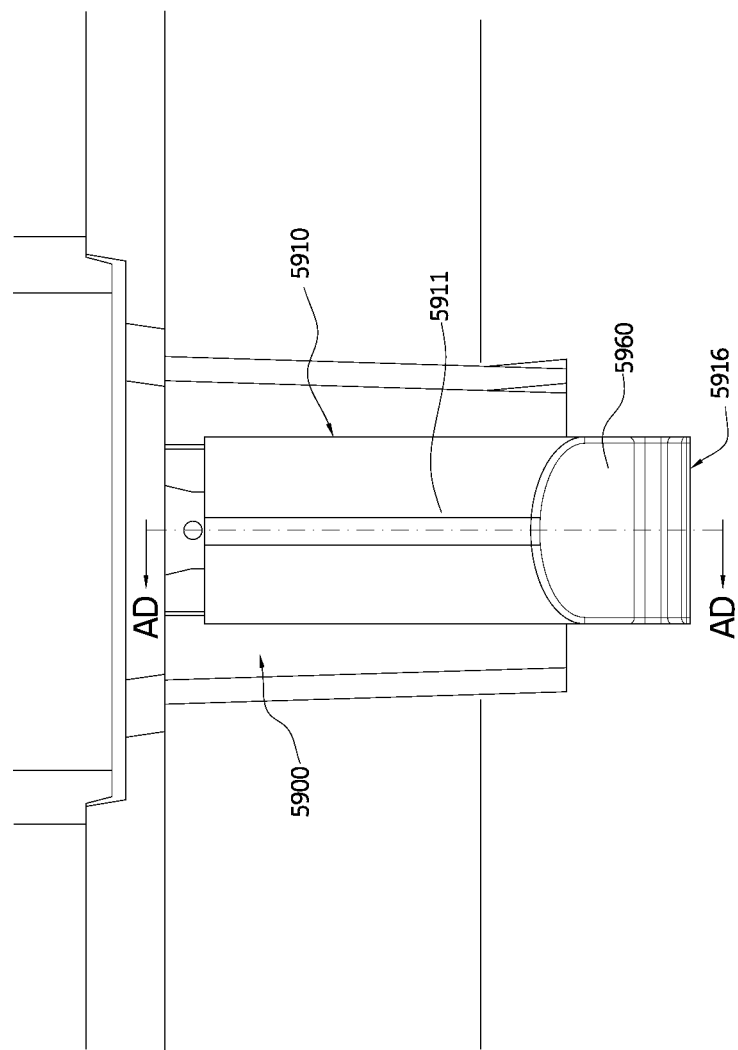
FIG. 59 is a front view of a flow equalization apparatus in a clarification chamber, in accordance with one or more embodiments of the present invention.

FIG. 59 is a front view of a flow equalization apparatus in a clarification chamber, in accordance with one or more embodiments of the present invention. In FIG. 59, a flow equalization apparatus 5900 is shown to include an outer shell 5910 with a front wall 5911, an angled bottom wall 5960 and a baffle opening 5916 at a junction of a bottom of the bottom wall 5960 and a bottom of a back wall (not shown) of the flow equalization apparatus 5900. The baffle opening 5916 permits effluent from the clarification chamber to flow into the outer shell 5910.

Figure 60:
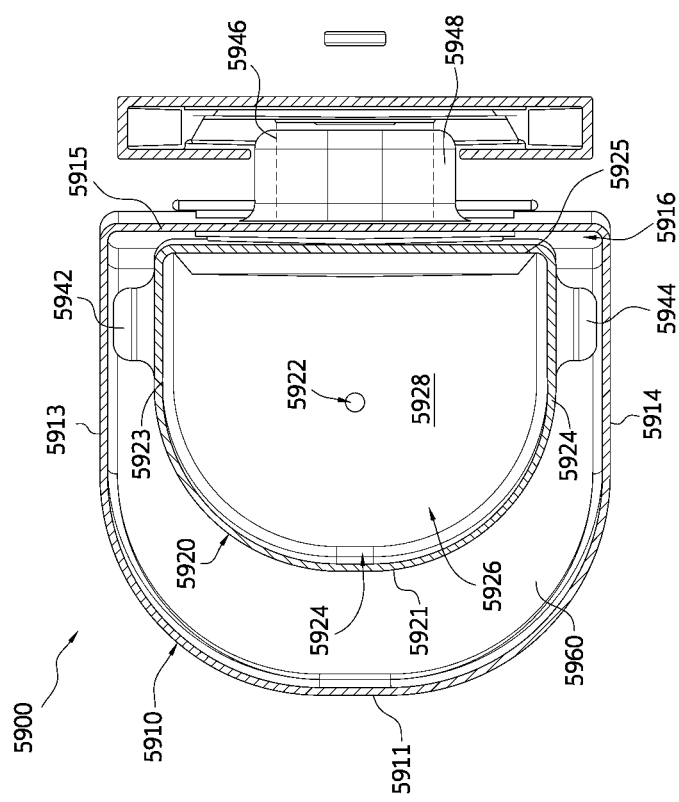
FIG. 60 is a top view of the flow equalization apparatus of FIG. 59, in accordance with one or more embodiments of the present invention.

FIG. 60 is a top view of the flow equalization apparatus of FIG. 59, in accordance with one or more embodiments of the present invention. In FIG. 60, the outer shell 5910 is also shown to include a left side wall 5913 connected to the front wall 5911, which is also connected to a right side wall 5914, a back wall 5915 that is connected to both the left side wall 5913 and the right side wall 5914, and the bottom wall 5960 is sealingly connected around the bottoms of the front, left and right walls 5911, 5913, 5914. The baffle opening 5916 is formed between a downwardly depending portion 5962 of the bottom wall 5960 and the back wall 5915. Also shown in FIG. 60 is an inner shell 5920, which is shaped similarly to the outer shell 5910, but with smaller dimensions and a substantially flat bottom 5928. The inner shell 5920 includes a front wall 5921; a left side wall 5923, a right side wall 5924 and a back wall 5925, all of which form a substantially upright continuous inner shell 5920 body with an open top 5926 and that is sealingly connected to the bottom wall 5928. Located in about the center of the bottom wall 5928 is a flow equalization port 5922 to allow the effluent in the outer shell 5910 to flow into the inner shell 5920 under normal system flow conditions. Also shown located in and near a top of the inner shell front wall 5921 is a sustained flow port 5924, which is larger than the flow equalization port 5922 and becomes operational when the flow reaches a sustained volume that is above the capacity of the flow equalization port 5922. The open top 5926 of the inner shell 5920 operates as an overflow port 5926 when the volume of effluent exceeds the capacity of the flow equalization port 5922 and the sustained flow port 5924. The flow equalization port 5922 and the sustained flow port can have diameters ranging between about 1/4" to 1/2". In the embodiment in FIG. 60, the size is shown as 3/8".

In FIG. 60, the outer shell 5910 is shown to have a back support 5948 extending substantially perpendicularly away from and about in the middle of the back wall 5915 of the outer shell 5910. An outlet tube 5946 is shown in broken line below the back support 5948 that extends substantially perpendicularly away from and adjacent to the bottom of both the back wall 5915 of the outer shell 5910 and the bottom of the back wall 5925 of the inner shell 5920 to be in fluid communication with clarification outlet 146 to permit effluent from the flow equalization apparatus 5900 to flow out of the clarification chamber 140. In the system of FIG. 1, the effluent flows to the polishing chamber 150, while in the system of FIG. 20, the effluent flows to a drain field or other receiving apparatus. The positioning of the back support 5948 and the outlet tube 5946 is better shown in FIGS. 62-64. The inner shell 5920 has a left support 5942 extending outwardly from the left side wall 5923 to rest against the left side wall 5913 of the outer shell 5910. Similarly, the inner shell 5120 has a right support 5944 extending outwardly from the right side wall 5924 to rest against the right sided wall 5914 of the outer shell 5910.

Figure 61:
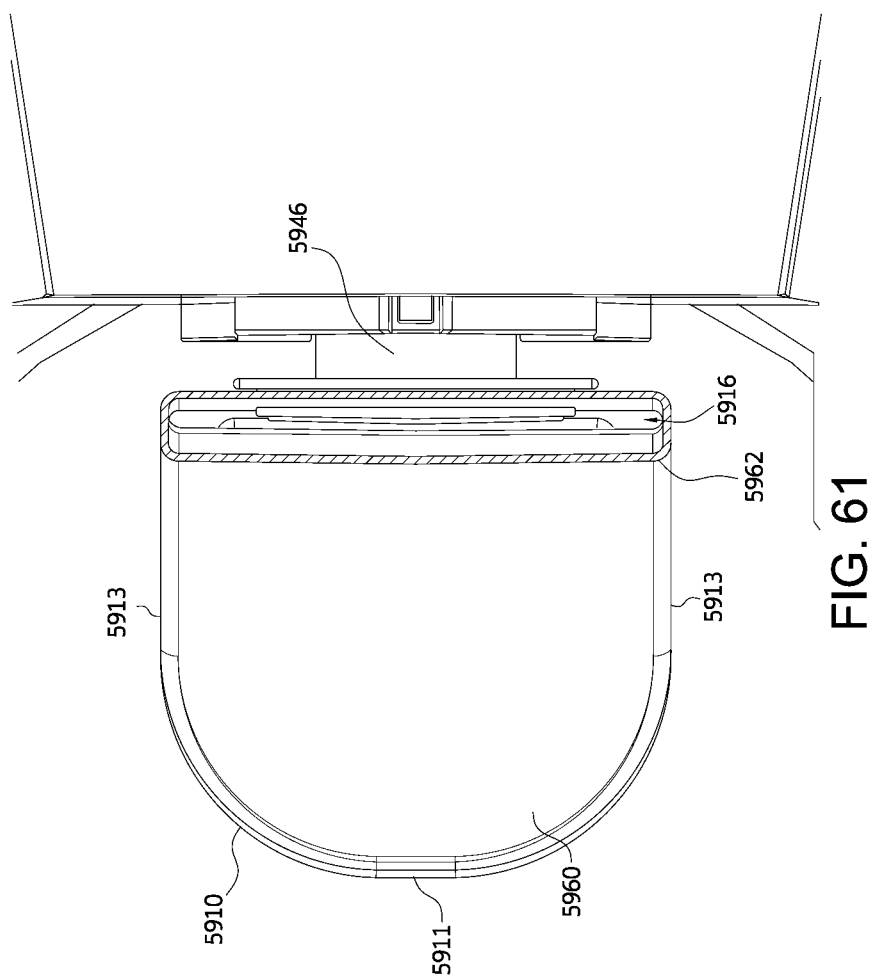
FIG. 61 is a bottom view of the flow equalization apparatus of FIG. 59, in accordance with one or more embodiments of the present invention.

FIG. 61 is a bottom view of the flow equalization apparatus of FIG. 59, in accordance with one or more embodiments of the present invention. In FIG. 61, the narrowing of baffle opening 5916 as it extends upwardly into the inside of the outer shell 5910 is shown.

Figure 62:
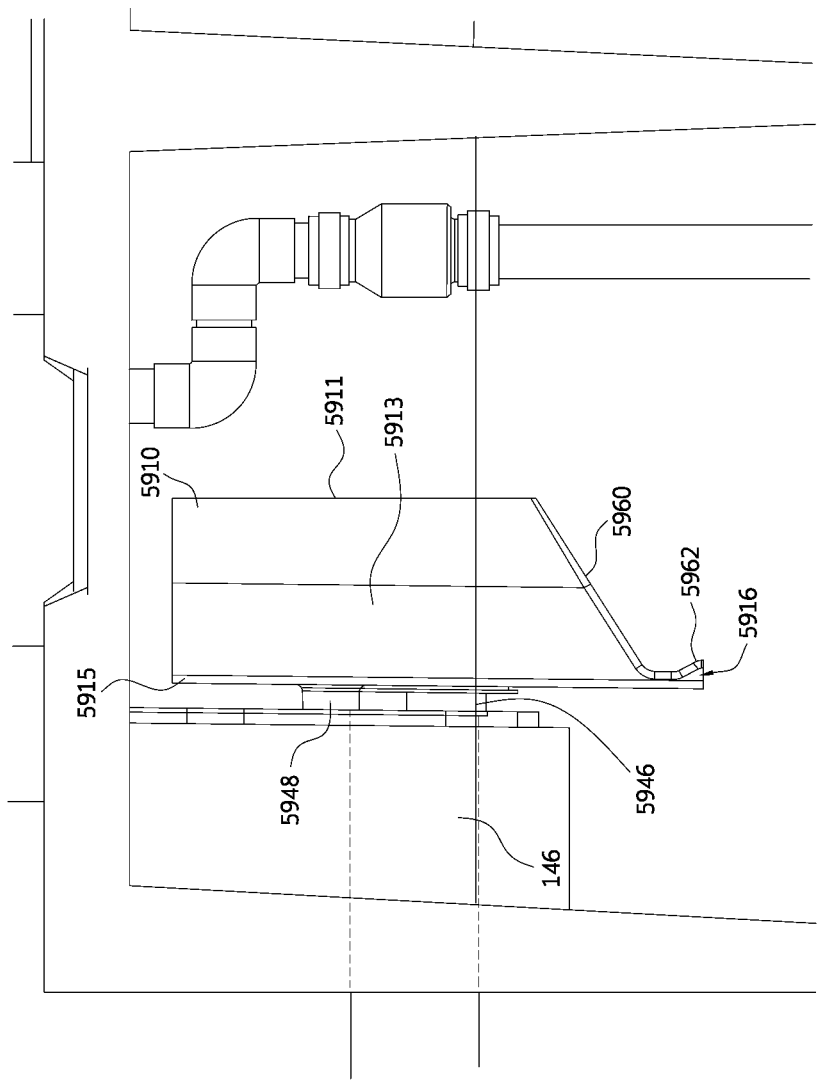
FIG. 62 is a left side view of the flow equalization apparatus of FIG. 59, in accordance with one or more embodiments of the present invention.

FIG. 62 is a left side view of the flow equalization apparatus of FIG. 59, in accordance with one or more embodiments of the present invention. In FIG. 62, the location of clarification chamber outlet pipe 146 is shown in broken line.

Figure 63:
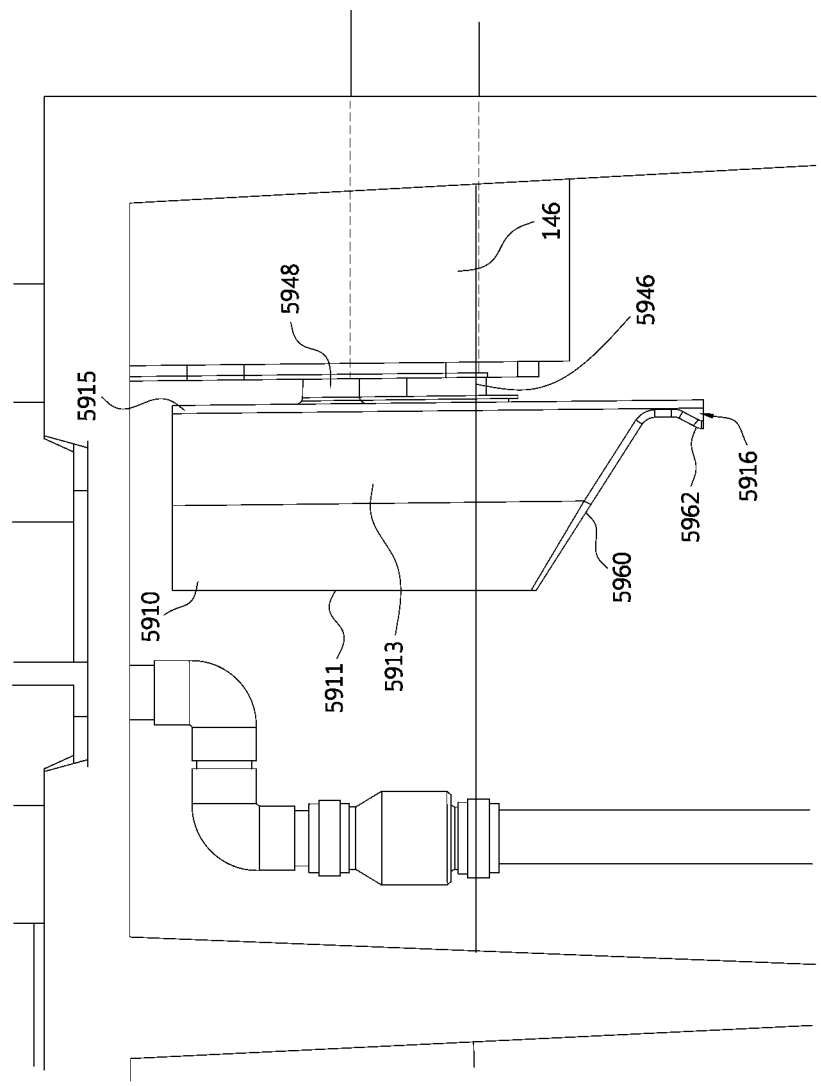
FIG. 63 is a right side view of the flow equalization apparatus of FIG. 59, in accordance with one or more embodiments of the present invention.

FIG. 63 is a right side view of the flow equalization apparatus of FIG. 59, in accordance with one or more embodiments of the present invention. In FIG. 63, the location of clarification chamber outlet pipe 146 is also shown in broken line.

Figure 64:
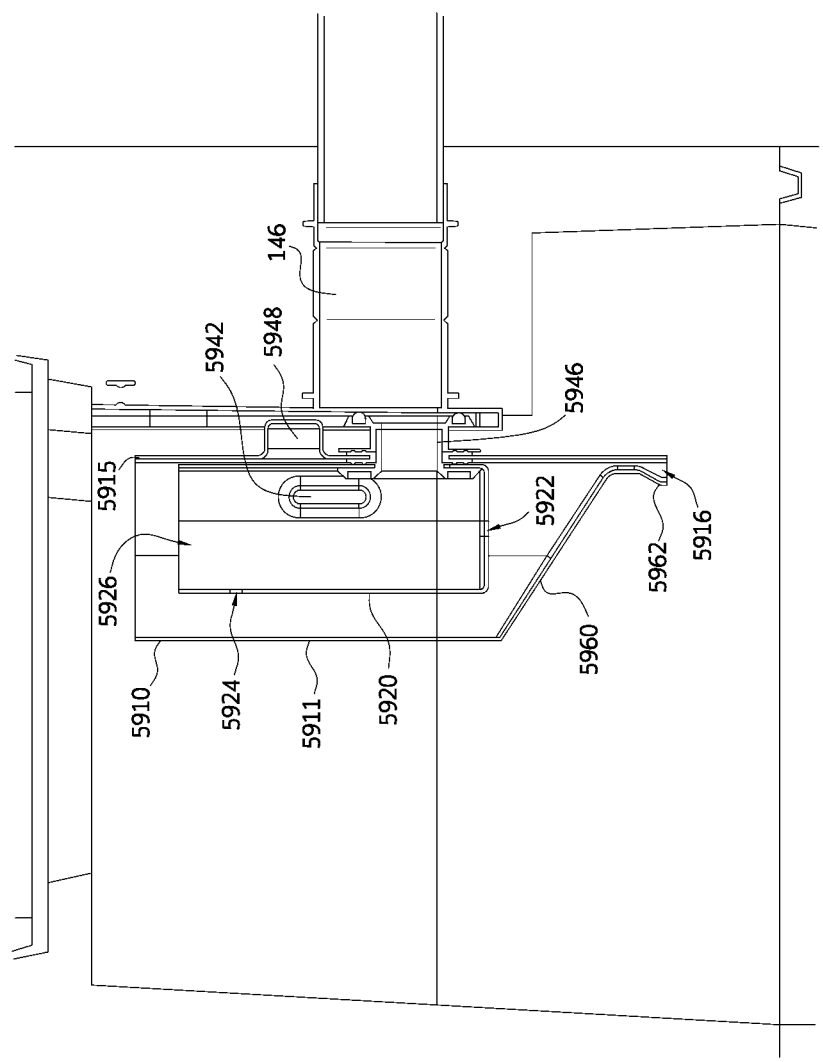
FIG. 64 is a cross-sectional, side view along line AD-AD of the flow equalization apparatus of FIG. 11, in accordance with one or more embodiments of the present invention.

FIG. 64 is a cross-sectional, side view along line AD-AD of the flow equalization apparatus of FIG. 59, in accordance with one or more embodiments of the present invention.

Figure 65:
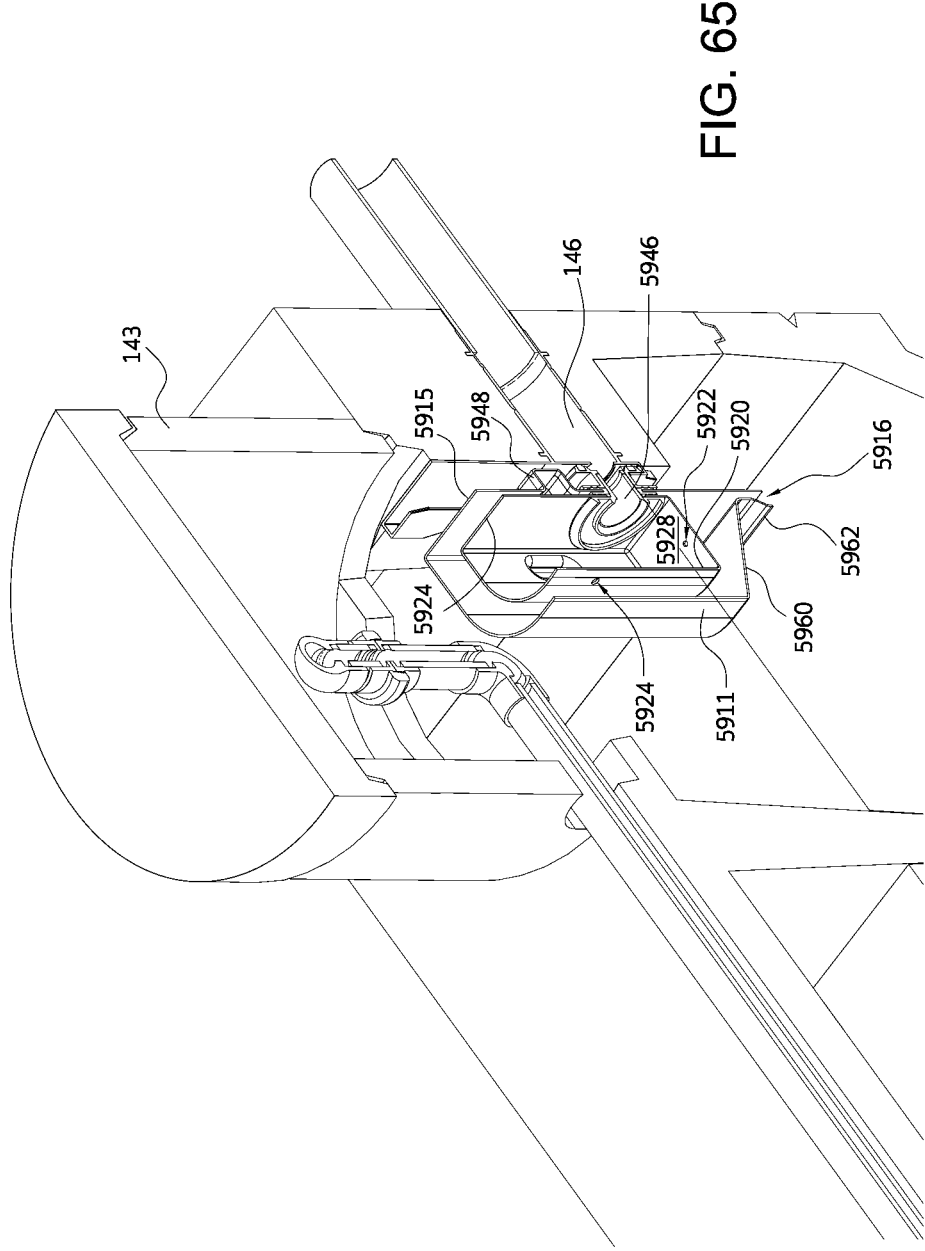
FIG. 65 is a top, right-front perspective, cross-sectional view along line AD-AD, of the flow equalization apparatus of FIG. 59, in accordance with one or more embodiments of the present invention.

FIG. 65 is a top, right-front perspective, cross-sectional view along line AD-AD, of the flow equalization apparatus of FIG. 59, in accordance with one or more embodiments of the present invention.

Figure 66:
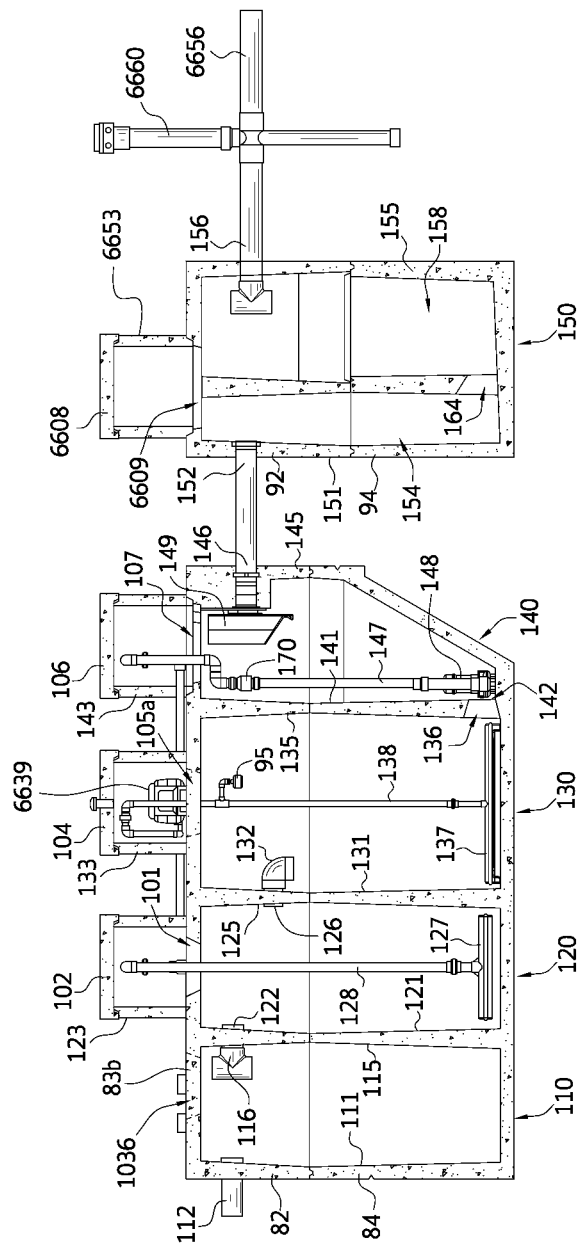
FIG. 66 is a cross-sectional, side view of the wastewater treatment system of FIG. 1 with the addition of an external ultra-violet (UV) light disinfection treatment system, in accordance with one or more embodiments of the present invention.

FIG. 66 is a cross-sectional, side view of the wastewater treatment system of FIG. 1 with the addition of an external ultra-violet (UV) light disinfection system, in accordance with one or more embodiments of the present invention. In FIG. 66, the description of FIG. 1 will not be repeated, but it is understood that the description of like elements in FIG. 1 applies to the system in FIG. 66, with the exception of the following noted differences. In FIG. 66, an air pump 6639 is shown inside aeration riser 133 instead of being located externally. A single polishing chamber riser 6653 with a riser top 6608 is shown over a single polishing chamber access opening 6609. In addition, the polishing chamber outlet pipe 156 is shown connected to and in fluid communication with a UV light disinfection system 6660 for treatment of the effluent water from the polishing chamber and passage through a UV light disinfection system outlet pipe 6656 for reuse or final disposal of a final effluent water from the UV light disinfection system 6660.

Figure 67:
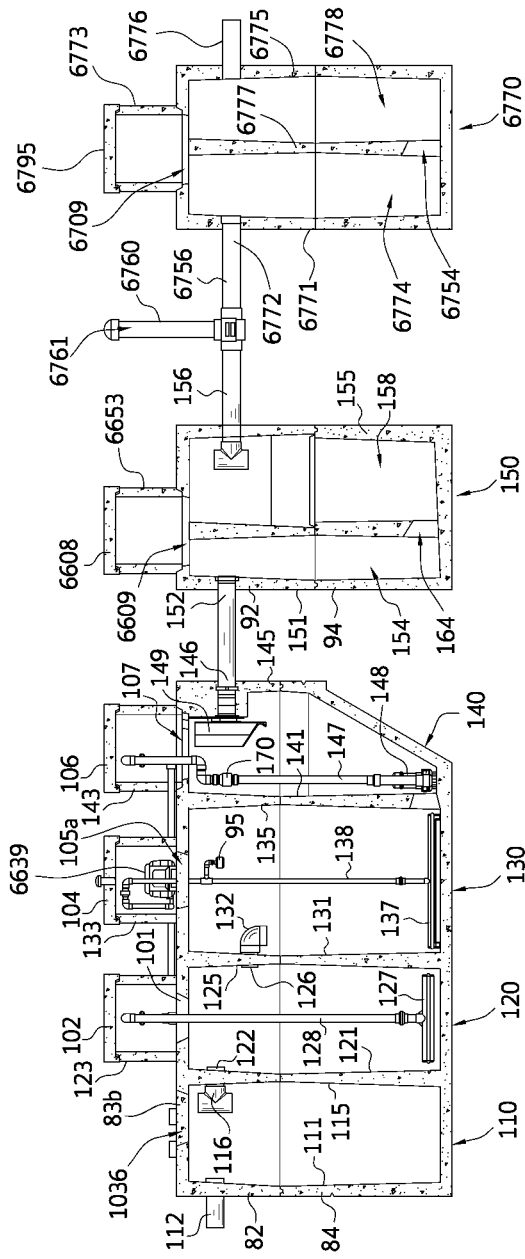
FIG. 67 is a cross-sectional, side view of the wastewater treatment system of FIG. 1 with the addition of an external chlorination disinfection treatment system with contact tank, in accordance with one or more embodiments of the present invention.

FIG. 67 is a cross-sectional, side view of the wastewater treatment system of FIG. 1 with the addition of an external chlorination disinfection system and contact tank, in accordance with one or more embodiments of the present invention. In FIG. 67, the description of FIG. 1 will not be repeated, but it is understood that the description of like elements in FIGS. 1 and 66 applies to the system in FIG. 67, with the exception of the following noted differences. In FIG. 67, the polishing chamber outlet pipe 156 is shown connected to and in fluid communication with a chlorination disinfection system 6760 for treatment of the effluent water from the polishing chamber and passage through a chlorination disinfection system outlet pipe 6756 and into a contact tank 6770 via contact tank inlet pipe 6772. For example, the chlorination disinfection system 6760 can include a linear-feed chlorine tablet feeder system 6760, which can be resupplied from above ground through opening 6761. Specifically, after a chlorine tablet is dispensed into the water as it passes through the chlorine tablet feeder system 6760, into the chlorination disinfection system outlet pipe 6756 and contact tank inlet pipe 6772 and into a first contact chamber 6774 to allow time for the chlorine tablet to dissolve and disinfect the water. The water in the first contact chamber 6774 passes through an outlet opening 6754 located in a bottom of a middle wall 6777 and into a second contact chamber 6778 in the contact tank 6770. The water in the second contact chamber 6778 exits the contact tank 6770 through a contact tank outlet pipe 6776 for reuse or final disposal of a final effluent water from the contact tank 6770.

In one embodiment, a wastewater treatment plant includes a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank. One of the plurality of chambers includes a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber. Another of the plurality of chambers includes an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber. Yet another of the plurality of chambers includes an aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump positioned above the aeration chamber access opening, and a diffusion bar positioned near a bottom of the aeration chamber and attached to and configured for fluid communication with the air pump. Still another of the plurality of chambers includes a clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a pump located near the aeration chamber outlet and sealingly coupled to and configured for fluid communication with the anoxic chamber via a piping component.

In another embodiment, a method of treating wastewater includes: receiving a volume of wastewater into a pretreatment chamber; pretreating the wastewater in the pretreatment chamber; receiving the treated wastewater from the pretreatment chamber in an anoxic chamber; anoxically treating the treated wastewater in the anoxic chamber; receiving the anoxically treated wastewater in an aeration chamber; aerating the anoxically treated wastewater in the aeration chamber; receiving the aerated wastewater in a clarification chamber; settling the aerated wastewater in the clarification chamber; returning sedimentation and settled wastewater from the clarification chamber to the anoxic chamber; mixing the returned sedimentation and settled wastewater with the treated wastewater in the anoxic chamber and anoxically treating the mixed wastewater in the anoxic chamber; and discharging effluent from the clarification chamber.

In yet another embodiment, a wastewater treatment plant includes means for receiving a volume of wastewater; means for pretreating the wastewater; means for receiving the pretreated wastewater from the pretreating means; means for anoxically treating the treated wastewater; means for receiving the anoxically treated wastewater from the anoxically treating means; means for aerating the anoxically treated wastewater; means for receiving the aerated wastewater from the aerating means; means for settling the aerated wastewater; means for pumping sedimentation and settled wastewater from the settling means back to the anoxically treating means; means for mixing pumped sedimentation and settled wastewater with the treated wastewater in the anoxically treating means; and means for discharging an effluent wastewater from the settling means.

In yet another embodiment, a wastewater treatment system includes a multi-chamber wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a pretreatment chamber at a first end, an anoxic chamber adjacent to the pretreatment chamber, an aeration chamber adjacent the anoxic chamber, and a clarification chamber adjacent to the aeration chamber; the pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to a second side wall and a top end of the back wall of the pretreatment chamber, and at least one pretreatment chamber access opening formed in and extending through a top wall of the pretreatment chamber; the anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the anoxic chamber outlet being diagonally across from the anoxic chamber inlet, the back wall being opposite the back wall of the pretreatment chamber, and an anoxic chamber access opening formed in and extending through a top wall of the anoxic chamber, an anoxic chamber riser mounted on the top wall of the anoxic chamber and surrounding and covering the anoxic chamber access opening; the aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, a first aeration chamber access opening formed in and extending through a top wall of the aeration chamber and adjacent a side wall opposite the aeration chamber inlet, an aeration chamber riser mounted on the top wall of the aeration chamber and surrounding and covering the first aeration chamber access opening, a second aeration chamber access opening formed in and extending through the top wall of the aeration chamber and substantially above the aeration chamber inlet, and an aeration system; and the clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a lower portion of a back wall of the clarification chamber being angled downwardly and inwardly toward the back wall of the aeration chamber, and a clarification chamber outlet opening being formed in and extending through an upper portion of the back wall of the clarification chamber.

In yet another embodiment, a wastewater treatment system includes a multi-chamber wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a pretreatment chamber at a first end, an anoxic chamber adjacent to the pretreatment chamber, an aeration chamber adjacent the anoxic chamber, and a clarification chamber adjacent to the aeration chamber; the pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to a second side wall and a top end of the back wall of the pretreatment chamber, and at least one pretreatment chamber access opening formed in and extending through a top wall of the pretreatment chamber; the anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the anoxic chamber outlet being diagonally across from the anoxic chamber inlet, the back wall being opposite the back wall of the pretreatment chamber, and an anoxic chamber access opening formed in and extending through a top wall of the anoxic chamber, an anoxic chamber riser mounted on the top wall of the anoxic chamber and surrounding and covering the anoxic chamber access opening; the aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, a first aeration chamber access opening formed in and extending through a top wall of the aeration chamber and adjacent a side wall opposite the aeration chamber inlet, an aeration chamber riser mounted on the top wall of the aeration chamber and surrounding and covering the first aeration chamber access opening, a second aeration chamber access opening formed in and extending through the top wall of the aeration chamber and substantially above the aeration chamber inlet; the clarification chamber including a clarification chamber inlet sealingly coupled to and configured for fluid communication with the aeration chamber via the aeration chamber outlet opening, a clarification chamber outlet opening formed in a back wall of the aeration chamber, a clarification chamber access opening being formed in and extending through a top wall of the clarification chamber, a clarification chamber riser mounted on the top wall of the clarification chamber and surrounding and covering the clarification chamber access opening, a lower portion of a back wall of the clarification chamber being angled downwardly and inwardly toward the back wall of the aeration chamber, and a clarification chamber outlet opening being formed in and extending through an upper portion of the back wall of the clarification chamber; and a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

In another embodiment, a method of treating wastewater includes receiving a volume of wastewater; pretreating the wastewater; receiving the pretreated wastewater; anoxically treating the pretreated wastewater; receiving the anoxically treated wastewater; aerating the anoxically treated wastewater; receiving the aerated wastewater; settling the aerated wastewater; returning sedimentation and settled wastewater for further anoxic treatment; mixing the pumped sedimentation and settled wastewater with the pretreated wastewater and anoxically treated wastewater and further anoxically treating the mixed wastewater; and discharging effluent after settling.

In another embodiment, a method of treating wastewater includes pretreating a volume of wastewater in a pretreatment chamber; anoxically treating the pretreated wastewater in an anoxic chamber; aerating the anoxically treated wastewater in an aeration chamber; settling the aerated wastewater in a clarification chamber; returning sedimentation and settled wastewater from the clarification chamber to the anoxic chamber; mixing the pumped sedimentation and settled wastewater with the treated wastewater in the anoxic chamber and anoxically treating the mixed wastewater in the anoxic chamber; discharging effluent from the clarification chamber; filtering the effluent wastewater through a filtration media filter in a polishing chamber; treating the filtered effluent wastewater in the polishing chamber; and discharging a final treated effluent wastewater out an effluent outlet of the polishing chamber.

In yet another embodiment, a wastewater treatment plant includes a means for pretreating a volume of wastewater; means for anoxically treating the pretreated wastewater; means for aerating the anoxically treated wastewater; means for settling the aerated wastewater; means for returning sedimentation and settled wastewater from the settling means back to the anoxically treating means; means for mixing pumped sedimentation and settled wastewater with the treated wastewater in the anoxically treating means; and means for discharging an effluent wastewater from the settling means.

In yet another embodiment, a wastewater treatment plant includes a pretreatment chamber sealingly connected to and configured for fluid communication with a wastewater influent line, and the pretreatment chamber including an outlet line and a top wall access opening; an anoxic chamber sealingly connected to and configured for fluid communication with the pretreatment chamber outlet line and the anoxic chamber including an anoxic chamber outlet line and a mixing bar; an aeration chamber sealingly connected to and configured for fluid communication with the anoxic chamber outlet line and the aeration chamber including an aeration chamber outlet line and a diffusion bar positioned near a bottom of the aeration chamber and attached to and sealingly connected to and configured for fluid communication with an air pump; a clarification chamber sealingly connected to and configured for fluid communication with the aeration chamber outlet line and the clarification chamber including a clarification chamber outlet line and the clarification chamber sealingly connected to and configured for fluid communication with the mixing bar in the anoxic chamber; and a polishing chamber sealingly connected to and configured for fluid communication with the clarification chamber outlet line and the polishing chamber including a filtration component and a polishing chamber outlet line.

In a further embodiment, a wastewater treatment plant as herein illustrated and described.

In a still further embodiment, a wastewater treatment means as herein illustrated and described.

While the invention(s) has/have been described in conjunction with a number of embodiments, it is evident that many alternatives, modifications and variations would be or are apparent to those of ordinary skill in the applicable arts. For example, different component designs and/or elements only shown in association with a particular embodiment also may be used with the other embodiments. Accordingly, Applicants intend to embrace all such alternatives, modifications, equivalents, and variations that are within the spirit and scope of the invention(s) described herein.

What is claimed is:

1. A wastewater treatment plant comprising:
a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank, the plurality of chambers including
a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber;
an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber;
an aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump positioned above the aeration chamber access opening, and a diffusion bar positioned near a bottom of the aeration chamber and attached to and configured for fluid communication with the air pump; and
a clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a pump located near the aeration chamber outlet and sealingly coupled to and configured for fluid communication with the anoxic chamber via a piping component; and a first piping section connected to the pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each is configured for fluid communication from an inside of the outlet section to the anoxic chamber.

2. The wastewater treatment plant of claim 1 further comprising:
a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

3. The wastewater treatment plant of claim 1 wherein the diffusion bar comprises:
a plurality of openings extending through opposite sides of the diffusion bar at an angle below a plane extending horizontal with a longitudinal axis of the diffusion bar.

4. The wastewater treatment plant of claim 1 wherein the outlet section of the piping component comprises:
a mixing bar with at least four openings extending through a single side of the mixing bar at an angle below a plane extending horizontal with a longitudinal axis of the mixing bar.

5. The wastewater treatment plant of claim 1 further comprising:
a discharge baffle positioned in and extending vertically downward from the pretreatment chamber outlet and into the pretreatment chamber.

6. The wastewater treatment plant of claim 1 further comprising:
a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

7. The wastewater treatment plant of claim 1 wherein the aeration chamber outlet comprises:
a substantially rectangular opening positioned adjacent a bottom of the front wall of the clarification chamber.

8. The wastewater treatment plant of claim 1 further comprising:
a flow equalization apparatus installed in the clarification chamber outlet opening.

9. The wastewater treatment plant of claim 1 wherein the flow equalization apparatus comprises:
an intake opening, at least one flow equalization port, and at least one peak flow port located above the at least one flow equalization port.

10. The wastewater treatment plant of claim 9 wherein the flow equalization apparatus further comprises:
at least one overflow port located above the at least one peak flow port.

11. A method of treating wastewater comprising:
receiving a volume of wastewater into a pretreatment chamber;
pretreating the wastewater in the pretreatment chamber;
receiving the treated wastewater from the pretreatment chamber in an anoxic chamber;
anoxically treating the treated wastewater in the anoxic chamber;
receiving the anoxically treated wastewater in an aeration chamber;
aerating the anoxically treated wastewater in the aeration chamber;
receiving the aerated wastewater in a clarification chamber;
settling the aerated wastewater in the clarification chamber;
returning sedimentation and settled wastewater from the clarification chamber to the anoxic chamber via a first piping section connected to the pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each is configured for fluid communication from an inside of the outlet section to the anoxic chamber;
mixing the returned sedimentation and settled wastewater with the treated wastewater in the anoxic chamber and anoxically treating the mixed wastewater in the anoxic chamber; and
discharging effluent from the clarification chamber.

12. The method of claim 11 further comprising:
receiving effluent wastewater from the clarification chamber in a polishing chamber;
filtering the effluent wastewater through a filtration media filter;
treating the filtered effluent wastewater with UV light, chlorine or phosphorus removal; and
discharging a final effluent wastewater out a polishing chamber effluent outlet.

13. The method of claim 11 wherein the pretreating of the wastewater in the pretreatment chamber comprises:
removing grit, floating material and large suspended particles from the wastewater.

14. The method of claim 11 wherein the receiving the pretreated wastewater from the pretreatment chamber in the anoxic chamber comprises:

receiving only supernatant from the pretreatment chamber into the anoxic chamber.

15. The method of claim 11 further comprising:
removing nitrate from the treated wastewater using a de-nitrification process in the anoxic chamber.

16. The method of claim 15 further comprising:
mixing sludge and liquid from the clarification chamber with the wastewater in the anoxic chamber and removing nitrate from the mixed sludge, liquid and wastewater using a de-nitrification process.

17. The method of claim 16 wherein the mixing sludge and liquid from the clarification chamber with the wastewater in the anoxic chamber comprises:
mixing sludge and liquid from the clarification chamber with the wastewater in the anoxic chamber on a predetermined intermittent time interval.

18. The method of claim 11 wherein the aerating the anoxically treated wastewater in the aeration chamber comprises:
injecting air into the wastewater in the aeration chamber via a diffusion bar that is located adjacent a bottom of the aeration chamber and adjacent a side wall opposite an aeration chamber inlet opening.

19. The method of claim 11 wherein the returning sedimentation and settled wastewater from the clarification chamber to the anoxic chamber comprises:
pumping sludge and liquid from the clarification chamber to the anoxic chamber at an adjustable rate.

20. A wastewater treatment plant comprising:
means for receiving a volume of wastewater;
means for pretreating the wastewater;
means for receiving the pretreated wastewater from the pretreating means;
means for anoxically treating the treated wastewater;
means for receiving the anoxically treated wastewater from the anoxically treating means;
means for aerating the anoxically treated wastewater;
means for receiving the aerated wastewater from the aerating means;
means for settling the aerated wastewater;
means for pumping sedimentation and settled wastewater from the settling means back to the anoxically treating means, the pumping means including a first piping section connected to the pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each is configured for fluid communication from an inside of the outlet section to the anoxic chamber;
means for mixing pumped sedimentation and settled wastewater with the treated wastewater in the anoxically treating means; and
means for discharging an effluent wastewater from the settling means.

21. The wastewater treatment plant of claim 20 further comprising:
means for receiving the discharged effluent wastewater;
means for filtering the effluent wastewater;
means for treating the filtered effluent wastewater; and
means for discharging a final effluent wastewater.

22. The wastewater treatment plant of claim 20 wherein the means for treating the wastewater comprises:
a pretreatment chamber.

23. The wastewater treatment plant of claim 20 wherein the means for anoxically treating the treated wastewater comprises:
an anoxic chamber;
a mixing bar disposed adjacent a bottom of the anoxic chamber and connected to and configured for fluid communication with the means for returning sedimentation and settled wastewater; and
a plurality of incubated de-nitrification bacteria.

24. The wastewater treatment plant of claim 20 wherein the means for aerating the anoxically treated wastewater comprises:
an aeration chamber;
an air pump; and
a diffusion bar disposed adjacent a bottom of the aeration chamber and connected to and configured for fluid communication with the air pump.

25. The wastewater treatment plant of claim 20 wherein the means for settling the aerated wastewater comprises:
a clarification chamber.

26. The wastewater treatment plant of claim 25 wherein the means for pumping sedimentation and settled wastewater for further anoxic treatment comprises:
a pump located adjacent a bottom wall in the clarification chamber and the pump is configured for fluid communication with the anoxic chamber.

27. The wastewater treatment plant of claim 21 wherein the means for filtering the effluent wastewater comprises at least one of:
gravel;
plastic elements;
natural elements;
synthetic elements;
rubber elements;
ceramic elements; and
Styrofoam elements.

28. The wastewater treatment plant of claim 27 wherein the means for treating the filtered effluent wastewater comprises at least one of:
a UV light;
a chlorination system;
a de-chlorination system;
a phosphorus removal system;
a heavy metal removal system; and
a nitrogen/nitrate removal system.

29. The wastewater treatment plant of claim 20 wherein means for discharging an effluent wastewater from the settled aerated wastewater comprises:
a flow equalization apparatus.

30. The wastewater treatment plant of claim 29 wherein the flow equalization apparatus comprises:
an intake opening, at least one flow equalization port, at least one sustained flow port located above the at least one flow equalization port, and at least one overflow flow port located above the at least one sustained flow port.

31. A wastewater treatment system comprising:
a multi-chamber wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a pretreatment chamber at a first end, an anoxic chamber adjacent to the pretreatment chamber, an aeration chamber adjacent the anoxic chamber, and a clarification chamber adjacent to the aeration chamber;
the pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to a second side wall and a top end of the back wall of the pretreatment chamber, and at least one pretreatment chamber access opening formed in and extending through a top wall of the pretreatment chamber;
the anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the anoxic chamber outlet being diagonally across from the anoxic chamber inlet, the back wall being opposite the back wall of the pretreatment chamber, and an anoxic chamber access opening formed in and extending through a top wall of the anoxic chamber, an anoxic chamber riser mounted on the top wall of the anoxic chamber and surrounding and covering the anoxic chamber access opening;
the aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, a first aeration chamber access opening formed in and extending through a top wall of the aeration chamber and adjacent a side wall opposite the aeration chamber inlet, an aeration chamber riser mounted on the top wall of the aeration chamber and surrounding and covering the first aeration chamber access opening, a second aeration chamber access opening formed in and extending through the top wall of the aeration chamber and substantially above the aeration chamber inlet, and an aeration system; and
the clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a lower portion of a back wall of the clarification chamber being angled downwardly and inwardly toward the back wall of the aeration chamber, a pump located near the clarification chamber inlet and sealingly coupled to and configured for fluid communication to the anoxic chamber, and a clarification chamber outlet opening being formed in and extending through an upper portion of the back wall of the clarification chamber; and
a piping component including a first piping section connected to the pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each provide for fluid communication from an inside of the outlet section to the anoxic chamber.

32. The wastewater treatment system of claim 31 further comprising:
a polishing chamber component including an influent well, an effluent well, an influent well inlet defined in a back wall of the influent well and that is configured for fluid communication with the clarification chamber via the clarification chamber outlet, an effluent well outlet defined in a front wall of the effluent well and that is configured for fluid communication with the outside of the effluent well, the polishing chamber further including a filter component located below the influent well inlet and the effluent well outlet and the filter component sealingly coupled to and configured for fluid communication with the influent well and the effluent well.

33. The wastewater treatment system of claim 32 wherein the filter component comprises:
at least one media module located on opposite sides of and configured for fluid communication with the influent well and the effluent well.

34. The wastewater treatment system of claim 33 wherein the effluent well further comprises:
a disinfection system configured for fluid communication with the at least one media module via a disinfection system inlet opening and configured for fluid communication with the effluent outlet via a disinfection system outlet opening.

35. The wastewater treatment system of claim 34 wherein the disinfection system comprises one of:
an ultraviolet disinfection system;
a chlorination system; and
the chlorination system and a de-chlorination system.

36. The wastewater treatment system of claim 33 wherein the effluent well further comprises:
a disinfection system configured for fluid communication with the two media modules via a disinfection system inlet opening and configured for fluid communication with the effluent outlet via a disinfection system outlet opening.

37. The wastewater treatment system of claim 32 wherein the influent well further comprises:
a pair of influent well outlet openings located on opposite side walls of the influent well and adjacent a bottom of the influent well.

38. The wastewater treatment system of claim 37 wherein the effluent well further comprises:
a pair of effluent well outlet openings located on opposite side walls of the effluent well and adjacent a top of the effluent well and below the effluent well outlet opening.

39. The wastewater treatment system of claim 38 wherein the pair of influent well outlet openings are located below a filtration bed in the filter component and the pair of effluent well outlet openings are located above the filtration bed in the filter component.

40. The wastewater treatment system of claim 39 wherein the filter component comprises:
a two chamber component, wherein the two chambers are located on opposite sides of the influent well and the effluent well and each chamber includes a separate filtration bed.

41. The wastewater treatment system of claim 40 wherein each separate filtration bed comprises:
a plurality of filtration media elements.

42. The wastewater treatment system of claim 41 wherein the plurality of filtration media elements comprise:
a plurality of gravel.

43. The wastewater treatment system of claim 41 wherein the plurality of filtration media elements comprise:
a plurality of plastic components.

44. The wastewater treatment system of claim 41 wherein the plurality of filtration media elements comprise one of:
a plurality of ceramic components;
a plurality of natural components;
a plurality of synthetic components;
a plurality of rubber components; and
a plurality of Styrofoam components.

45. The wastewater treatment system of claim 31 wherein the aeration system further comprises:
a diffusion bar having a plurality of openings formed longitudinally along and extending through opposite sides of the diffusion bar at an angle below a plane extending horizontal with a longitudinal axis of the diffusion bar.

46. The wastewater treatment system of claim 31 wherein the outlet section of the piping component comprises:
a mixing bar with at least four openings extending through a single side of the mixing bar at an angle below a plane extending horizontal with a longitudinal axis of the mixing bar.

47. The wastewater treatment system of claim 31 further comprising:
a discharge baffle positioned in and extending vertically downward from the pretreatment chamber outlet and into the pretreatment chamber.

48. The wastewater treatment system of claim 31 further comprising:
a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

49. The wastewater treatment system of claim 31 wherein the aeration chamber outlet comprises:
a substantially rectangular opening positioned adjacent a bottom of the front wall of the clarification chamber.

50. The wastewater treatment system of claim 31 further comprising:
a flow equalization apparatus installed in the clarification chamber outlet opening.

51. The wastewater treatment system of claim 31 wherein the flow equalization apparatus comprises:
an intake opening, at least one flow equalization port, and at least one sustained flow port located above the at least one flow equalization port.

52. The wastewater treatment system of claim 51 wherein the flow equalization apparatus further comprises:
at least one overflow port located above the at least one sustained flow port.

53. A wastewater treatment system comprising:
a multi-chamber wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a pretreatment chamber at a first end, an anoxic chamber adjacent to the pretreatment chamber, an aeration chamber adjacent the anoxic chamber, and a clarification chamber adjacent to the aeration chamber;
the pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to a second side wall and a top end of the back wall of the pretreatment chamber, and at least one pretreatment chamber access opening formed in and extending through a top wall of the pretreatment chamber;
the anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the anoxic chamber outlet being diagonally across from the anoxic chamber inlet, the back wall being opposite the back wall of the pretreatment chamber, and an anoxic chamber access opening formed in and extending through a top wall of the anoxic chamber, an anoxic chamber riser mounted on the top wall of the anoxic chamber and surrounding and covering the anoxic chamber access opening;
the aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, a first aeration chamber access opening formed in and extending through a top wall of the aeration chamber and adjacent a side wall opposite the aeration chamber inlet, an aeration chamber riser mounted on the top wall of the aeration chamber and surrounding and covering the first aeration chamber access opening, a second aeration chamber access opening formed in and extending through the top wall of the aeration chamber and substantially above the aeration chamber inlet;

the clarification chamber including a clarification chamber inlet sealingly coupled to and configured for fluid communication with the aeration chamber via the aeration chamber outlet opening, a clarification chamber outlet opening formed in a back wall of the aeration chamber, a clarification chamber access opening being formed in and extending through a top wall of the clarification chamber, a clarification chamber riser mounted on the top wall of the clarification chamber and surrounding and covering the clarification chamber access opening, a lower portion of a back wall of the clarification chamber being angled downwardly and inwardly toward the back wall of the aeration chamber, a pump located near the clarification chamber inlet and sealingly coupled to and configured for fluid communication to the anoxic chamber, and a clarification chamber outlet opening being formed in and extending through an upper portion of the back wall of the clarification chamber;

a piping component including a first piping section connected to the pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each provide for fluid communication from an inside of the outlet section to the anoxic chamber; and a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

54. The wastewater treatment plant of claim 53 wherein the aeration chamber further comprises an aeration system, the aeration system including:

a diffusion bar having a plurality of openings extending through opposite sides of the diffusion bar at an angle below a plane extending horizontal with a longitudinal axis of the diffusion bar.

55. The wastewater treatment plant of claim 53 wherein the outlet section of the piping component comprises:

a mixing bar with at least four openings extending through a single side of the mixing bar at an angle below a plane extending horizontal with a longitudinal axis of the mixing bar.

56. The wastewater treatment plant of claim 53 further comprising:

a discharge baffle positioned in and extending vertically downward from the pretreatment chamber outlet and into the pretreatment chamber.

57. The wastewater treatment plant of claim 53 wherein the filtration media filter component includes a filtration media.

58. The wastewater treatment plant of claim 53 wherein the aeration chamber outlet comprises:

a substantially rectangular opening positioned adjacent a bottom of the front wall of the clarification chamber.

59. The wastewater treatment plant of claim 53 further comprising:

a flow equalization apparatus installed in the clarification chamber outlet opening.

60. The wastewater treatment plant of claim 53 wherein the flow equalization apparatus comprises:

an intake opening, at least one flow equalization port, and at least one sustained flow port located above the at least one flow equalization port.

61. The wastewater treatment plant of claim 60 wherein the flow equalization apparatus further comprises:

at least one overflow port located above the at least one sustained flow port.

62. A method of treating wastewater comprising:
receiving a volume of wastewater;
pretreating the wastewater;
receiving the pretreated wastewater;
anoxically treating the pretreated wastewater;
receiving the anoxically treated wastewater;
aerating the anoxically treated wastewater;
receiving the aerated wastewater;
settling the aerated wastewater;
returning sedimentation and settled wastewater for further anoxic treatment via a piping component including a first piping section connected to a pump at a first end and extending upwardly and away from the pump and connecting at a second end to a check valve, which in turn connects to a first end of a second piping section that extends upwardly and through a clarification chamber access opening and is connected at a second end to a first end of a third piping section that extends laterally across a top wall of the clarification chamber and connects at a second end to a first end of a fourth piping section that extends toward an anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each provides for fluid communication from an inside of the outlet section to the anoxic chamber;
mixing the pumped sedimentation and settled wastewater with the pretreated wastewater and anoxically treated wastewater and further anoxically treating the mixed wastewater; and
discharging effluent after settling.

63. The method of claim 62 further comprising:
receiving the discharged effluent wastewater;
filtering the effluent wastewater through a filtration media filter;

treating the filtered effluent wastewater; and
discharging a final effluent wastewater.

64. The method of claim 62 wherein the pretreating of the wastewater comprises:
removing grit, floating material and large suspended particles from the wastewater.

65. The method of claim 62 wherein the receiving the pretreated wastewater comprises:
receiving only supernatant wastewater.

66. The method of claim 62 further comprising:
removing nitrate from the pretreated wastewater using a de-nitrification process.

67. The method of claim 66 further comprising:
mixing sludge and liquid with the pretreated wastewater and removing nitrate from the mixed sludge, liquid and pretreated wastewater using a de-nitrification process.

68. The method of claim 67 wherein the mixing sludge and liquid with the wastewater in the anoxic chamber comprises:
mixing sludge and liquid with the pretreated wastewater on predetermined intermittent time intervals.

69. The method of claim 62 wherein the aerating the anoxically treated wastewater comprises:
injecting air into the anoxically treated wastewater adjacent a bottom of the anoxically treated wastewater.

70. The method of claim 62 wherein the aerating the returning sedimentation and settled wastewater comprises:
pumping sludge and liquid from the clarification chamber to the anoxic chamber at an adjustable rate.

71. The method of claim 62 further comprising:
add coagulants during the settling of the aerated wastewater.

72. The method of claim 62 further comprising:
adding oxygen during the settling of the aerated wastewater.

73. The method of claim 63 further comprising:
treating the filtered effluent wastewater by chlorination.

74. The method of claim 73 further comprising:
treating the filtered effluent wastewater by de-chlorination.

75. The method of claim 63 further comprising:
adding coagulants during the treating of the filtered effluent wastewater.

76. The method of claim 63 further comprising:
adding oxygen during the treating of the filtered effluent wastewater.

77. The method of claim 63 further comprising:
removing phosphorus during the treating of the filtered effluent wastewater.

78. The method of claim 63 further comprising:
adding biologicals during the treating of the filtered effluent wastewater.

79. The method of claim 78 wherein the adding biologicals during the treating of the filtered effluent wastewater comprises:
adding bacteria to the filtered effluent wastewater.

80. A method of treating wastewater comprising:
pretreating a volume of wastewater in a pretreatment chamber;
anoxically treating the pretreated wastewater in an anoxic chamber;
aerating the anoxically treated wastewater in an aeration chamber;
settling the aerated wastewater in a clarification chamber;
returning sedimentation and settled wastewater from the clarification chamber to the anoxic chamber;
mixing the pumped sedimentation and settled wastewater with the treated wastewater in the anoxic chamber and anoxically treating the mixed wastewater in the anoxic chamber;
discharging effluent from the clarification chamber;
filtering the effluent wastewater through a filtration media filter in a polishing chamber via a first piping section connected to the pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each is configured for fluid communication from an inside of the outlet section to the anoxic chamber;
treating the filtered effluent wastewater in the polishing chamber; and
discharging a final treated effluent wastewater out an effluent outlet of the polishing chamber.

81. The method of claim 80 wherein the treating of the wastewater in the pretreatment chamber comprises:
removing grit, floating material and large suspended particles from the wastewater.

82. The method of claim 80 wherein the treated wastewater from the pretreatment chamber in the anoxic chamber comprises:
receiving only supernatant from the pretreatment chamber into the anoxic chamber.

83. The method of claim 80 wherein the anoxically treating the treated wastewater in the anoxic chamber comprises:
removing nitrate from the treated wastewater using a de-nitrification process in the anoxic chamber.

84. The method of claim 83 further comprising:
mixing sludge and liquid from the clarification chamber with the wastewater in the anoxic chamber and removing nitrate from the mixed sludge, liquid and wastewater using a de-nitrification process.

85. The method of claim 84 wherein the mixing sludge and liquid from the clarification chamber with the wastewater in the anoxic chamber comprises:
mixing sludge and liquid from the clarification chamber with the wastewater in the anoxic chamber on predetermined intermittent time intervals.

86. The method of claim 80 wherein the aerating the anoxically treated wastewater in the aeration chamber comprises:
injecting air into the wastewater in the aeration chamber via a diffusion bar that is located adjacent a bottom of the aeration chamber and adjacent a side wall opposite an aeration chamber inlet opening.

87. The method of claim 80 wherein the aerating the returning sedimentation and settled wastewater from the clarification chamber to the anoxic chamber comprises:
pumping sludge and liquid from the clarification chamber to the anoxic chamber at an adjustable rate.

88. A wastewater treatment plant comprising:
means for pretreating a volume of wastewater;
means for anoxically treating the pretreated wastewater;
means for aerating the anoxically treated wastewater;
means for settling the aerated wastewater;
means for returning sedimentation and settled wastewater from the settling means back to the anoxically treating means, wherein the means for returning sedimentation and settled wastewater includes a first piping section connected to a pump at a first end and extending upwardly and away from the pump and connecting at a second end to a check valve, which in turn connects to a first end of a second piping section that extends upwardly and through the clarification chamber access opening and is connected at a second end to a first end of a third piping section that extends laterally across the top wall of the clarification chamber and connects at a second end to a first end of a fourth piping section that extends toward the anoxic chamber and is connected at a second end to a first end of a fifth piping section that extends into and toward a bottom of the anoxic chamber and is connected at a second end to an outlet section located near the bottom of the anoxic chamber and that has a plurality of openings defined in the outlet section and that each is configured for fluid communication from an inside of the outlet section to the anoxic chamber;
means for mixing pumped sedimentation and settled wastewater with the treated wastewater in the anoxically treating means; and
means for discharging an effluent wastewater from the settling means.

89. The wastewater treatment plant of claim 88 further comprising:
means for filtering the effluent wastewater;
means for treating the filtered effluent wastewater; and
means for discharging a final effluent wastewater.

90. The wastewater treatment plant of claim 88 wherein the means for treating the wastewater comprises:
a pretreatment chamber.

91. The wastewater treatment plant of claim 88 wherein the means for anoxically treating the treated wastewater comprises:
an anoxic chamber;
a mixing bar disposed adjacent a bottom of the anoxic chamber and connected to and configured for fluid communication with the means for returning sedimentation and settled wastewater; and
a plurality of incubated de-nitrification bacteria.

92. The wastewater treatment plant of claim 88 wherein the means for aerating the anoxically treated wastewater comprises:
an aeration chamber;
an air pump; and
a diffusion bar disposed adjacent a bottom of the aeration chamber and connected to and configured for fluid communication with the air pump.

93. The wastewater treatment plant of claim 90 wherein the means for settling the aerated wastewater comprises:
a clarification chamber.

94. The wastewater treatment plant of claim 93 wherein the means for returning sedimentation and settled wastewater for further anoxic treatment comprises:
a pump located adjacent a bottom wall in the clarification chamber and the pump is configured for fluid communication with the anoxic chamber.

95. The wastewater treatment plant of claim 89 wherein the means for filtering the effluent wastewater comprises at least one of:
gravel;
plastic elements;
natural elements;
synthetic elements;
rubber elements;
ceramic elements; and
Styrofoam elements.

96. The wastewater treatment plant of claim 95 wherein the means for treating the filtered effluent wastewater comprises at least one of:
a UV light;
a chlorination system;
a de-chlorination system;
a phosphorus removal system;
a heavy metal removal system; and
a nitrogen/nitrate removal system.

97. The wastewater treatment plant of claim 88 wherein means for discharging an effluent wastewater from the settled aerated wastewater comprises:
a flow equalization apparatus.

98. The wastewater treatment plant of claim 97 wherein the flow equalization apparatus comprises:
an intake opening, at least one flow equalization port, and at least one sustained flow port located above the at least one flow equalization port, and at least one overflow port located above the at least one sustained flow port.

99. A wastewater treatment plant comprising:
a pretreatment chamber sealingly connected to and configured for fluid communication with a wastewater influent line, and the pretreatment chamber including an outlet line and a top wall access opening;
an anoxic chamber sealingly connected to and configured for fluid communication with the pretreatment chamber outlet line and the anoxic chamber including an anoxic chamber outlet line and a mixing bar;
an aeration chamber sealingly connected to and configured for fluid communication with the anoxic chamber outlet line and the aeration chamber including an aeration chamber outlet line and a diffusion bar positioned near a bottom of the aeration chamber and attached to and sealingly connected to and configured for fluid communication with an air pump;
a clarification chamber sealingly connected to and configured for fluid communication with the aeration chamber outlet line and the clarification chamber including a clarification chamber outlet line and the clarification chamber sealingly connected to and configured for fluid communication with the mixing bar in the anoxic chamber; and
a flow equalization apparatus connected to and in fluid communication with a front end of the clarification chamber outlet line, the flow equalization apparatus including:
an outer shell having a plurality of substantially vertical walls including a back wall, a left side wall connected to and extending substantially perpendicularly away from a first side of the back wall, a right wall connected to and extending substantially perpendicularly away from an opposite side of the back wall, a front wall extending substantially parallel to the back wall and connected to outer ends of the left and right walls to form a sealed wall enclosure, the outer shell also including a bottom sealingly connected to bottom ends of the front, left and right walls on three edges of the bottom adjacent the front, left and right walls, and forming a baffle opening between a fourth edge of the bottom adjacent to and with the bottom of the back wall to permit fluid communication from below and outside of into an inside of the outer shell, and an opening formed in the back wall;
an inner shell having plurality of substantially vertical walls including an inner shell back wall, an inner shell left side wall connected to and extending substantially perpendicularly away from a first side of the inner shell back wall, an inner shell right wall connected to and extending substantially perpendicularly away from an opposite side of the inner shell back wall, an inner shell front wall extending substantially parallel to the inner shell back wall and connected to outer ends of the left and right walls to form a sealed wall enclosure, the front back, left and right walls having substantially the same height, the outer shell also including a bottom sealingly connected to bottom ends of the inner shell front, left, right and back walls, the inner shell further including a flow equalization port formed in the inner shell bottom and sustained flow port adjacent a top of the inner shell front wall, and an inner shell outlet port formed in the inner shell back wall; and
an outlet tube extending through the opening in the back wall of the outer shell and connected to the outlet port of the inner shell and in fluid communication with the inner shell;
a polishing chamber sealingly connected to and configured for fluid communication with the clarification chamber outlet line and the polishing chamber including a filtration component and a polishing chamber outlet line.

100. The wastewater treatment plant of claim 99 wherein the pretreatment, anoxic, aeration and clarification chambers are contained in a single tank.

101. The wastewater treatment plant of claim 100 wherein the tank has a substantially rectangular cross-section.

102. The wastewater treatment plant of claim 100 wherein the tank comprises concrete.

103. The wastewater treatment plant of claim 100 wherein the tank has a substantially circular cross-section.

104. The wastewater treatment plant of claim 103 wherein the tank comprises concrete.

105. The wastewater treatment plant of claim 99 wherein the pretreatment, anoxic, aeration and clarification chambers are separate tanks.

106. The wastewater treatment plant of claim 105 wherein each tank has a substantially ellipsoid shape.

107. The wastewater treatment plant of claim 105 wherein each tank comprises:
a molded plastic;
fiberglass; or
steel.

108. The wastewater treatment plant of claim 99 wherein the pretreatment chamber has an inlet opening formed in and through a front wall of the pretreatment chamber and sealingly connected to and configured for fluid communication with the wastewater influent line.

109. The wastewater treatment plant of claim 99 wherein the outlet of the pretreatment chamber is formed in and through a back wall of the pretreatment chamber and sealingly connected to and configured for fluid communication with the anoxic chamber.

110. The wastewater treatment plant of claim 99 wherein the anoxic chamber has an inlet opening formed in and through a front wall of the anoxic chamber and sealingly connected to and configured for fluid communication with the pretreatment chamber.

111. The wastewater treatment plant of claim 99 wherein the outlet of the anoxic chamber is formed in and through a back wall of the anoxic chamber and sealingly connected to and configured for fluid communication with the aeration chamber.

112. The wastewater treatment plant of claim 99 wherein the aeration chamber has an inlet opening formed in and through a front wall of the aeration chamber and sealingly connected to and configured for fluid communication with the anoxic chamber.

113. The wastewater treatment plant of claim 99 wherein the outlet of the aeration chamber is formed in and through a back wall of the aeration chamber and sealingly connected to and configured for fluid communication with the clarification chamber.

114. The wastewater treatment plant of claim 99 wherein the clarification chamber has an inlet opening formed in and through a front wall of the clarification chamber and sealingly connected to and configured for fluid communication with the aeration chamber.

115. The wastewater treatment plant of claim 99 wherein the outlet of the clarification chamber is formed in and through a back wall of the aeration chamber and sealingly connected to and configured for fluid communication with the polishing chamber.

116. The wastewater treatment plant of claim 99 wherein the polishing chamber has an inlet opening formed in and through a front wall of the polishing chamber and sealingly connected to and configured for fluid communication with the clarification chamber.

117. The wastewater treatment plant of claim 99 wherein the outlet of the polishing chamber is formed in and through a back wall of the polishing chamber and sealingly connected to and configured for fluid communication with the polishing chamber outlet line.

118. The wastewater treatment plant of claim 99 wherein the pretreatment, anoxic, aeration, clarification and polishing chambers are contained in a single unit.

119. The wastewater treatment plant of claim 118 wherein the tank has a substantially rectangular cross-section.

120. The wastewater treatment plant of claim 99 wherein the pretreatment, anoxic, aeration, clarification and polishing chambers are separate tanks.

121. The wastewater treatment plant of claim 120 wherein each tank has a substantially ellipsoid shape.

122. The wastewater treatment plant of claim 99 wherein the diffusion bar comprises:
a plurality of openings extending through opposite sides of the diffusion bar at an angle below a plane extending horizontal with a longitudinal axis of the diffusion bar.

123. The wastewater treatment plant of claim 99 further comprising:
a piping component connected to a pump adjacent a bottom of the clarification chamber and sealingly connected to the mixing bar in the anoxic chamber.

124. The wastewater treatment plant of claim 123 wherein the mixing bar comprises:
at least four openings extending through a single side of the mixing bar at an angle below a plane extending horizontal with a longitudinal axis of the mixing bar.

125. The wastewater treatment plant of claim 123 further comprising:
- a discharge baffle positioned in and extending vertically downward from the pretreatment chamber outlet and into the pretreatment chamber.

126. The wastewater treatment plant of claim 123 wherein the polishing chamber comprises:
- an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

127. The wastewater treatment plant of claim 123 wherein the aeration chamber outlet comprises:
- a substantially rectangular opening positioned adjacent a bottom of the front wall of the clarification chamber.

128. The wastewater treatment plant of claim 123 further comprising:
- a flow equalization apparatus installed in the clarification chamber outlet opening.

129. The wastewater treatment plant of claim 123 wherein the flow equalization apparatus comprises:
- an intake opening, at least one flow equalization port, and at least one peak flow port located above the at least one flow equalization port.

130. The wastewater treatment plant of claim 129 wherein the flow equalization apparatus further comprises:
- at least one overflow port located above the at least one peak flow port.

131. The flow equalization of claim 99 wherein a top edge of the inner shell defines an inner shell top opening.

132. The flow equalization of claim 131 further comprising an overflow port formed by the inner shell top opening.

133. The flow equalization of claim 132 wherein the inner shell top opening is below an open top end of the outer shell.

134. The flow equalization of claim 133 wherein an influent side of each of the flow equalization port, the sustained flow port and the overflow port are covered by at least one layer of mesh.

135. The flow equalization of claim 99 wherein a top edge of the outer shell defines an outer shell top opening.

136. The flow equalization of claim 135 wherein an influent side of each of the flow equalization port, the sustained flow port, and the overflow port are covered by at least one layer of a mesh.

\* \* \* \* \*